(12) United States Patent
Thange

(10) Patent No.: US 8,913,734 B2
(45) Date of Patent: *Dec. 16, 2014

(54) TELECOMMUNICATIONS ADDRESSING SYSTEM AND METHOD

(71) Applicant: Maqsood A. Thange, Monmouth Junction, NJ (US)

(72) Inventor: Maqsood A. Thange, Monmouth Junction, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/906,796

(22) Filed: May 31, 2013

(65) Prior Publication Data

US 2014/0146957 A1    May 29, 2014

Related U.S. Application Data

(63) Continuation of application No. 13/905,819, filed on May 30, 2013.

(60) Provisional application No. 61/731,009, filed on Nov. 29, 2012, provisional application No. 61/732,585, filed on Dec. 3, 2012.

(51) Int. Cl.
*H04M 7/00* (2006.01)
*H04M 3/42* (2006.01)
*H04W 4/16* (2009.01)

(52) U.S. Cl.
CPC .............. *H04W 4/16* (2013.01); *H04M 3/4228* (2013.01)
USPC .............. 379/221.14; 379/201.05; 379/90.01; 379/88.17; 370/352; 370/353; 370/354; 370/355; 370/356; 370/357; 370/265; 370/389; 455/414.1

(58) Field of Classification Search
USPC ................. 379/221.14, 201.05, 90.01, 88.17; 370/352, 253, 354, 355, 356, 357, 265, 370/389, 53; 455/414.1
See application file for complete search history.

(56) References Cited

U.S. PATENT DOCUMENTS

| | | |
|---|---|---|
| 6,169,734 B1 | 1/2001 | Wilson |
| 6,829,231 B1 | 12/2004 | Wilson |
| 6,868,140 B2 | 3/2005 | Myers et al. |
| 6,963,633 B1 | 11/2005 | Diede et al. |
| 7,082,192 B2 | 7/2006 | Weaver |
| 7,170,986 | 1/2007 | Ure |
| 7,382,871 B1 | 6/2008 | Ure |

(Continued)

FOREIGN PATENT DOCUMENTS

| | | |
|---|---|---|
| CN | 1870672 | 11/2006 |
| CN | 1984163 A | 6/2007 |

(Continued)

*Primary Examiner* — Quynh Nguyen
(74) *Attorney, Agent, or Firm* — Shaukat A. Karjeker; Kevin A. Klughart; Carstens & Cahoon, LLP

(57) ABSTRACT

A telecommunications addressing system/method allowing selection of a telephone instrument device (TID) using arbitrary identifiers is disclosed. The system/method allows a source TID (STD) to select a target TID (TTD) by the use of a Target Telephone Identifier (TTI) data string rather than a traditional numeric telephone identification (NTI). This TTI is then indexed within a TTI/NTI mapping server (TMS) that functions as a hierarchical repository of TTI/NTI mappings. STD/TTD communication is established by first performing a lookup of the STD-selected TTI within the TMS to identify the NTI of the TTD. Once the NTI of the STD has been identified by the TMS, communication between the STD and TTD is established using the NTI via the normal public switched telephone network (PSTN). TMS TTI lookup may be performed via STD TID web application and/or via PSTN infrastructure interface.

60 Claims, 64 Drawing Sheets

(56) References Cited

U.S. PATENT DOCUMENTS

| | | |
|---|---|---|
| 2005/0084079 A1 | 4/2005 | Lang |
| 2005/0175169 A1 | 8/2005 | Boda |
| 2007/0047522 A1 | 3/2007 | Jefferson et al. |
| 2007/0280445 A1 | 12/2007 | Shkedi |
| 2009/0016507 A1 | 1/2009 | Altberg et al. |
| 2011/0035250 A1 | 2/2011 | Finucan |
| 2012/0296837 A1 | 11/2012 | Smith |

FOREIGN PATENT DOCUMENTS

| | | |
|---|---|---|
| CN | 1984185 A | 6/2007 |
| CN | 1992757 A | 7/2007 |
| EP | 1668473 B1 | 11/2012 |

| User: John Howard | | | | TTI Name: JHOW |
|---|---|---|---|---|
| Basic Info | Blocked Names | Group | Call Log | Download |

Basic Subscriber Information

| | | | |
|---|---|---|---|
| Remote Name | InternistInPrinceton | Subscriber Name | Dr. John Howard |
| Country | USA | City/Region | NY |
| Country Code | 011 | Telephone Number | (121) 555-6789 |
| Phone Type | cell | Activate/Deactivate | Active |
| Address | 555 Lexington Ave | Country | USA |
| State/Province | NY | City/Town | NY |
| ZIP | 01234 | Picture/Logo | Jhoward.jpg |
| Displayed Text | Internal Medical / Family Medicine / Primary Care | | |
| Block Int. Calls | Block | Warn Int. Calls | Warn |
| Unlist Me | No | Sync w/ Calendar | Outlook Calendar |

2810
```
<head>
<meta name="description" content=
        "{JohnDoe
                {Work {{Desk,      555-678-9011 x123}
                       {Field,     JDoe@foobar.com}
                       {Secretary, 555-678-9013}
                       {Operator,  555-678-9000/0}}
                       {Directory, www.foobar.com/dir}}
                {Home, 555-678-9010}
                {Cell, 555-678-9020} }">
<meta name="keywords" content="TTI/NTI Mapping">
<meta name="author" content="John Doe">
<meta charset="UTF-8">
</head>
```

2820
```
<head>
<meta name="description" content=
        "{JDoe@foobar.com
                {Home, 555-678-9010}
                {Cell, 555-678-9020} }">
<meta name="keywords" content="TTI/NTI Mapping">
<meta name="author" content="John Doe">
<meta charset="UTF-8">
</head>
```

2830
```
<head>
<meta name="description" content=
        "{www.foobar.com
                     {Operator,  555-678-9000/0}}
                     {Directory, www.foobar.com/dir} }">
<meta name="keywords" content="TTI/NTI Mapping">
<meta name="author" content="Foobar, Inc.">
<meta charset="UTF-8">
</head>
```

FIG. 29

```
                       2900
TTI-map  ←    {
                <TTI-pair>
              | <TTI-list>
                }

TTI-list ←    {
                <TTI-pair>
              | <TTI-list>
                }

TTI-pair ←    <TTI-name, NTI-name>

NTI-name ←    <condition> <NTI-atom>

NTI-atom ← {  <phone-ref>
            | <email-ref>
            | <web-ref>
              } phone-ref ←{  (<digit><digit><digit>)
              <digit><digit><digit> -
              <digit><digit><digit><digit>
              }
```

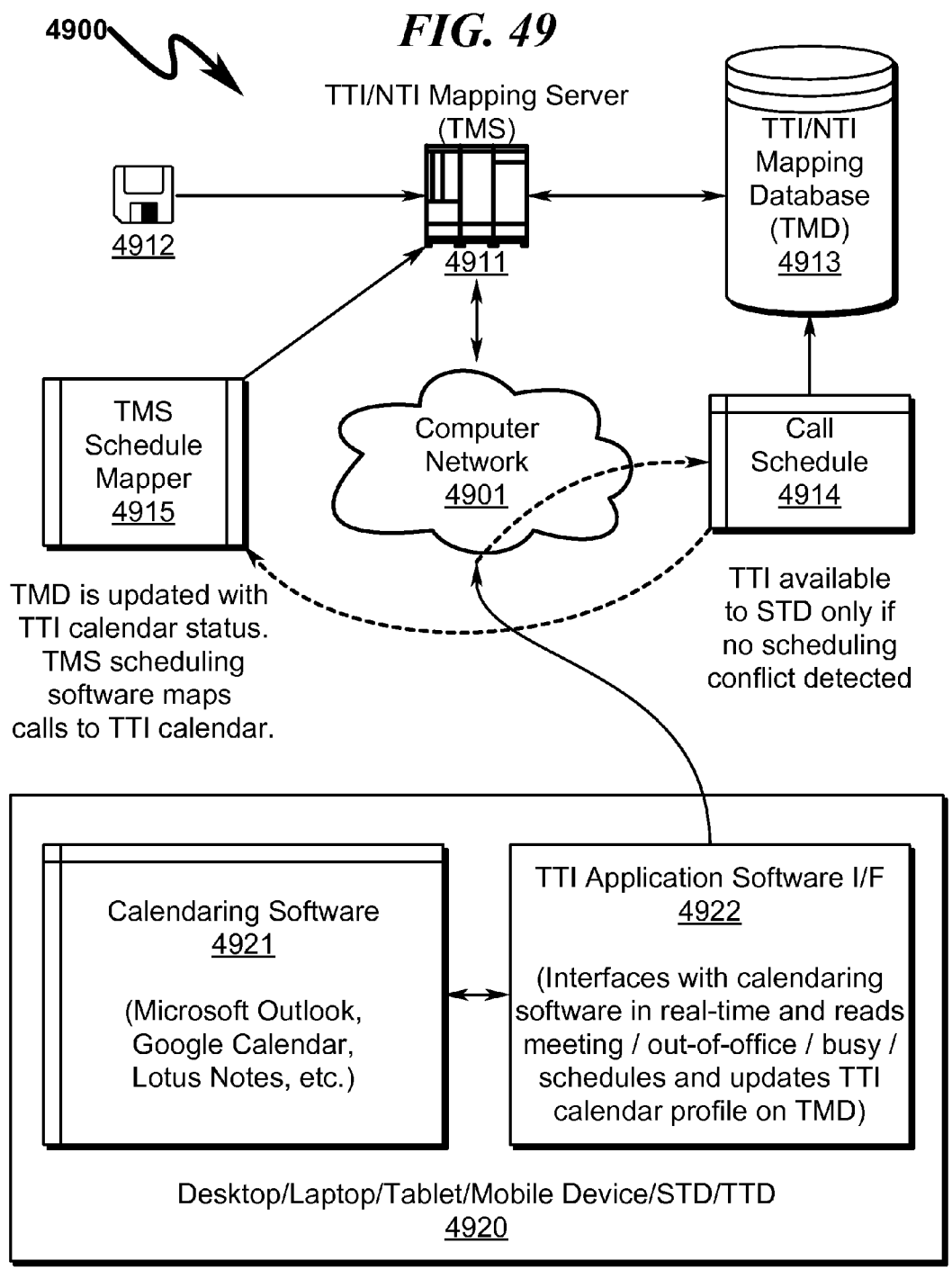

| User: John Howard | | | | TTI Name: JHOW |
|---|---|---|---|---|
| Basic Info | Blocked Names | Group | Call Log | Download |
| Outgoing Message | Block Incoming Calls | Block Outgoing Calls | Parental Controls | Ringtones |

Schedule of Availability

| From Date/Time | To Date/Time | Availability | Message Forwarding | |
|---|---|---|---|---|
| 3/15/2010 09:00 | 3/15/2010 11:00 | No | In Meeting | Delete |
| 3/16/2010 11:30 | 3/16/2010 17:00 | No | Out Of Office | Delete |
| 3/18/2010 13:00 | 3/18/2010 15:00 | No | Do Not Disturb | Delete |
| 3/19/2010 09:00 | 3/21/2010 09:00 | Yes | DRJH→ <JHWKNDHM> | Delete |
| | | | | Add Entry |

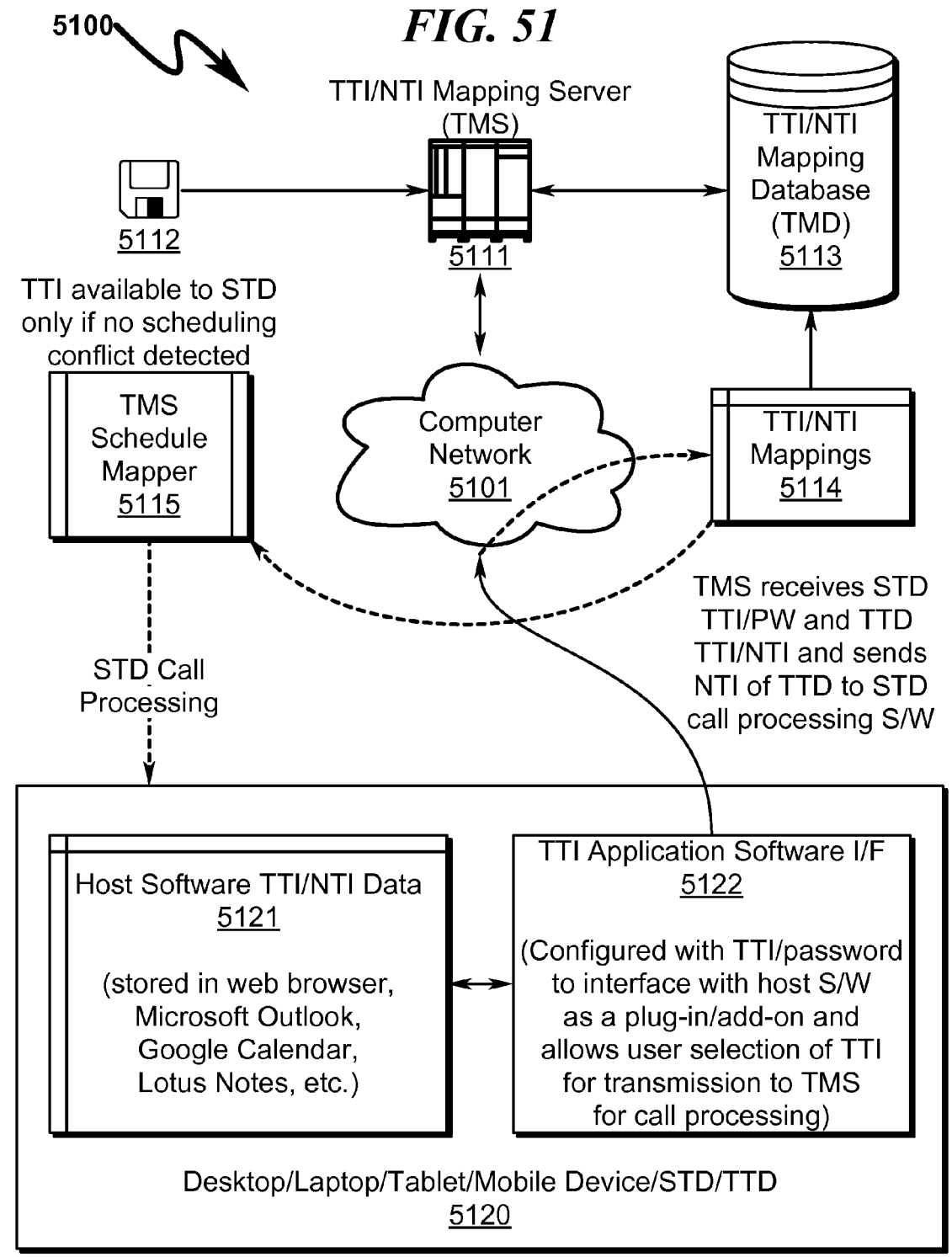

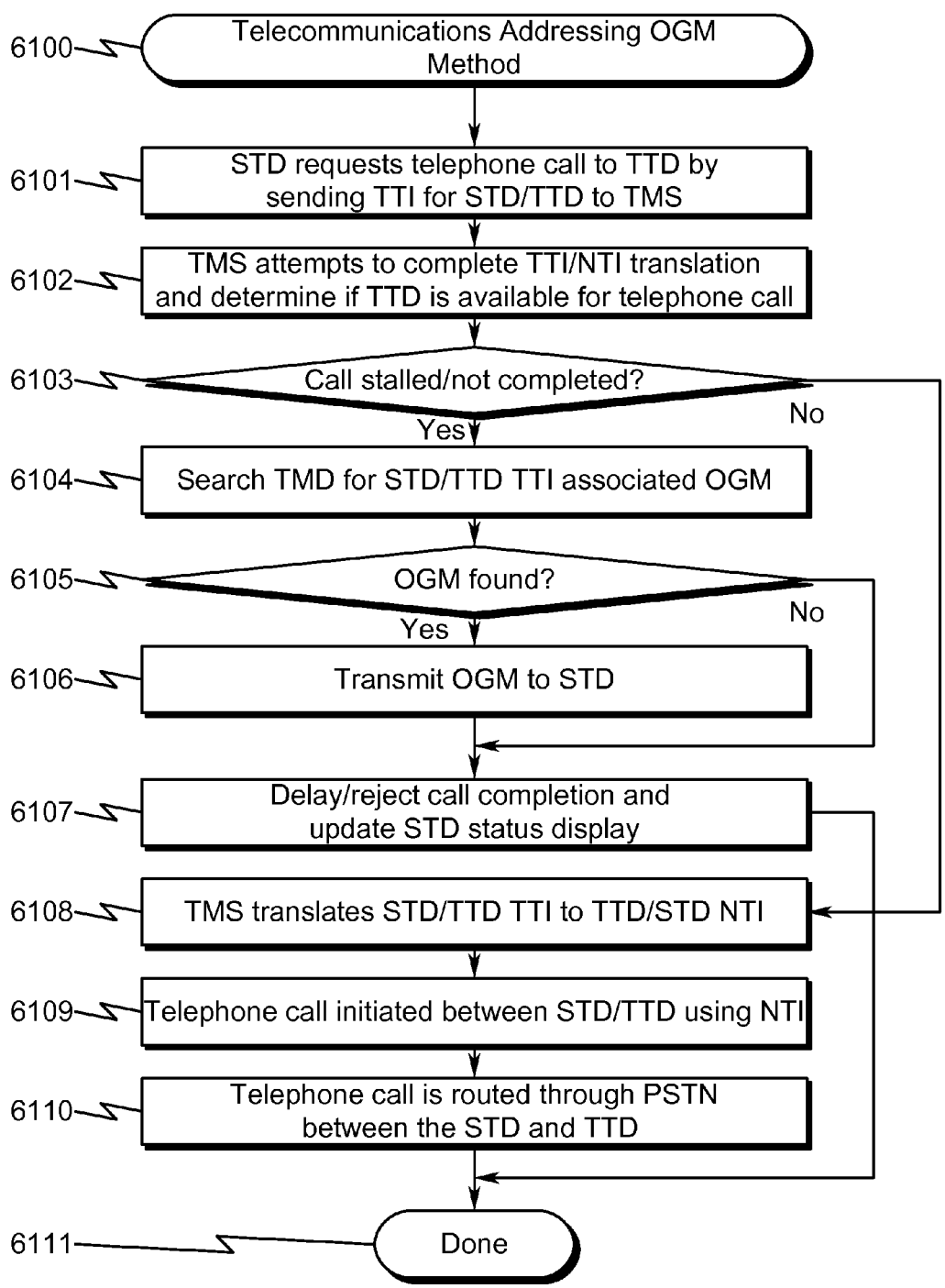

| User: Dr. John Howard | | | TTI Name: DRJH | |
|---|---|---|---|---|
| Basic Info | Call Restrict | Group | Call Log | Download |
| Outgoing Message | Block Incoming Calls | Block Outgoing Calls | Parental Controls | Ringtones |

Outgoing Message (OGM) Definition

| TTI | Name | OGM | |
|---|---|---|---|
| Alx45 | Alex | GeneralOGMVideoClip.mpg | Delete |
| JimDoe | Jim | OGM_SoundClip_Jim.wav | Delete |
| JohnDoe | John | JohnDoeVideo.mpg | Delete |
| <default> | <n/a> | GeneralVoiceMail.wav | Delete |
| | | | Add Entry |

TELECOMMUNICATIONS ADDRESSING SYSTEM AND METHOD

CROSS REFERENCE TO RELATED APPLICATIONS

U.S. Utility Patent Application

This application claims benefit under 35 U.S.C. §120 and incorporates by reference U.S. Utility patent application for TELECOMMUNICATIONS ADDRESSING SYSTEM AND METHOD by inventor Maqsood A. Thange, filed electronically with the USPTO on May 30, 2013, with Ser. No. 13/905,819, EFS ID 15909007, confirmation number 1169.

U.S. Provisional Patent Applications

This application claims benefit under 35 U.S.C. §119 and incorporates by reference U.S. Provisional patent application for SMART TELECOMMUNICATIONS INTERFACE AND SYSTEMS by inventor Maqsood A. Thange, filed electronically with the USPTO on Nov. 29, 2012, with Ser. No. 61/731,009, EFS ID 14335607, confirmation number 1093.

This application claims benefit under 35 U.S.C. §119 and incorporates by reference U.S. Provisional patent application for SMART TELECOMMUNICATIONS INTERFACE AND SYSTEMS by inventor Maqsood A. Thange, filed electronically with the USPTO on Dec. 3, 2012, with Ser. No. 61/732,585, EFS ID 14367194, confirmation number 6174.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

Embodiments of the present invention generally relate to systems and methods for identifying and targeting communication with a telecommunications device within a general public switched telephone network (PSTN). While not limitive of the invention teachings, the present invention may in some circumstances be advantageously applied to categories including U.S. Patent Classifications 370/352; 379/88.17; 379/90.01; 379/201.05; 379/201.07; 379.218.011 370/265.09; 379/900; and 455/550+.

PRIOR ART AND BACKGROUND OF THE INVENTION

Overview

With respect to conventional telecommunication devices operating within the public switched telephone network (PSTN), the use of numeric telephone numbers (numeric telephone identifier (NTI)) that uniquely address a target telecommunication device (TTD) is standardized. The specific format, length, and interpretation of these telephone numbers is often equipment dependent and often dependent on the country in which the TTD is located and/or dependent on the country in which the source telecommunication device (STD) is located.

While most smartphone and other intelligent STDs have made attempts to simplify the association of a TTD with their respective NTI using software implementing telephone "address books" and the like, this approach is insufficient to account for changes in TTD/NTI associations due to external events (phone numbers change, area codes change, changes in PBX extensions, etc.). Other attempts to make TTD associations using an Internet address (as in U.S. Pat. No. 7,382,871 for CALL SETUP USING A PACKET-SWITCHED ADDRESS SUCH AS AN INTERNET ADDRESS OR THE LIKE issued to Michael J. Ure on Jun. 3, 2008) or to integrate the STD into the Internet infrastructure (as in U.S. Pat. No. 6,169,734 for INTERNET telephone SET issued to James E. Wilson on Jan. 2, 2001) have proven unsuccessful in addressing a number of issues relating to the use of NTIs within the PSTN. These deficiencies have become more pronounced as the PSTN infrastructure increases with the use of wireless and mobile telephones, smartphones, tablet computers, and telephone enabled personal computers (laptops, desktops, etc.).

Prior Art Deficiencies

From the above discussion and an inspection of the prior art in the field, it can be discerned that the use of NTIs within the PSTN suffers from the following disadvantages:

Phone numbers are cryptic, difficult to remember, easy to forget. This confusion is exacerbated by the use of country codes, city codes, and constantly changing area codes within the NTI infrastructure.

Phone Numbers are fixed digits 0-9 and have no flexibility for change based on consumer input. Telephone numbers are generally 10 digits long, including the area code. Adding the country code, city code, the local telephone number can be as long as 15 characters or more.

For international calls, some countries use a 011 prefix to dial, some use 1, while Indian callers use 00. This is very confusing for most people, especially for travelers and the elderly. In an attempt to somehow make sense out of these confusing digits, telephone companies separate the digits using parentheses, spaces, and dashes (e.g., (999) 999-9999). However, these formats are country specific.

Telephone companies are constantly fighting for each other's business and as a result, telephone numbers associated with these companies also change constantly.

In the current environment of telephone number usage, whenever a telephone company runs out of digits, they add a prefix digit, start a new area code and make a public announcement. For example, New Jersey for a long time had a 201 area code. When they ran out of telephone numbers under 201, some numbers were changed to a 908 area code and when they ran out of telephone numbers again a 908 area code was added, with a further change occurring later to introduce a 732 area code. Similar changes have occurred in other states and countries too. When this happens, the public is forced to change their telephone diaries and speed dials while corporations are forced to change their telephone directories, websites, letterhead, and product documentation. Those who are unaware of the change (usually overseas callers or infrequent callers) keep on dialing the wrong number till somehow they find out the real reason of why their call is not going through.

Most of the times people are forced to change their telephone numbers when they change their residence or business location. Similarly, every time they change jobs their work telephone number also changes. When this happens, these people cannot be reached unless their new cryptic telephone numbers are publicized again to those who wish to contact them. While some prior art methodologies have suggested using identifiers maintained by the telephone company that are portable within the context of the telephone company's infrastructure, this technique will not work if the user changes their residence country or telephone company.

Many people have multiple telephone numbers for multiple uses (home telephone, cell telephone, fax number, work number, emergency number, and a telephone number for a vacation home, etc.). Callers have to remember each number separately or maintain a diary. Almost always these numbers have no similarity with each other.

Phone numbers are allocated by telephone companies. The public has little or no say about what the telephone number should be. The entire process of who gets what telephone number is controlled by telephone companies.

Use of telephone numbers provides very little functionality to individuals and businesses. Since telephone companies control these mappings consumers also have to pay significant amount of money for specific telephone numbers. For example, a telephone number which translates into a business name on telephone keypad such as "1800flowers".

To date the prior art has not fully addressed these deficiencies.

OBJECTIVES OF THE INVENTION

Accordingly, the objectives of the present invention are (among others) to circumvent the deficiencies in the prior art and affect the following objectives:

(1) Provide for a telecommunications addressing system and method that allows for consumers to assign arbitrary identifiers to numeric telephone numbers.
(2) Provide for a telecommunications addressing system and method that allows for consumers to control the addressing of their telephones.
(3) Provide for a telecommunications addressing system and method that allows for consumers to configure call blocking on their telephones.
(4) Provide for a telecommunications addressing system and method that allows for automatic reconfiguration of area codes or other information related to numeric telephone identifiers.
(5) Provide for a telecommunications addressing system and method that allows for synching of telephone numbers to calendars.
(6) Provide for a telecommunications addressing system and method that allows for conditional dialing of telephone numbers based on a number of conditional events.
(7) Provide for a telecommunications addressing system and method that allows for telephone identifiers to be descriptive of the telephone user.
(8) Provide for a telecommunications addressing system and method that allows for trees of telephone numbers to be associated with an individual or corporate entity.
(9) Provide for a telecommunications addressing system and method that allows for automated navigation of voice menu systems with predefined menu traversal scripts.
(10) Provide for a telecommunications addressing system and method that allows for automated updating of corporate telephone tree profiles without manual intervention from remote telephone callers.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System/Method Overview

The present invention relates to a system/method for choosing and controlling telephone identification by individuals and businesses. The disclosed system takes advantage of universal interactive programming languages (such as Java, J2ME, PERL or any cellphone programming languages such as BREW (and relational databases such as Oracle, DB2, MySQL, etc.)), the world-wide web, and/or the existing public switched telephone network (PSTN). Instead of using a conventional telephone number to identify a target telephone device (TTD), the present invention allows telephone subscribers to choose their own target telephone identifier (TTI) to describe the numeric telephone identifier (NTI) of the target telephone. This present invention does not replace the use of telephone numbers but rather serves as a layer of abstraction to the existing telephone numbers assigned by the telephone companies. The present invention permits telephone users to control this add-on without any involvement of the telephone companies.

General Invention Objective

The objective of this technology is to let the telephone subscribers choose and maintain a more powerful and functionality enhanced TTI instead of a numeric telephone number provided by the telephone companies. The TTI may be chosen and controlled by the telephone users themselves. Provisions within this architecture provide for global TTI directories that may be browsed and searched in a similar fashion to that of web pages, but with additional levels of security and functionality that are directed to improving the maintainability of the telephone directory infrastructure.

BRIEF DESCRIPTION OF THE DRAWINGS

For a fuller understanding of the advantages provided by the invention, reference should be made to the following detailed description together with the accompanying drawings wherein:

FIG. 6 illustrates an exemplary BASIC INFORMATION dialog screen useful in some preferred invention embodiments;

FIG. 28 illustrates examples of TTI/NTI mapping information being incorporated within HTML metadata;

FIG. 29 illustrates an exemplary TTI/NTI metadata definition grammar;

FIG. 49 illustrates a preferred exemplary system embodiment illustrating integration of call processing with calendaring software;

FIG. 50 illustrates an exemplary user interface screen depicting integration of calendaring software into the call processing function;

FIG. 51 illustrates a preferred exemplary system embodiment wherein telephone call processing is interfaced to existing host software applications on a computing device;

FIG. 61 illustrates an exemplary method embodiment incorporating outgoing message (OGM) capability;

FIG. 62 illustrates an exemplary user interface dialog supporting outgoing message (OGM) capability;

DESCRIPTION OF THE PRESENTLY PREFERRED EXEMPLARY EMBODIMENTS

Figure 1:
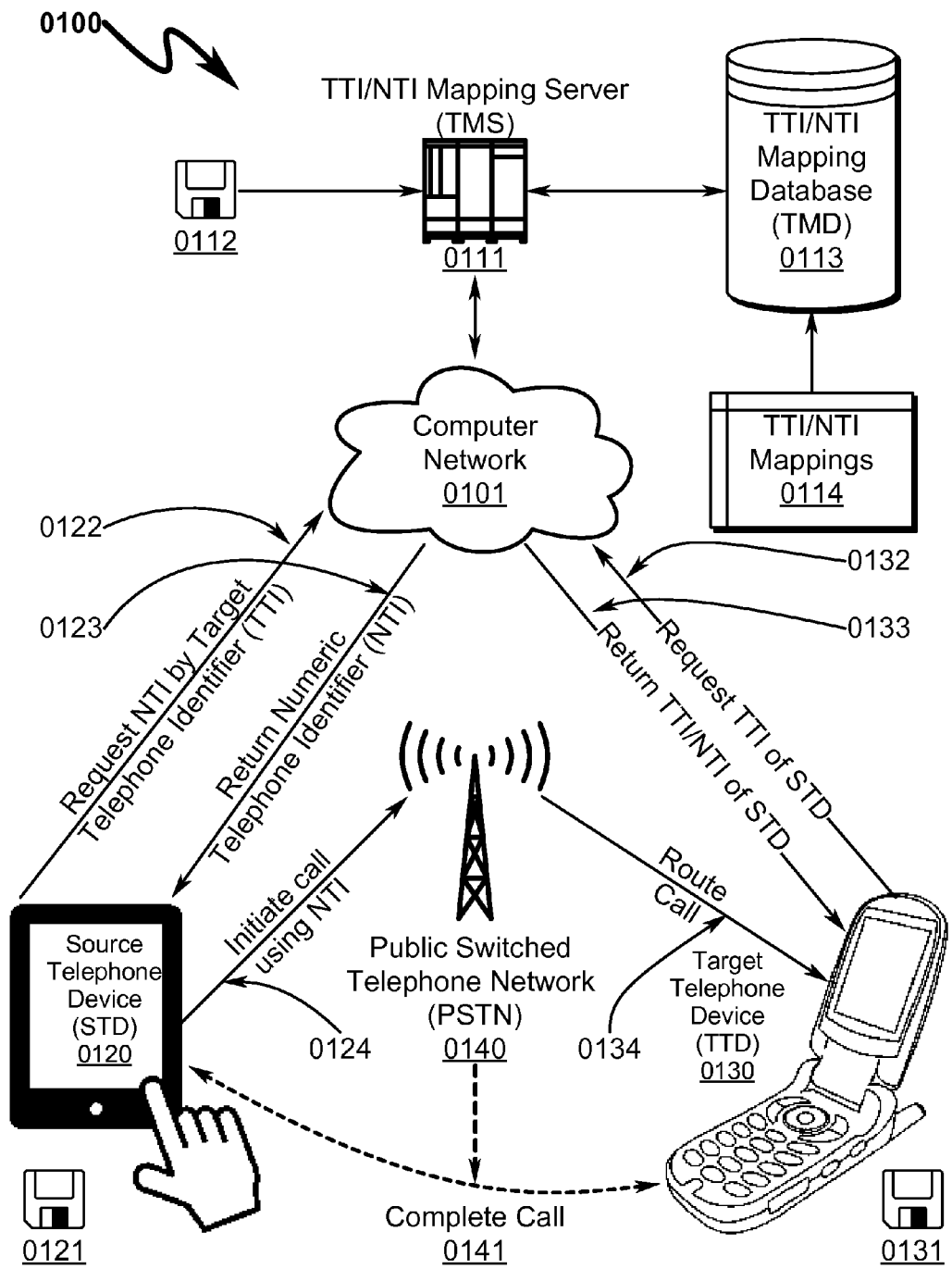
FIG. 1 illustrates a preferred exemplary system embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a TELECOMMUNICATIONS ADDRESSING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Telephone not Limitive

The present invention will use the term "telephone", "phone", and their derivatives to broadly cover any communications device that may be configured to operate within the context of a public switched telephone network (PSTN). This may include cellular telephones, mobile telephones, and conventional wired telephone (landline, VOIP phones, etc.) infrastructures.

Telephone Number not Limitive

The present invention will use the term "telephone number", "NTI", and their derivatives to broadly cover any identification methodology used within the a public switched telephone network (PSTN) to uniquely identify a telephone or telephone branch exchange. This use generally relates to numeric telephone numbers "0123456789" but is anticipated to cover other non-numeric identifiers that may be used within a PSTN in the future.

Source/Target Telephone Identifiers (STI/TTI) not Limitive

The present invention will use the term "source telephone identifier (STI)" to generally reference a telephone identifier associated with a telephone call originator and "target telephone identifier (TTI)" to generally reference a telephone identifier associated with a telephone call recipient. However, in many circumstances the term "TTI" may generally refer to any form of telephone identifier used to perform a lookup to resolve a numeric telephone identifier (NTI) (conventional telephone company telephone number). For example the "TTI/NTI mapping database (TMD)" referenced herein is generally used to match TTI identifiers to their respective NTI resolved PSTN telephone numbers. However, the TMD may be used to resolve STIs if used by the telephone call receiver. Thus, the term "TTI" may in some cases be synonymous with STI and be dependent on the discussion context.

TTI Encoding not Limitive

The present invention will use the term "target telephone identifier (TTI)" and its derivatives to broadly cover any data string (including but not limited to alphanumeric text strings, binary data streams (of fixed and/or varying bit widths, etc.) that may be used as an identifier for the target telephone instrument device (TTD). Within this context the term "alphanumeric text string" may include any combination of alpha and/or numeric symbols selected from traditional character encoding tables such as ASCII, EBCDIC, BAUDOUT, that are typically associated with 5-8 bit alphabetic/numeric character encodings, but may also include encoding methodologies such as UNICODE (UCS-2, UTF-8, UTF-16, etc.) that permit representation of more complex character sets associated with foreign languages that are not necessarily representable using traditional 5-8 bit character encodings.

TTI Data Entry not Limitive

The present invention may use a wide variety of methodologies to enter data associated with the TTI, including but not limited to keyboard/keypad entry and/or voice recognition techniques. Additionally, some preferred embodiments may incorporate telephonetic voice data entry to allow character-by-character entry of the TTI. Within this context of any of these data entry techniques the use of auto-completion (matching against previously entered or known TTI entries associated with a local and/or remote cache is anticipated within the present invention scope.

NTI Encoding not Limitive

The present invention may use a wide variety of methodologies to encode numeric telephone identifiers (NTIs). While conventional telephone number strings incorporating conventional formats (e.g. "(555) 123-4567"; "555-123-4567"; "555.123.4567") are anticipated, the NTI within the context of the present invention may incorporate other features in some circumstances including but not limited to the following:

Numeric paths (call sequencing information) to navigate through a DTMF-driven voice menu system (e.g., "555-123-4567/1/2/3/9" for selection of "9" after sequentially passing through menu options "1", "2", and "3";

Call extension processing to select specific extensions from a given main PBX number (e.g., "555-123-4567 x123" for selection of extension "123" after call pickup at the main number "555-123-4567";

Call sequence redirection on the detection of a busy signal or unavailability of the telephone call recipient (e.g., "555-123-4567 {x123, x456}" to first attempt connection at extension "x123" and if unavailable, reconnect to extension "x456".

One skilled in the art will recognize that this list of NTI modifiers is non-exhaustive and only exemplary of a wide variety of NTI content and syntax that may be implemented using the teachings of the present invention. Thus the term "NTI" and its variants should be broadly interpreted to encompass more than just strictly numeric telephone numbers as typically dialed using a PSTN connected telephone.

TTI Composition not Limitive

TTIs within the context of the present invention may incorporate any combination of letters, digits, and/or symbols and may permit consumers to choose imaginative ways to identify themselves (e.g., JohnLawyer, NYLawyerone, Jim53, TallJim). The TTI identifiers are not limited to any symbol length restriction such as is currently present in traditional telephone numbers.

Call Blocking not Limitive

While many preferred invention embodiments may implement call blocking functionality (blocking outgoing calls from the STD to the TTD and/or blocking incoming calls to the TTD from the STD), the invention also anticipates situations where the call "blocking" incorporates an automatic transfer of the call to voicemail. This voicemail answering system may incorporate TTI-indexed messages that are specific to the STD caller or TTD recipient.

TMS/TMD Configurations not Limitive

While the present invention disclosure depicts a single TMS/TMD server/database structure, the present invention is not limited to this configuration and may in some implementations be applied to scenarios having multiple TMS and/or TMD elements. These configurations may provide for replicated TMD information or segmented TMD data depending on application. Multiple TMS servers may also be utilized to improve access time performance to the TMD data relative to a given STD/TTD service request.

Method Steps not Limitive

The general method steps described herein may be modified heavily depending on a number of factors, with rearrangement and/or addition/deletion of steps anticipated by the scope of the present invention. Integration of the described methods and other preferred exemplary embodiment methods in conjunction with a variety of preferred exemplary embodiment systems described herein is anticipated by the overall scope of the present invention.

Computing Device not Limitive

The present invention may utilize the term "computer system", "computing device (CD)" or its equivalent in describing various control systems used within the present invention. These synonymous terms should be given their widest possible interpretation in this context, and are specifically anticipated to include mobile/portable computing devices such as handheld computers, tablet computers, smartphones, cellphones, laptop computer, and the like.

Cross-Information not Limitive

The present invention may permit a wide variety of cross-information to be communicated between the STD and the TTD during telephone call initiation and/or processing. This may include text messages, photographs, video clips, sound recordings, voice recordings, etc. Thus, cross-information exchanges between the STD and TTD should be interpreted broadly within this context.

Embodiments are Exemplary

It is to be understood that both the foregoing general description and the following detailed description are exemplary and explanatory only and are not restrictive of the disclosed and/or claimed embodiments. Further features and/or variations may be provided in addition to those set forth herein. For example, the disclosed embodiments may be directed to various combinations and subcombinations of the disclosed features and/or combinations and subcombinations of several further features disclosed below in the detailed description.

System Overview (0100)

An overview of a presently preferred exemplary system embodiment is generally illustrated in FIG. 1 (0100) wherein the system incorporates a mapping server (TMS) (0111) that indexes an arbitrary user-defined target telephone identifier (TTI) with an associated numeric telephone identification (NTI) (telephone number). The TTI/NTI mapping server (TMS) executes machine instructions on a computer system that are retrieved from a computer readable medium (0112). A relational or hierarchical database (TMD) (0113) of TTI/NTI mappings (0114) is utilized to allow a given TTI to serve as the lookup index for a resolved NTI telephone number (or numbers) associated with the TTI.

Within this framework, a computer network (0101) connects a source telephone device (STD) (0120) (typically executing machine instructions retrieved from a computer readable medium (0121)) and the TMS (0111) that enables the STD to initiate requests (0122) for TTI/NTI translation to the TMS (0111). These TTI requests (0122) are then translated by the TMS (0111) to a resolved NTI (or a tree of potential NTIs) and returned (0123) to the STD (0120) for processing. Once the user has selected the desired TTI/NTI mapping from the potential candidates returned (0123) by the TMS (0111), the STD initiates a telephone call (0124) via the public switched telephone network (0140) using internal software on the STD (0120). The telephone call is then routed (0134) by the PSTN (0140) to the target telephone device (TTD) (0130) identified by the NTI. The call is continued and completed (0141) using the PSTN (0140).

While the TTD (0130) need not be a web-enabled smart telephone, if it does possess this capability it will typically execute machine instructions read from a computer readable medium (0131) and may initiate requests (0132) to the TMS (0111) prior to or during the call completion (0141) to request the source telephone identifier (STI) of the STD (0120) and/or its associated NTI. This information as returned (0133) by the TMS (0111) can be used to maintain a local cache of received caller information that may be used to return calls to the STD at a later time.

The TMD (0113) may incorporate additional mapping structures to associate initiated telephone calls from the STD (0120) to the TTD (0130) such that the internal TTIs associated with the STD (0120) and TTD (0130) are linked so that a locality of reference (intersection of context) can be defined between the STD (0120) and TTD (0130). This permits subsequent TTI requests (0122) by the STD (0120) referencing TTDs that are related to the TTD (0130) to be positioned at the top of a search list presented to the STD (0120).

It should be noted as detailed elsewhere herein that the STD (0120) and TTD (0130) represent arbitrary telecommunications devices and need not necessarily be mobile telephones. Land lines, tablets, and other like telecommunication devices are anticipated as being compatible with this TTI/NTI mapping infrastructure.

Method Overview (0200)

Figure 2:
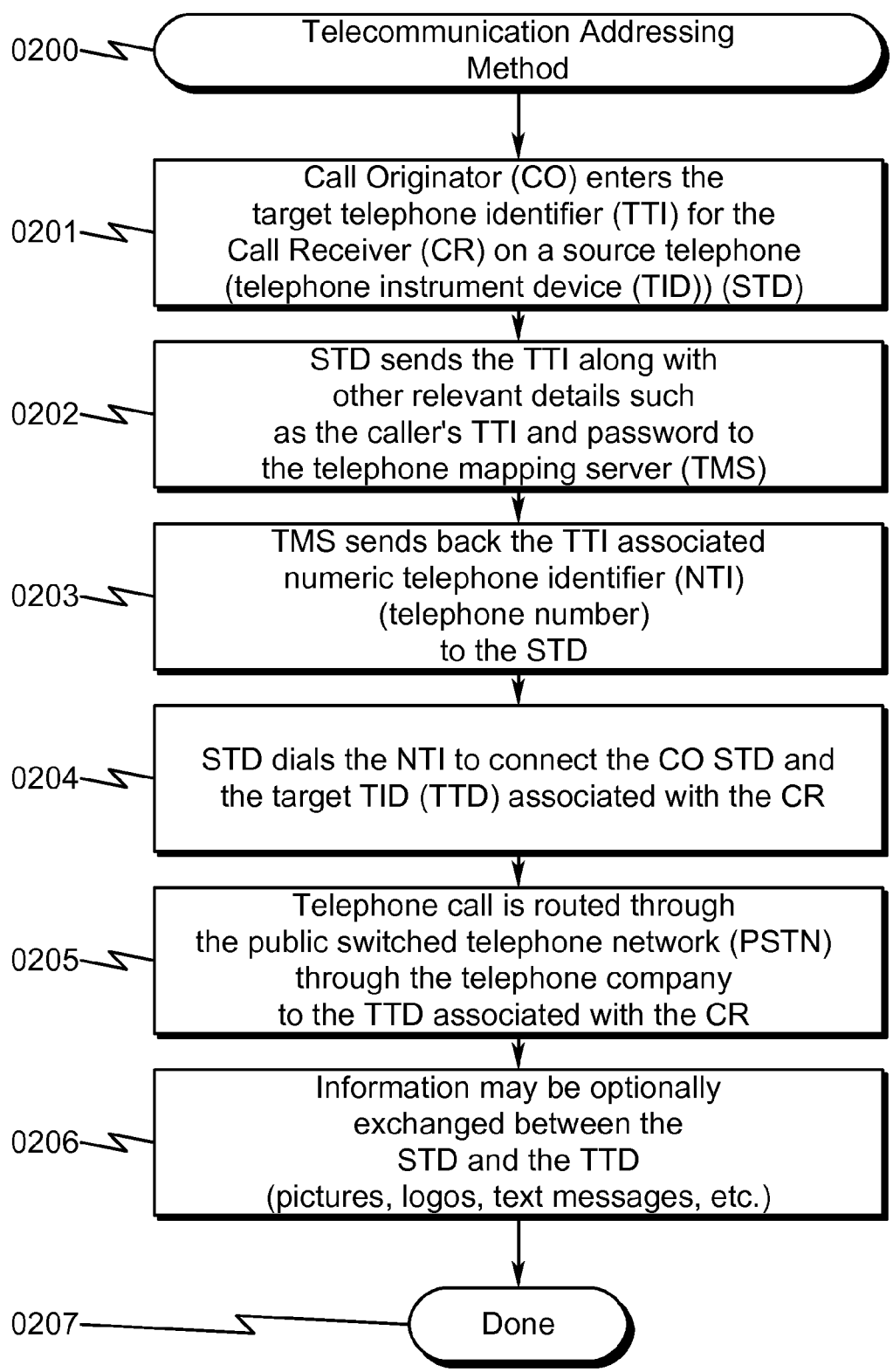
FIG. 2 illustrates a flowchart depicting a preferred exemplary method embodiment of the present invention.

A method associated with the system depicted in FIG. 1 (0100) is generally illustrated by the flowchart in FIG. 2 (0200) and comprises the following steps:
(1) The Call Originator (CO) enters the target telephone identifier (TTI) for the Call Receiver (CR) on a source telephone (telephone instrument device (TID)) (STD) (0201).
(2) The STD sends the TTI along with other relevant details such as the caller's TTI and password to the telephone mapping server (TMS) (0202).
(3) The TMS sends back the numeric telephone identifier (NTI) (telephone number, and possibly other information objects such as pictures, logo, short messages, GPS location, GPS location translation, etc.) to the STD (0203).
(4) STD dials the NTI to connect the CO STD and the target TID (TTD) associated with the CR (0204).
(5) The telephone call is routed through the public switched telephone network (PSTN) through the telephone company central office (CCO) to the TTD associated with the CR (0205).
(6) CR (if properly equipped with application specific software) may optionally connect to TMD and get CO info such as CO TTI, picture/logo, GPS location, GPS location translation, etc. (cross-information transmission between STD and TTD may be implemented) (0206).

It should be noted that STD callback in this context may be used by the TMS (0111) to force the STD (0120) to dial more than one TTD (0130) to initiate conference calls and the like. The TTD may or may not be wireless or web-enabled telephone in order to receive calls using TTI addressing. Additionally, if the CO is aware that the NTI has not changed since the last time the CR has been telephoned, then application software on the STD may be configured to skip steps (1)-(3) by accessing a TTI/NTI cache within the STD and if the CR NTI changes then TMS can push or update those STDs which have previously used the CR NTI. In this scenario software resident on the STD can retrieve the NTI from internal memory of the STD without any need to connect to the TMS. As indicated in the method, the TMS incorporates appropriate security measures to ensure authorized access to the TTI/NTI mapping information stored on the TMS.

Alternate System Overview (0300)

Figure 3:
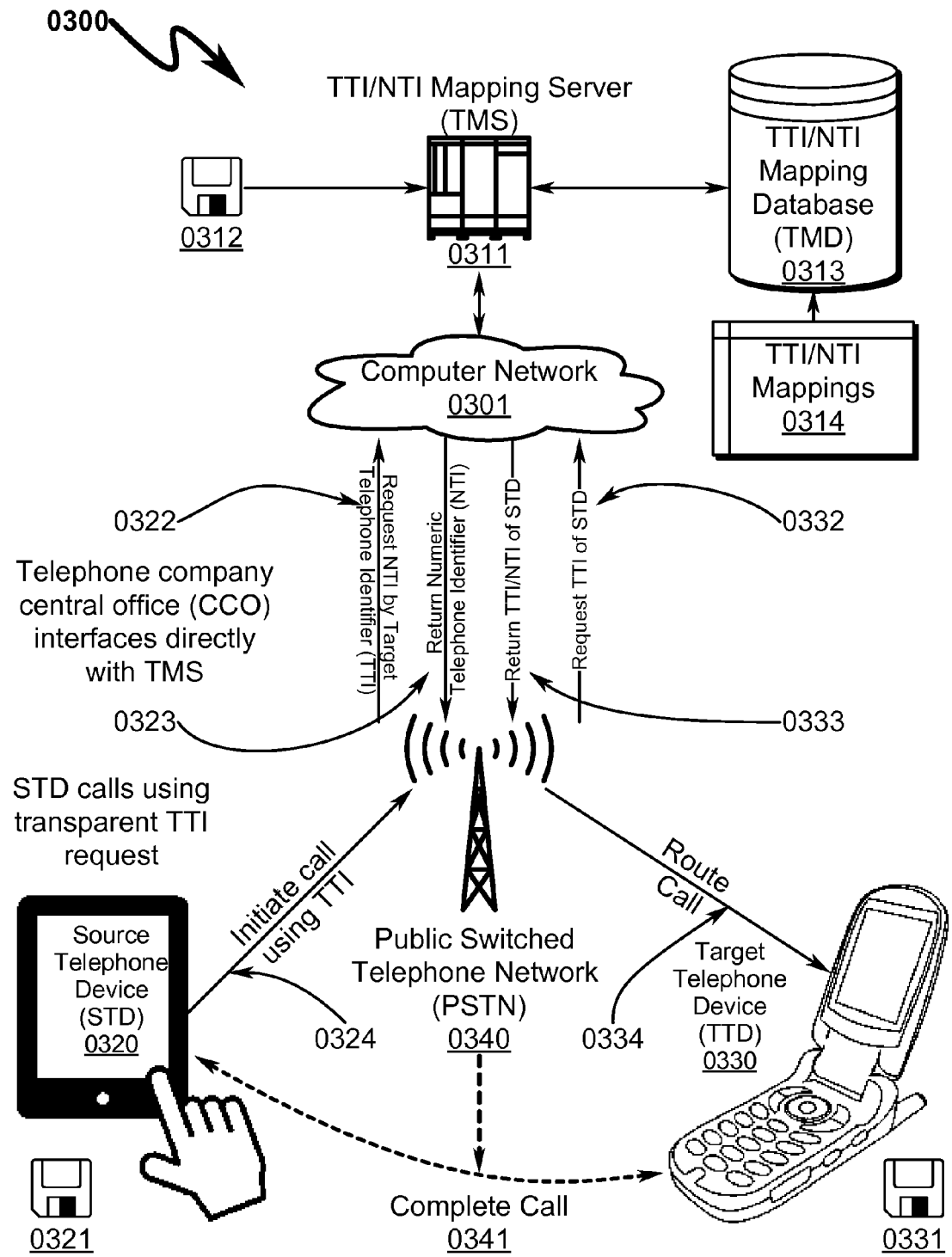
FIG. 3 illustrates a preferred exemplary alternate system embodiment of the present invention.

The exemplary system embodiment as generally illustrated in FIG. 1 (0100) may be embodied in an alternate form as depicted in FIG. 3 (0300) wherein the STD (0320) interfaces with the PSTN (0340) (and the associated telephone company central office (CCO)) using a transparent TTI interface that provides the PSTN (0340) with the TTI data stream (0324) identifying the TTD (0330). This TTI is then indexed using the TMS (0311) by the telephone company central office (CCO) using request (0322)/return (0323) communications with the TMS (0311) and the corresponding TMD (0313) to retrieve the TTI/NTI mapping (0314). Once the telephone company has resolved the NTI from the STD-supplied TTI, the call is routed (0334) to the STD (0330). STD caller information (0332) may be requested of the STD (0320) and the returned TTI/NTI information (0333) passed along to the TTD (0330) for use in a later return call to the STD (0320).

This scenario also permits the CR to connect to connect to the TMD and retrieve CO info such as CO identifier, picture/logo, GPS location, GPS location translation, etc. Thus, information may be bi-directionally transferred between the call originator (CO) and call recipient (CR).

Alternate Method Overview (0400)

Figure 4:
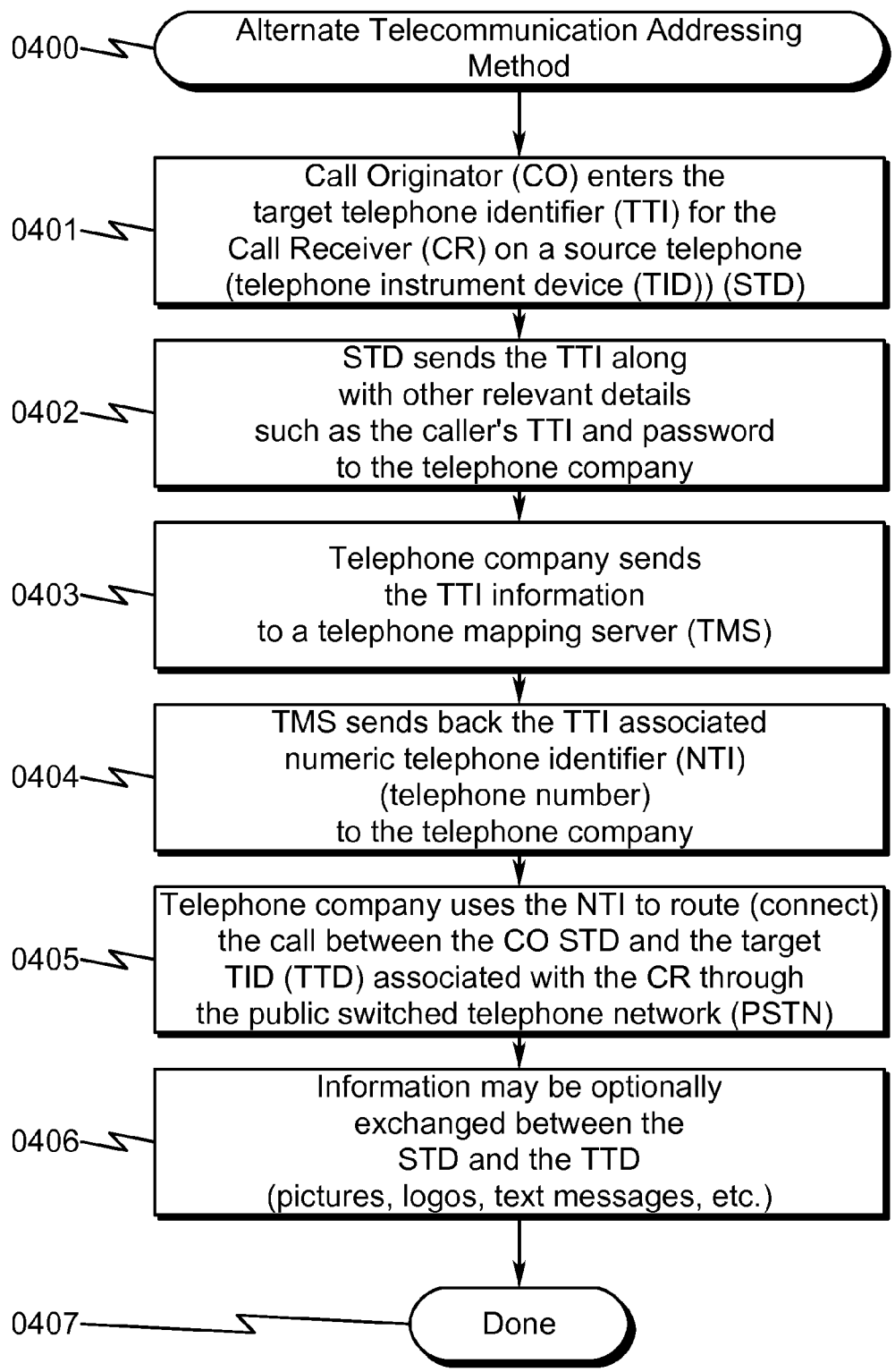
FIG. 4 illustrates a flowchart depicting a preferred alternate exemplary method embodiment of the present invention.

An alternate method associated with the alternate system depicted in FIG. 3 (0300) is generally illustrated by the flowchart in FIG. 4 (0400) and comprises the following steps:
(1) The Call Originator (CO) enters the target telephone identifier (TTI) for the Call Receiver (CR) on a source telephone (telephone instrument device (TID)) (STD) (0401).
(2) The STD sends the TTI along with other relevant details such as the caller's TTI and password to the telephone company (0402).
(3) The telephone company sends the TTI information to a telephone mapping server (TMS) (0403).
(4) The TMS sends back the numeric telephone identifier (NTI) (telephone number) to the telephone company (0404).
(5) The telephone company uses the NTI to route (connect) the call between the CO STD and the target TID (TTD) associated with the CR through the public switched telephone network (PSTN) (0405).
(6) CR (if properly equipped with application specific software) may optionally connect to TMD and get CO info such as CO TTI, picture/logo, GPS location, GPS location translation, etc. (cross-information transmission between STD and TTD may be implemented) (0406).

It should be noted that the TTD may or may not be wireless or web-enabled telephone in order to receive calls using TTI addressing. As indicated in the method, the TMS incorporates appropriate security measures to ensure authorized access to the TTI/NTI mapping information stored on the TMS.

System Integration (0500)

The present invention anticipates a wide variety of system integration contexts, but a preferred exemplary system application context is generally illustrated in FIG. 1 (0100) wherein the STD (0520) (and/or TTD) executes software read from a computer readable medium (0521) that may include a core operating system (0522) in addition to operating system application programming interface (API) (0523) supporting telephone dialing/call processing functions. This API (0523) is used as the software application platform for a telephone user interface (TUI) (0524) application that embodies the present invention functionality with respect to interactions with the TTI/NTI mapping server (TMS) (0511) and the PSTN.

Loading of the TUI (0524) on the STD (0520) (and/or TTD) is typically accomplished by communication with the TMS (0511) over a computer network (0501) using a website interface (0514) to access a software application (APP) database storage (APS) (0514) to retrieve the particular software application components constituting the TUI (0524). Control of this application downloading function within the TMS (0511) is typically governed by software executed within the TMS (0511) that is retrieved from a computer readable medium (0512). While the TMS (0511) is generally illustrated in FIG. 5 (0500) as the source for the TUI (0524) application software, one skilled in the art will recognize that other APP servers may be utilized to accomplish this function apart from the TTI/NTI mapping function normally performed by the TMS (0511).

Figure 5:
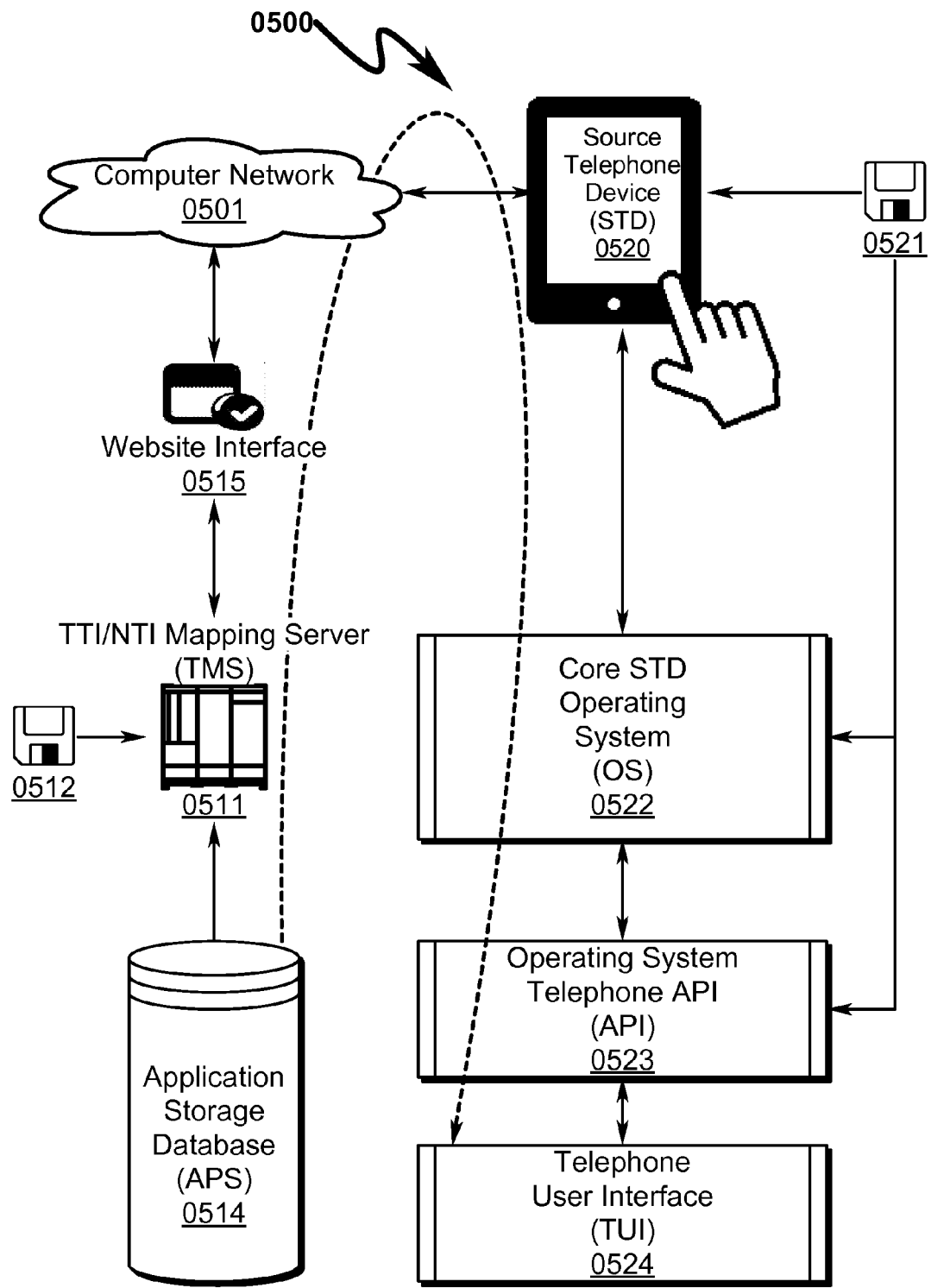
FIG. 5 illustrates an exemplary data flow diagram depicting integration of a telephone user interface (TUI) within a STD and system components supporting remote loading of application software supporting features of the present invention.

It should be noted that the TUI (0524) illustrated in FIG. 5 (0500) is shown as implemented within the context of user application software that is loaded from a remote database (0514), but could equally be implemented as integrated telephone functionality within the OS API interface (0523) and/or the core STD operating system (0522).

TTI Search Methodologies

The present invention permits an individual TTI subscriber to use web-page registration of TTIs and enter a TTI-associated NTI to enable defined classes or groups of individuals to make simple telephone calls using TTIs rather than initiating call processing using a traditional NTI.

A more sophisticated application where corporations are able to maintain their entire list of telephones in a universally structured way in directory tree (like file/folder directory tree on computer) under their corporate TTI is also possible. For example, suppose that Sony has a TTI called 'Sony' under this TTI they list their entire list of Group Participant's TTIs. Callers will be able to browse/search through a company's TTI list to reach a specific person or a department rather than go through the slow and annoying voice menus as currently used.

An originating caller will enter a TTI using QWERTY keys or numeric keypad for forming an alphanumeric TTI (just as the text messages are written). When a TTI user dials a TTI, the software on caller's telephone first makes a very quick and short connection to the global TTI server either thru Internet or any other network including the network used by the telephone companies to make call. Using the call receiver's TTI as the identifier, the software retrieves the telephone number. Based on the comparison of caller's area code, city code and country code, and call receiver's area code, city code and country, software on the TMS concatenates appropriate prefixes to form the final dialing number string. Then software on the server sends the NTI to the caller's telephone and then the TTI software on caller's telephone dials the actual telephone number, or if the telephone company has direct access to the TMS then the company can directly retrieve the telephone number associated with the name and dial the telephone number on caller's behalf without sending it to the caller's telephone and forcing the software on the caller's telephone to dial the number.

Static Vs. Dynamic Call Routing

Currently corporations do use telephone numbers and assign it a name (e.g., 1800flowers). However, these names are tied to fixed telephone numbers (i.e., 1800flowers=1-800-356-9377). If this telephone number changes or if there is a need to add extra digit to the existing telephone number then the name 1800flowers cannot be used to refer to the new number. In this case the assignment of the name to the number is static. However, by using the TTI technology, no matter how many times the telephone number changes, the new number can be assigned to the same TTI without changing the name. According to the teachings of the present invention, the TTI mapping assignment is dynamic.

Phasing Out the Dialing of Telephone Numbers

The present invention allows an individual or corporation to maintain their TTIs and assign one or more telephone numbers to their TTIs at will. This approach brings all the people of the world together in one global community. This can be done without obstructing the telephone companies' current use of telephone numbers. Telephone companies will continue to use telephone numbers at the telephone exchange as dialing codes. However, the public need not be tied to the standards defined by the telephone companies. Initially, people will continue to make telephone calls using TTIs and telephone numbers. However, the present invention makes it possible for explicit NTI usage to be phased out or to be used as a secondary (more primitive) method of initiating telephone calls.

Changes in Sub-Area Code, City Code, or Country Code

The present invention permits the TMS Administrator or the telephone companies to change the actual telephone numbers associated with the TTIs with ease and without the need to bother the subscribers. They can directly make a mass update to the TTI database by computer software and make corrective changes to those telephone numbers that require changes. In other words, telephone numbers associated with the TTIs can be changed by the telephone companies in case of area code change, city code changes etc. Those TTI users can be informed of this change by software-generated email or by text or voice message just as a simple notification rather than a massive public advisory. This does not require change of habit on the public's part. There are no missed calls, wrong numbers, etc. The public will seamlessly continue to dial the same TTIs which they used to dial before the mass update done by the telephone company and the global TTI server will simply provide the latest telephone number associated with the TTI.

TTI Nickname Assignment

When a TTI is displayed on a TTD, the call recipient may assign the STD his/her own nickname, store this nickname on a TMS account and later use the nickname to dial the STD. When the call is made using the nickname the TTI server uses the nickname from caller's account to lookup the actual TTI then lookup the telephone number and then dial the TTI. For example, Mr. John Smith has a TTI is Jsmithlovesfishing. He has distributed his TTI to all his friends and business associates as Jsmithlovesfishing. They dial his TTI as Jsmithlovesfishing. However, his son Mark Smith whose TTI is MarquiMark need not dial Jsmithlovesfishing to call his father. Mark Smith can simply assign a nickname called "Great Dad" to TTI Jsmithlovesfishing under his TTI account MarquiMark. When Mark dials the TTI Great Dad, the TTI server, first checks his account's nickname section to fetch the TTI associated with "Great Dad" which is Jsmithlovesfishing, then retrieves the telephone number associated with Jsmithlovesfishing. In case if TTI server not finding the nickname then it will assume that "Great Dad" is a TTI and dial "Great Dad" as a TTI. This example illustrates the recursive nature of TTI/NTI mapping resolution.

Nicknames need not be globally unique as are TTIs. However, they must be unique for all the TTIs assigned to a telephone number. Multiple subscribers each with different telephone number can give may provide the same nickname.

For example, when calling a doctor, the call originator need not dial the TTI provided by the doctor (e.g., InternistInPrinceton). The call originator see the doctor as 'Primary Care Physician'. The call originator remembers the doctor as 'Primary Care Physician'. So, the call originator has assigned the doctor a nickname called "PCP" and stored it in the caller's TTI account. When viewing the diary on their TTI account over the Internet, it shows both the actual TTI (i.e., InternistInPrinceton) and the nickname PCP.

A telephone call receiver may assign their own nickname to a TTI either via telephone keypad or via an Internet website interface.

Specific Call Blocking

TTI users can turn on 'Do not Disturb' or 'Leave Message' in his/her TTI account. They can set these settings for everyone or for a caller with a specific TTI. When 'Do not Disturb' check box is on the software simply blocks all or a specific caller, say a rude ex-boyfriend. Similarly, 'Leave Message' could be turned on when the user is in a meeting and does not want to be disturbed. When a TTI of a caller is blocked then all the TTIs assigned to the their telephone number may be configured to be blocked.

Caller Specific Ring Tones

Just as the call receiver may block specific callers they can also set different ring tones for different callers and for different TTI dialed by the caller. For example, a doctor-and-lawyer who has two different TTIs for the same number can set one ring tone for those call him on his doctor TTI and a different one for those who call him on the same telephone using a lawyer TTI. The doctor may set a ring tone for family members when they call. So in short, call receiver can set the tones depending on both who calls and what TTI they call. If a family member calls using doctor TTI then the ring tone assigned to the family member will ring even though call receiver has assigned a different ring tone to those who call him using the doctor TTI. The present invention anticipates that these caller-specific ringtones need not always be strictly a jingle or other prerecorded song, but rather can incorporate voice announcements such as "Boss is calling" or other vocalizations that are generated using a text-to-speech conversion software.

Exemplary User Interface Navigation (0600)-(0800)

Figure 8:
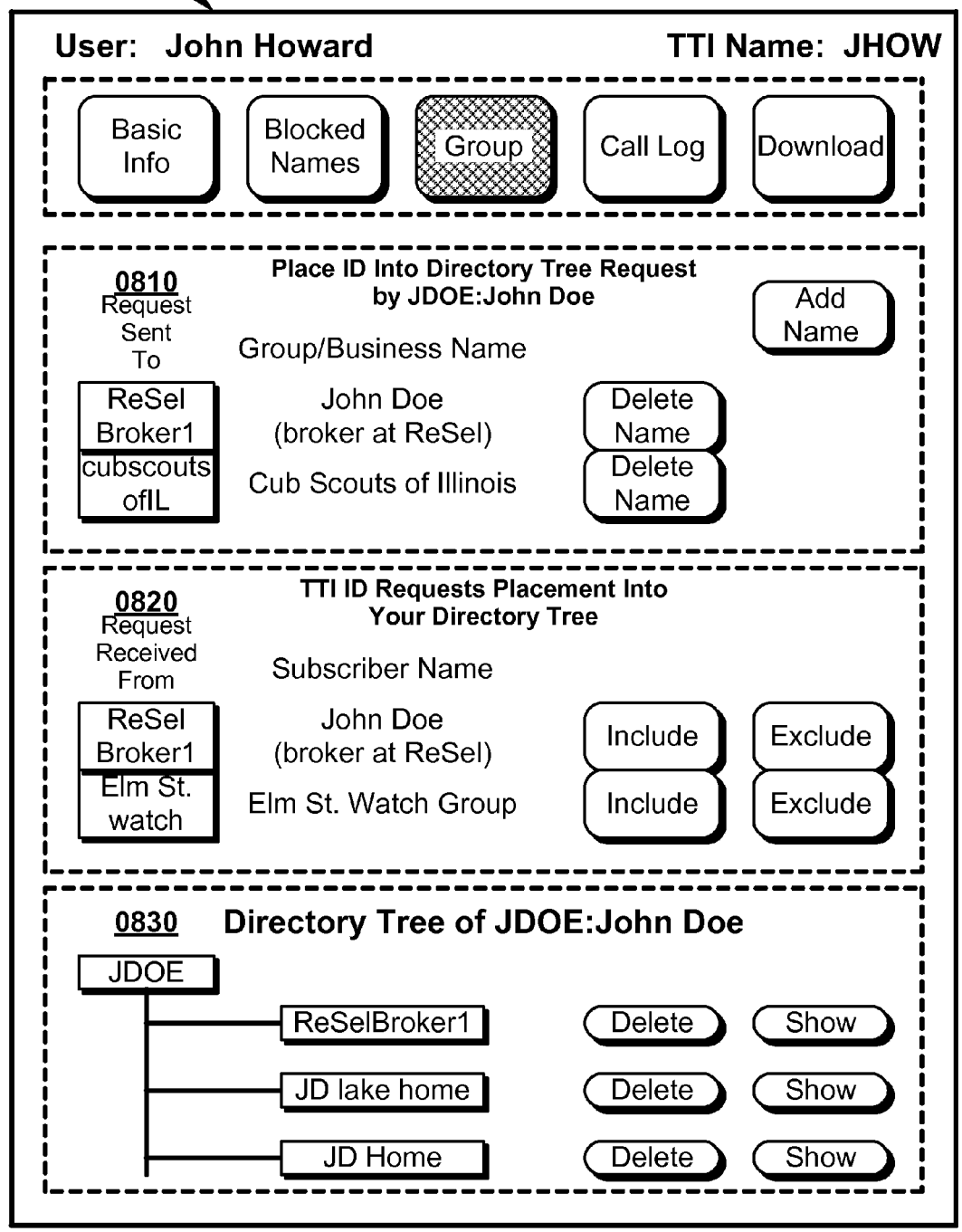
FIG. 8 illustrates an exemplary GROUP PARTICIPATION dialog screen useful in some preferred invention embodiments.

As generally illustrated in FIG. 6 (0600)-FIG. 8 (0800), the present invention anticipates the following information will be included in many preferred embodiments:
Basic Information (0600)
After entering the TTI and password the user may be presented information as depicted in FIG. 6 (0600). Within this page subscribers enter the NTI to be assigned to their TTI. This page generally contains the basic information about the subscriber.
Blocked Names (0700)
This dialog enables the user to enter TTIs from whom they do not wish to receive a telephone call.

Figure 7:
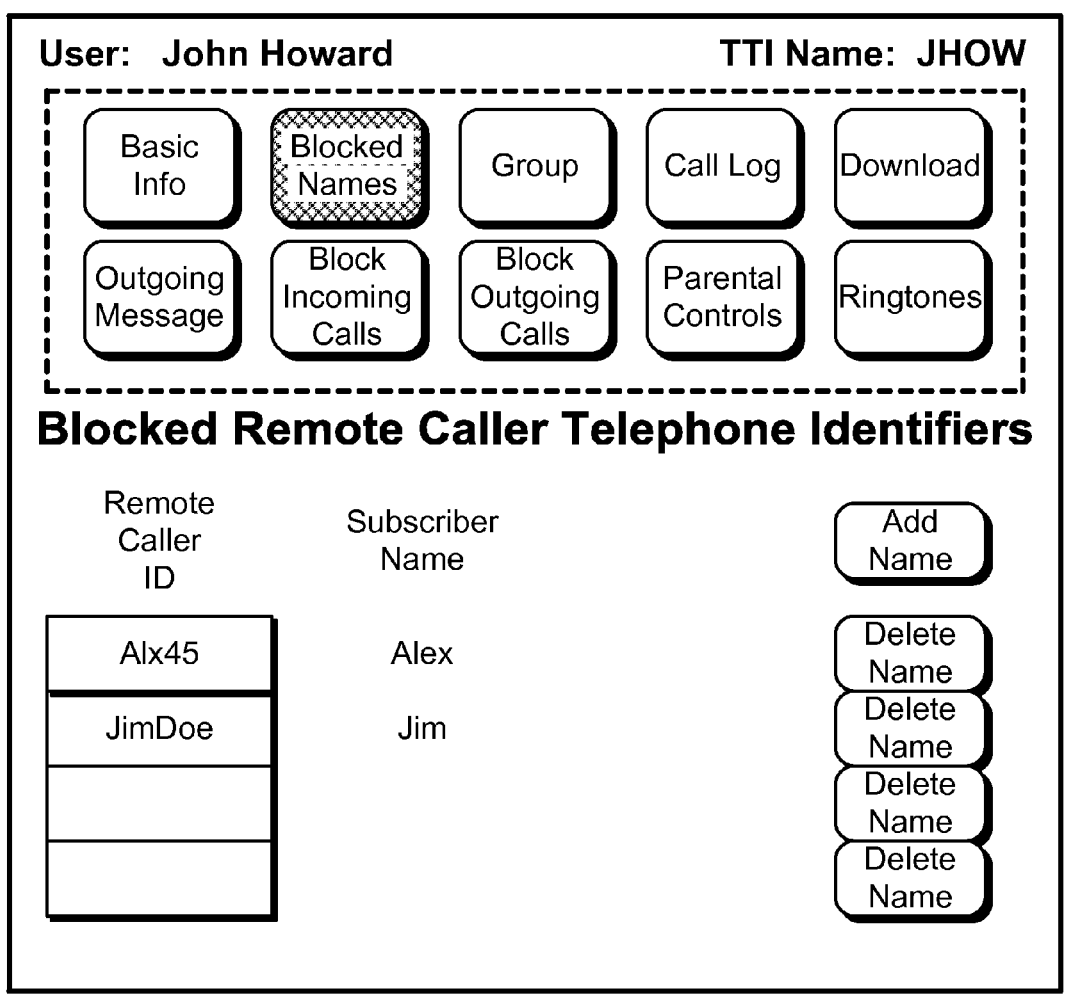
FIG. 7 illustrates an exemplary BLOCKED CALL dialog screen useful in some preferred invention embodiments.

As with other general dialogs depicted herein, row entries may be added with the ADD dialog button and removed with the DELETE dialog button. Similar approaches to the Blocked Names dialog may be applied to tabs/sections listing of TTIs such as the OGM, Ring Tones, Group, etc. dialogs.
General Dialog Options The exemplary dialog screen of FIG. 7 (0700) also generally illustrates that the menu interface may contain a wide variety of options to activate additional dialogs. Those illustrated include in this example include:

Basic Information. This dialog permits the user to define basic information about the TTI/NTI mapping.

Blocked Names. This dialog permits TTIs associated with remote callers to be call blocked.

Group Participation. This dialog allows a given user to associate other TTI trees within their TTI tree. This permits merging information from other users in a cooperative social networking context within a TTI tree and also permits automatic updating of NTI associations within this context.

Call Log. This dialog displays the call log of the user and logs both incoming and outgoing calls. This optional dialog allows the user to see all incoming and outgoing TTIs. This data is not user-modifiable, but does permit the user the option to associate a NICKNAME (TTN) to the TTI. This permits the user to select the TTI by TTN the next time a telephone call to this TTI is initiated. Upon receiving the TTN the TMS will fetch the corresponding TTI associated with the TTN and use it to fetch the corresponding NTI.

Download. This dialog permits software associated with the system to be downloaded from the TMS. This optional dialog allows the user to download the TTI-enabled telephone dialing software onto their mobile device as generally depicted in FIG. 5 (0500). This dialog is generally for smartphones and the like where TTI/NTI software is not an integral part of the operating system.

Outgoing Message (OGM). This dialog permits messages sent out by the user's telephone (or TMS) to be individually defined and conditioned on events defined by the user.

Block Incoming Calls. This dialog permits a variety of incoming call types to be blocked.

Block Outgoing Calls. This dialog permits a variety of outgoing call types to be blocked.

Parental Controls. This dialog permits a parent to define what calls may be made by the telephone and place limits on telephone use.

Ringtones. This dialog permits unique ringtones to be associated with individual TTIs, and may include text-to-voice annunciators for incoming call identification.

One skilled in the art will recognize that this list is not exhaustive of the options available with the user interface.
Group Participation (0800)

The exemplary dialog depicted in FIG. 8 (0800) illustrates a methodology by which a STD user may accept requests from TTD users to modify their TTI trees and incorporate the TTI tree information of third parties. This functionality is described in further detail below.

Group Participation Exemplary Detail (0800)

The Group Participation dialog supports incorporation of TTI trees into other TTI trees under control of the TTI tree owner. This functionality may be generally described in three sections of the exemplary dialog illustrated in FIG. 8 (0800) as described below.

This functionality allows the TTI users to enlist their TTI or link their TTI with other TTIs. For example, John Doe having a personal TTI of JDOE may connect with a realtor for ReSel Realtors whose TTI is ReSel having a work TTI at ReSel of ReSelBroker1.

The objective of this grouping functionality is to permit showing the personal TTI JDOE in ReSel's directory tree and allow ReSel to include ReSelBroker1 in JDOE's personal directory tree.

Request Sent Section (0810)

This Request Sent section (0810) shows list of TTIs to whom the STD have sent requests/authorizations to include a TTI in their TTI directory tree.

For example, at work place, a person may show their personal TTI along with their work telephone number. For example, John Doe may desire to show their personal TTI JDOE along with their work TTI ReSelBroker1. ReSel Realtors cannot just list the TTI JDOE in their TTI directory. They will need John Doe's request/authorization. So, in the Request Sent section (0810) of John Doe's TTI profile, John Doe will enter ReSelBroker1, signifying that JDOE is requesting to be listed with ReSelBroker1. John Doe can add a list of all TTIs in this dialog whom they have sent the request or authorized to list their TTI (e.g., cubscoutsofIL, golfloversofmiami, etc.) or they may selectively add or delete them (see 'Add' or 'Delete' options available in this dialog).

At this time, when ReSelBroker1 is 'Added' via this dialog, this is only a request/authorization. This does not mean that JDOE will automatically appear along with ReSelBroker1 in ReSel's directory tree. For that to occur ReSel Realtors can either accept (i.e. include) or reject (exclude) the request/authorization as detailed in the Request Received section (0820).

However, if John Doe deletes a TTI ReSelBroker1 from the Request Sent section (0810), then the ReSelBroker1 will be removed from the Request Sent section (0810), and John Doe's TTI JDOE will not be in ReSel Realtors "Received Requests/Authorizations" (Request Received section (0820)) and it will also not appear in the directory tree of ReSelBroker1.

Referencing FIG. 8 (0800) and the top portion of the dialog (0810), when a TTI ReSelBroker1 is entered here program on TMS sends a request on behalf of JDOE to ReSelBroker1 and puts the TTI JDOE in ReSelBroker1's Request Received section (0820). The software on the TMS will then populate the Request Received section (0820) of these people with the TTI JDOE and all the TTIs listed here will see JDOE appear in the Request Received section (0820) of their corresponding profile. It should be noted ReSelBroker1 itself will appear under the TTI ReSel, creating a hierarchy of TTIs.

If the DELETE option is selected here the TMS deletes TTI ReSelBroker1 from JDOE's "Request Sent" list.

Software on TMS deletes TTI JDOE from the Request Received section (0820) or the Directory Tree section (0830) of ReSelBroker1 (i.e. TMS software removes JDOE from Requests Received section (0820), if JDOE's request was not accepted by ReSelBroker1 and Directory Tree section (0830), if ReSelBroker1 had already accepted JDOE's request).

The exemplary dialog includes an ADD option or an empty "Request Sent" box to allow JDOE to enter new TTIs for adding additional TTIs to this list.

Request Received Section (0820)

The Request Received section (0820) shows a list of TTIs of other people from whom the STD has received request/authorization to include their TTI in the current TTI directory tree.

Just as John Doe requested ReSel Realtor to show their personal TTI in the Request Sent section (0810), ReSel Realtors may also want John Doe to show their work TTI ReSelBroker1 along with along with their personal TTI JDOE. So, just as John Doe had sent them a request/authorization, now they have sent John Doe a request/authorization to show work the TTI ReSelBroker1 along with John Doe's personal TTI. So now, in the Request Received section (0820) ReSelBroker1 appears, waiting to be accepted so that ReSelBroker1 will appear along/under the personal TTI JDOE. Just because someone sends a request does not mean that the receiver of the request must associate their personal TTI along with their TTI. User options are provided to include or exclude each name in this waiting list. When the user selects INCLUDE, ReSelBroker1 will show in the TTI directory (Directory Tree section (0830)) and if the user selects EXCLUDE ReSelBroker1 will be deleted from the Received Request section (0820) and will not be shown in John Doe's TTI directory.

Referencing FIG. 8 (0800) and the Received Request Section (0820), the TTIs of other people on this section may be received by JDOE. JDOE cannot enter TTIs of other people in this section. So unlike Section (0810) there is no "Add" button in this section. TMS software populates this section when someone enters JDOE's name in their "SENT TO" section (0810).

By selecting the INCLUDE option of this section, JDOE can choose to add these names to his own directory tree. If JDOE selects INCLUDE, then TMS software removes the name from this section and populates it in the DIRECTORY TREE section (0830).

By selecting EXCLUDE options of this section, JDOE can choose to deny the request of the sender. TMS software removes the TTIs from the Received Request section (0820) "without" populating it in the Directory Tree section (0830) of JDOE's profile.

Directory Tree Section (0830)

This dialog area shows all the TTIs that have been accepted by the INCLUDE option in the Received Request section (0820). These TTIs will be currently shown in the TTI directory tree section (0830). This functionality will only allow the user to delete a TTI but not directly add to it. All the additions to this section will come through the Received Request section (0820) as explained above.

The Directory Tree section (0830) may also allow the subscriber to prioritize/arrange and delete the hierarchy of all the TTIs in a tree/org chart format. This section's functionality is similar to a typical file directory tree structure as depicted in a graphical user interface (GUI) such as MICROSOFT® WINDOWS EXPLORER file directory structure. TTIs listed in section (0830) generally depict what is available for the CO to dial under the TTI JDOE in this example.

Some of the TTIs appearing in this section (0830) may show up in the directory tree form when the CO enters a TTI. This will give the CO options to scroll thru all the TTIs available for him to reach a given CR. However some of TTIs appearing in the hierarchy of this section (0830) will NOT show up in the CO STD. These TTIs may be hidden. In order to reach someone thru those hidden TTIs, the CO may be required to input the entire TTI path (e.g., jdoe/jdvacationhome). This display and hidden feature of directory is necessary for big corporations, where they want the public to be able to scroll thru the menu of available operators and receptionists but in order to reach a specific manager/executive the caller will have to be specific as to who they want to reach. For example ReSel/ReSelceo where ReSel is the TTI of ReSel Realtor and ReSelceo is TTI for the CEO. ReSel may not want to publicize the CEO's TTI to everyone. The TTI ReSelceo does not appear on the STD for the ReSel directory tree, but it is still available to the CO.

Just like John Doe, ReSel Realtors may process the requests/authorizations of TTIs received from and sent to different people/businesses. This Grouping of TTI functionality allows a very complex, extremely powerful, and global networking of people, interest groups, and business all over the world, where not just the employee's within a company but also larger groups of people may choose to build a directory tree of their interest groups.

Referencing FIG. 8 (0800) in the Directory Tree section (0830), this section shows all the TTIs which will appear on the CO's screen when they dial JDOE. If JDOE is the only entry here and there are no TTI entries or sub entries here then STD will directly proceed to get NTI and further proceed to initiate the call. However, if there are more TTIs listed here in addition to JDOE (as shown in the Directory Tree section (0830)) then STD will display the directory tree and wait for CO to make selection. Only those TTIs from this section will be shown which have been enabled by the SHOW option.

Just as in the Received Request section (0820) John Doe cannot add TTIs here. These additions must come thru the Received Request Section (0820).

TMS will always populate at least one TTI as a root TTI in this section (i.e. the TTI of the TTI subscriber himself such as JDOE in this example).

Software on TMS or a Web browser may allow the user to manipulate and reorganize the hierarchy in this section in a manner similar to re-organizing a directory tree in a MICROSOFT® WINDOWS® FILE SYSTEM.

The Directory Tree example shown in (0830) depicts a minimal profile and may be expanded for large organizations and corporations.

Exemplary Calling User Interface (0900)

Figure 9:
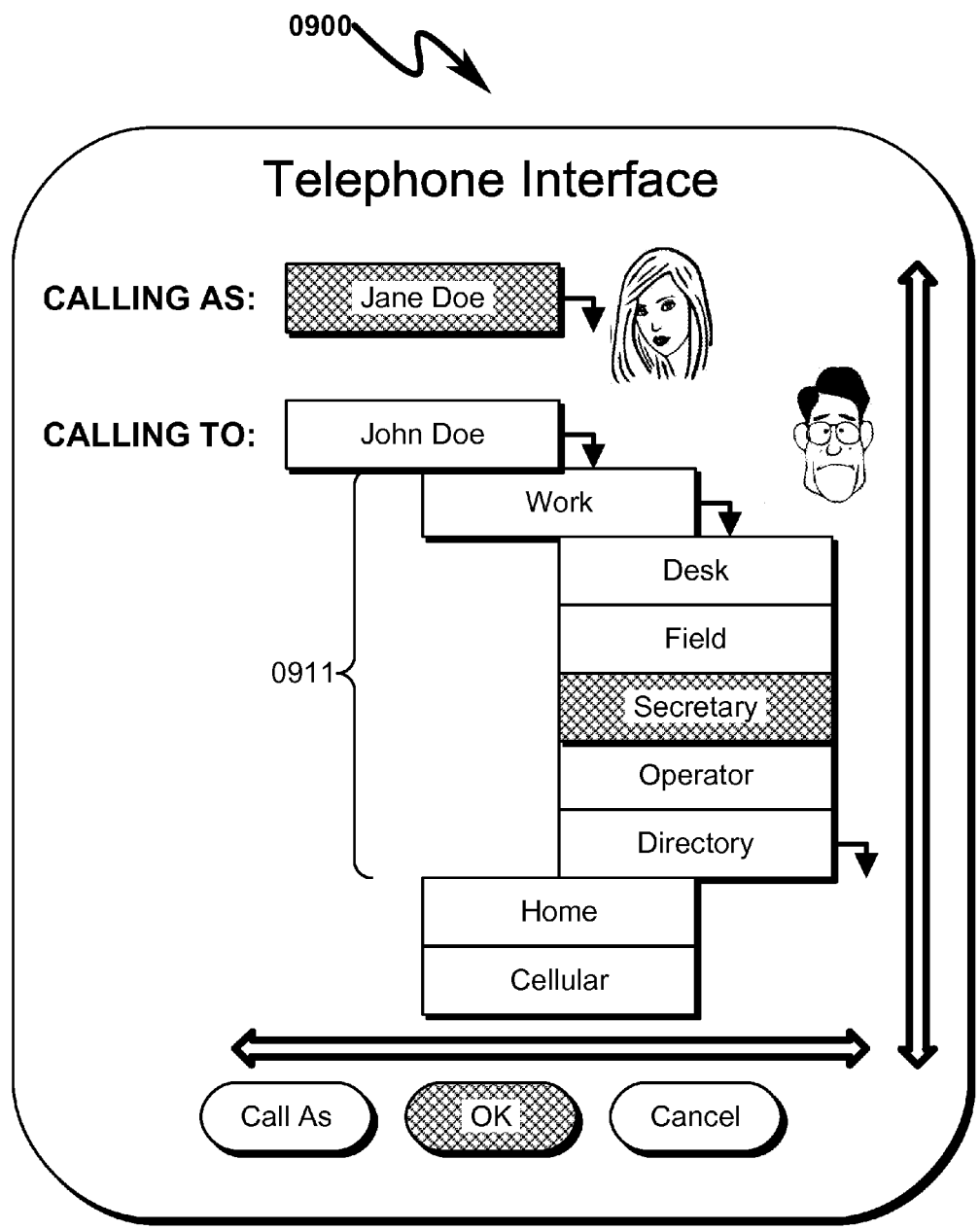
FIG. 9 illustrates a screen dialog depicting an exemplary telephone call initiation data entry layout useful in some preferred invention embodiments.

While the present invention may incorporate a wide variety of call interfaces, an exemplary embodiment is generally illustrated in FIG. 9 (0900) wherein the caller ("Jane Doe") selects from one of several options to call the secretary of "John Doe". Note that this configuration permits a number of dropdown lists (0911) to be associated with the target call receiver and that these lists may be dynamically updated based on the availability of the call recipient and/or their telephone.

In addition to the TTI tag that may be associated with one or more NTIs, the present invention anticipates that graphical icons (including but not limited to photographs, company logos, and other graphical indicia) may be used to identify the TTI graphically. Thus, the tree structure in FIG. 9 (0900) may optionally include a graphical "hot spot" for selection of a given TTI entry. In some preferred invention embodiments the TTI tree may be entirely described using graphical entries with the TTI textual description embedded within the graphical icon definition. This TTI graphical information may be maintained within the TMD and/or the STD/TTD infrastructure.

Furthermore, it should be noted that any of the TTIs depicted may comprise just a NTI in some circumstances.

As generally indicated in FIG. 9 (0900), scroll bars may be implemented within any of the dialogs described herein to provide a means of navigating displayed data structures that are larger than the screen display area.

Exemplary Recipient Autorouting (1000)-(1100)

Figure 10:
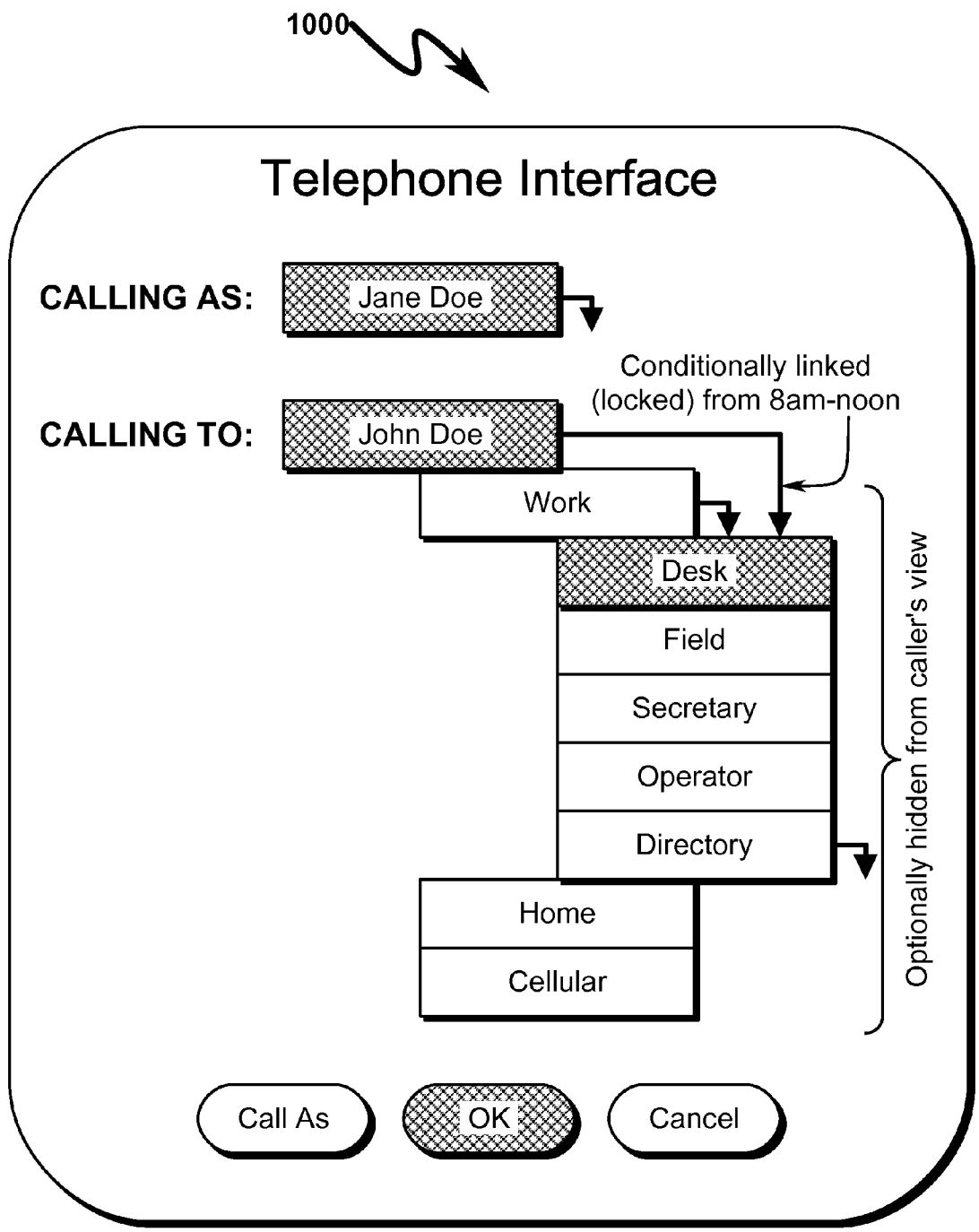
FIG. 10 illustrates a screen dialog depicting an exemplary telephone call initiation data entry layout that shows a time dependent conditional TTI display option.
Figure 11:
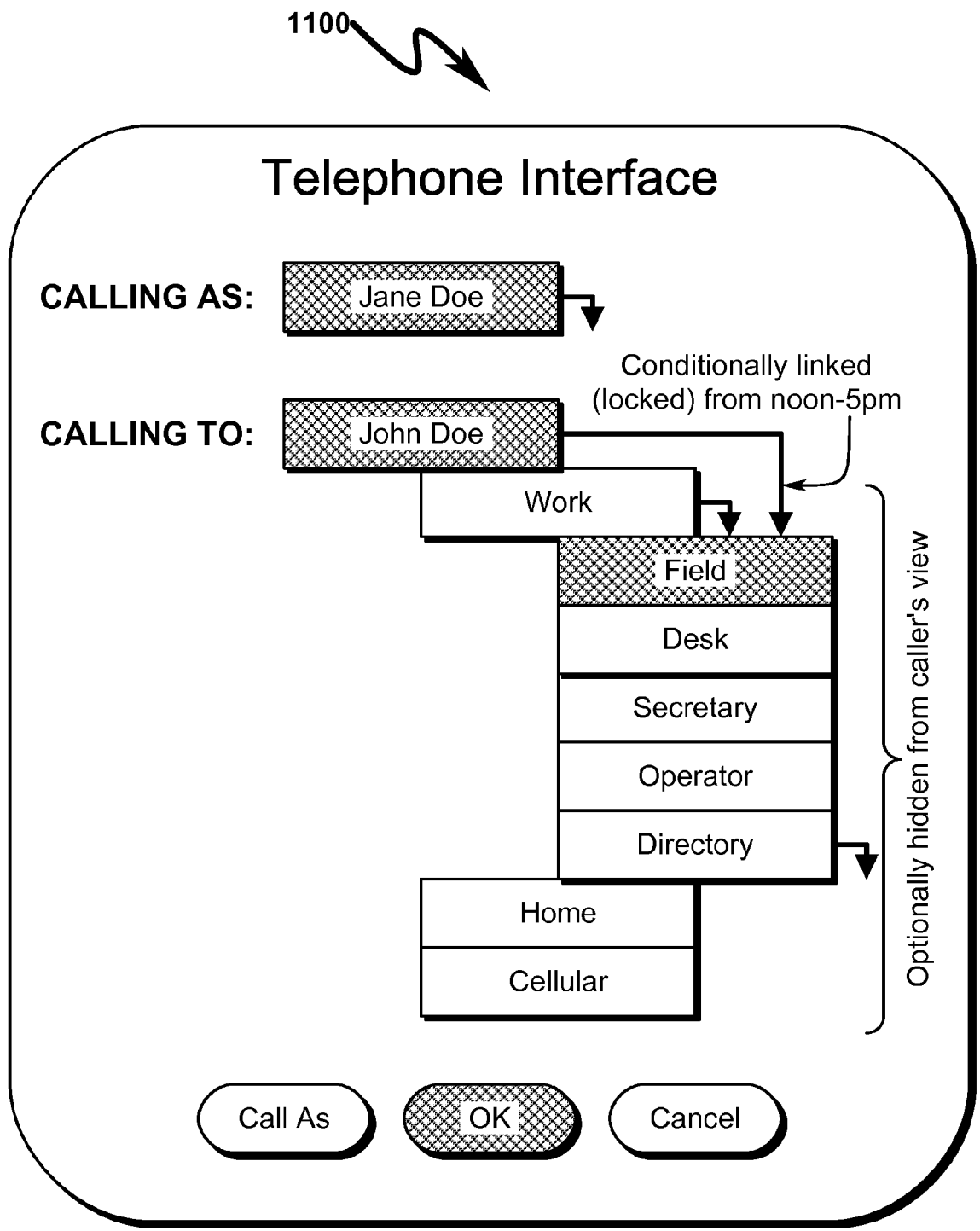
FIG. 11 illustrates a screen dialog depicting an exemplary telephone call initiation data entry layout that shows a time dependent conditional TTI display option.

As will be detailed elsewhere herein, the present invention may incorporate conditional prioritization of TTI/NTI pairings associated with a TTI. For example, a TTI might reference "John Doe" but refer to a list of potential NTIs at which "John Doe" may be reached. This list may be rearranged or modified/augmented/reduced based on a string of conditional events known to or provided to the TMS. For example, the contact for "John Doe" may require communication at the OFFICE DESK during morning hours (as generally illustrated in FIG. 10 (1000)) but during the afternoon any calls should be routed to the FIELD office as generally depicted in FIG. 11 (1100). Note that in either of these circumstances the information below the main "John Doe" entry may be optionally hidden from view so that the call selection and routing occurs automatically and with no additional input or selection by the originating caller. This feature has significant benefits in reaching personnel who are highly mobile and have a variety of communication methods available to them.

Exemplary "Call as" User Interface (1200)

Figure 12:
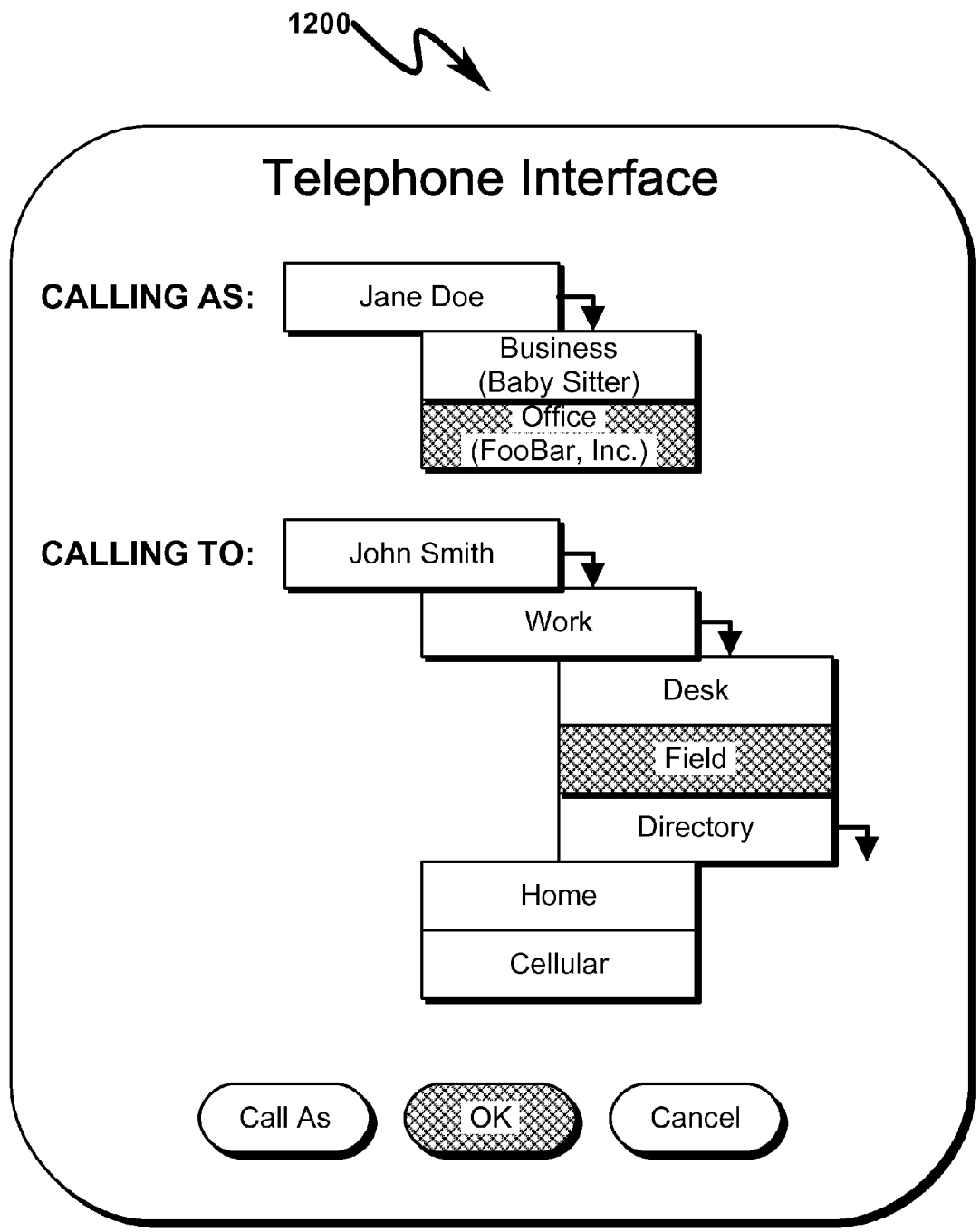
FIG. 12 illustrates a screen dialog depicting an exemplary telephone call initiation data entry layout that shows selection of a "calling as" telephone profile.

A person who has chosen multiple TTIs for just one STD telephone number can also choose which TTI to use while calling someone. For example, a person who is both a doctor and a lawyer who has two different TTIs for the same number can call one client using a doctor's TTI and another person using a lawyer's TTI from the same telephone. This interface is generally illustrated in FIG. 12 (1200) wherein the example provided indicates a call from "Jane Doe" to the field office of "John Smith" and does so with the calling persona of "Jane Doe" being associated with her business function at "FooBar, Inc." Note that this "masking" of STD persona makes it possible for a caller to not only present different telephone personas based on transmitted TTIs to the receiving TTD, it also permits persons who work at home to present a professional persona when communicating with business clients. This feature eliminates the need for a single person to carry multiple phones for multiple purposes. With this feature enabled there is no need for a person to carry separate phones for work and personal use.

The present invention anticipates that this feature may permit the identification of the calling persona to have multiple identification fields. These fields may include but are not limited to the following:

A local persona name that is displayed on the STD menu ("Business"/"Office");
A remote persona name that is displayed on the TTD when the call is received remotely ("Baby Sitter" or "FooBar, Inc."; and
A remote persona name that is defined based on classifications of targeted TTDs (as for example specifying a more formal presentation for some business clients or not displaying photograph icons for some clients.

One skilled in the art will recognize that other modifiers to the basic TTI data structure are possible and thus the structure depicted in FIG. 12 (1200) is only exemplary of many possibilities.

Person-Specific Outgoing Message (OGM)

When the telephone line is busy or when call is not picked up then current telephone setups and answering machines allow only one Outgoing Message (OGM) as a generic message to the caller when the telephone is unanswered or as in the case of telephone setups in the corporations it allows the person a second OGM when the he/she is on the telephone ("I am currently on the telephone"). However, TTI users can setup multiple OGM on the TTI account on the web page, each of which can be played specifically when a person with a predetermined TTI calls. For example, a TTI user may setup a first OGM when their husband calls, a second OGM for the son, a third OGM when the boss calls and wants to leave a message, and a fourth OGM for the general public.

Incoming Messages

Incoming messages may be optionally forwarded to email address set on the TTI account as a voice file.

Internet Based Personal Telephone Diary

The TMS website maintains a log of STD/STI and TTI calls automatically. Thus, the next time when a user changes telephone equipment they simply download all or some of the frequently used 'TTIs' from their TTI accounts. TTI users may also upload current dialing diary from their telephones to their TTI account on the TMS.

User Controlled Call Logs

Software on the TMS or telephone exchange may keep a log of telephone calls. Telephone companies may provide the log of calls along with the telephone invoice. But they give only one log for one telephone number. However, the present invention teaches this control is also in the hands of the TTI users and not the telephone company. Since the public will be able to structure multiple TTIs for one telephone number based on their personal needs, they will also be able to see the separated call logs under each TTI, even though these TTIs belong to the same telephone number.

International TTIs

TTI software may warn the caller if it is about to dial international number. A caller who frequently makes such telephone calls can deactivate the warning.

Enhanced Voice Menu Functionalities Using TTIs

Under current telephone voice menu systems one company voice menu may say "dial 1 for Accounting Department, 2 for Sales" while other company telephone voice menu may state "dial 1 for Sales and 2 for Accounting". Using the TTI/NTI mapping as taught by the present invention, the originating caller dials only the company's TTI without adding a specific department or a person's name, then in additional to voice menus they will be presented the list of departments or employees TTIs on the telephone screen. Instead of waiting for lengthy, annoying, and complicate voice menus currently in use, the telephone interface software installed on these STDs allows the caller to search, scroll, or highlight the appropriate department, business unit, employee, etc., then make a selection and initiate the telephone call.

The same list of TTIs may be accessed by the public via computers, and viewed it in a tree format (just as file directories are shown in Windows Explorer). Businesses often have whole list of complex departments in various locations each having multiple operators. Calling these companies to reach a particular department or an operator is often a very frustrating experience. Callers have to patiently listen to complex menus, make appropriate selections only to find that the person or the department they are trying to reach is either closed/unavailable or it is not the correct department. The use of graphical displays of TTIs in a hierarchical structure within the present invention eliminates this menu complexity and promotes a rapid access method to the communication infrastructure within a company.

Business/Individual Telephone Directory Tree

Individuals and corporations with TTIs will be able to Sub Assign their work TTIs, Fax Names, etc. to their main TTI in Group Participation. In turn they can "Sub Assign" their individual TTIs to their employers TTI Tree. Individuals can list their work TTI under their personal TTI and vice-versa.

Availability Status

The availability status of the people in the department is also shown if they have interfaced their TTI account with the scheduling programs such as MICROSOFT® OUTLOOK® or Lotus Notes. The availability status are further categorized and shown as currently busy on the telephone, out of office, in meeting, do not disturb, out for lunch, be back in 10 minutes or all the blocked time in the outlook can be shown as "unavailable".

When these corporate TTI trees are interfaced with the scheduling software such as MICROSOFT® OUTLOOK® or LOTUS NOTES® then along with the TTIs caller can also see who is in the office, which TTI is busy, who is in meeting and who has do not disturb flag turned on next to their TTI. This will come handy when someone is trying to call a business where most of the operators are very busy. Instead of constantly listening to annoying message "All operators are currently busy", just by giving a glance on the screen a caller can see if most of the operators are busy and what would be the wait time.

Free Operator Selection

Callers directly select the party/operator they are trying to reach; the one who is neither on the telephone or away for lunch, or not in the office. By selecting the party caller's telephone can directly dial the appropriate "TTI" or "Cyber Name".

Attach Company/Individual Logo to the TTI

Along with the TTI, individuals and corporations can store their pictures, logo, drawings, short movie clip, GPS location, GPS location translation, a message etc., on their TTI account. This logo, picture are displayed on the callers screen when they call receivers TTI is dialed by the software. Logos are also displayed when anyone searches for the company's TTI over the Internet.

Global Telephone Directory

As more and more companies and businesses register for the TTIs via the TMS they automatically become part of a global telephone directory, which can be searched by the public on-line.

Reserved TTIs

TTIs such as "Police", "Hospital", "Emergency", may be reserved in some preferred embodiments. When a person dials these numbers then depending upon the local area code the nearest telephone number may be accessed by the system. Department or branches within the police, hospitals, etc. may be sub-assigned to the Police, hospital, TTIs, etc.

Remotely Initiating a Telephone Call

Example 1

When a person is looking for used auto part in local junk yards. He logs into his TTI account on a computer. He browses the TTI website for junk yards in the area. He selects each junk yard on the list and requests a call trigger for selected junk yard. At this time, the TTI web-site sends the TTI of the selected junk yard to his cellphone via SMS, text messaging or similar technology. Upon receiving this message from the web-site, the TTI software on the telephone equipment recognizes it as a legitimate TTI and initiates the telephone call. In this situation, after looking up the TTI on the web-site (either through a computer or through her mobile telephone) the person does not have to punch in the TTI of each junk yard he is trying to reach.

Example 2

Similarly, when Mr. A is searching for TTI of Panasonic's repair department on TTI website. When he finds the department and a specific individual from the telephone list then he need not go to his telephone and punch in the TTI to initiate the call. Instead, upon selecting the TTI on the computer when he clicks the call initiate icon next to it, the TTI web-site sends the telephone number directly to his cellphone via SMS. This will come very handy when someone is shopping and comparing rates.

Non-Internet Users

Those who are not Internet/web savvy can continue to use telephone number instead of name. However, telephone companies can ask them what name they would prefer for their number and open a TTI account for them for use just in case. At present, the telephone companies assign all the telephone owners a telephone number. Similarly, the telephone companies can assign TTIs too.

Synching Calendars

When a TTI subscriber chooses to sync up his MICROSOFT® OUTLOOK® calendar with TTI then he will need to download a software on his computer which will read his calendar event and update the his profile on TTI website. Thus, when another Call Originator (CO) enters a Call Receiver (CR) TTI then the TTI software on CO's name will connect to the TTI website and pull out CR's profile as well as the calendar event. If CR is in a meeting then even before dialing the number the TTI software on caller's telephone will display that CR is in a meeting and whether to proceed with the call or not.

Parental Control/Warning/Call Restriction

A TTI subscriber's TMD profile may also have features such as parental control where parents will be notified for certain restricted numbers. or caller will be allowed to call only those TTIs and telephone numbers which parents have listed in the subscriber's TTI profile.

Child/Parent Identification Feature

When a children are given a TTI profile then this name could be used throughout their life, permanently. Therefore, in case of lost children they can always contact family anytime. Also when the profile is given to law enforcement they can keep permanent tracking on the use of the TTI.

Emergency TTI Feature

Certain TTIs will be 'permanently blocked' & for 'internal use only' and public will not be able to subscribe to them. However they can certainly use them. E.g. Police, Hospital, Fire. All the language translations of the word of these words TTIs will be blocked; e.g. TTI for 'Police' in English; 'Polizia' in Italian; 'policie' in Czech will all be permanently reserved for 'Internal Use Only'.

There will be special method for these TTIs (i.e., when someone dials a one of these TTIs, the software on the server will send to the caller's smartphone, the multiple telephone numbers of nearest Police Department based on the GPS location of the caller). In these cases system will not compare the caller's own telephone number, area code, country code to form a complete telephone number to dial. Instead the complete telephone number will be computed based on the GPS location. Also these telephone numbers will be 'Displayed' and need not be hidden on the caller's telephone. So that for some reason if the caller wants to these numbers directly via another 'Non Smart Telephones' then they can do so.

TTI Case Sensitivity

All TTIs may be configured to be case insensitive. E.g., 'Jim', 'JIM' and 'jim' may be considered one and the same TTI.

TMS Call Initiation

The present invention anticipates that the TMS may initiate communication between two or more cooperating parties by sending messages to TIDs associated with a plurality of STDs and/or TTDs. In this manner it is possible to generate conference calls between a plurality of parties under direction of the TMS. This TMS call initiation system may incorporate interfaces to MICROSOFT® OUTLOOK® or other calendaring software to determine when to initiate these calls.

This feature may be integrated with desktop/laptop/tablet computing devices to permit video or other data to be displayed during the telephone conversation. In some circumstances the computer network will have insufficient bandwidth to support full streaming video/chat but will have sufficient bandwidth to support auxiliary data traffic to the display to augment a telephone call using a cellular telephone or other mobile communication device.

TTI Tree Navigation

The present invention anticipates that a TTI may comprise one or more "paths" that operate similar to a traditional directory tree structure found in many file systems. This tree structure may be navigated using conventional UP (BACK) and DOWN (EXPLORE) tree navigation keystrokes/mouse clicks within a variety of GUI displays that are well known in the art.

TTI Graphical Icons

The present invention anticipates that a given TTI may have associated with it a "shortcut" graphical icon that may be displayed on the STD/TTD during call initiation/execution/completion. In this manner, the TMD may serve as a repository of validated icon information associated with a given STD of known characteristics.

For example, current telephone caller ID features can be "spoofed" using technology that sends false caller ID information to the recipient of a telephone call. By acting as a trusted third party intermediary, the TMS can generate trusted icons and/or other graphical information (such as trusted photos, company logos, receiver-defined graphics, etc.) that are only known to the TMS within the TMD and not generally available to the public. This information can be used to define the user interface on the TTD and thus permit the TTD user to verify the identity of the STD caller.

Call Blocking System (1300)

Call Blocking Overview

The present invention anticipates alternate system embodiments that incorporate a methodology for telephone call recipients to reject unwanted calls by logging the call as a "blocked" call within the TTI/NTI mapping database (TMD). While this call blocking functionality may have many applications, it can effectively be utilized to eliminate "robocalls" (automated sales/marketing calls that are generally prohibited by government agencies such as the Federal Trade Commission (FTC).

The Federal Trade Commission (FTC) has challenged innovators to create solutions that will block illegal robocalls. The solutions sought by the FTC should block robocalls on landlines and mobile phones and may operate on a proprietary or non-proprietary device or platform. The vast majority of telephone calls that deliver a prerecorded message trying to sell something to the recipient are illegal. As technology has advanced over the years, so have the number of illegal robocalls.

Telephone companies typically have no incentive for blocking the robocalls. This is especially true on cellphones as more calls mean more airtime and more revenue for the telephone company. Thus, telephone companies have been slow to implement technology that blocks robocalls.

Exemplary Call Blocking System

Figure 13:
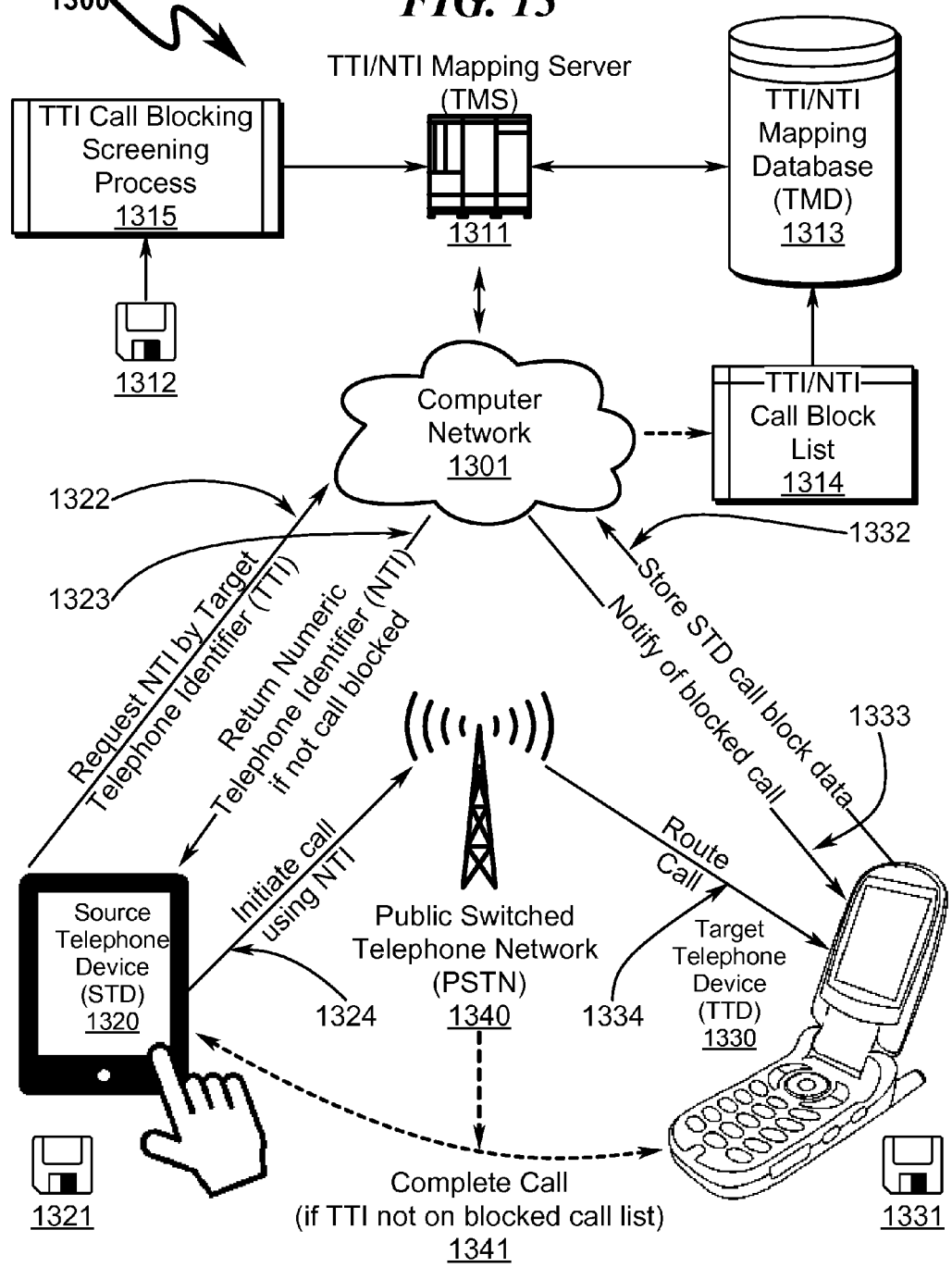
FIG. 13 illustrates an exemplary call blocking system architecture based on TTI/NTI mapping.

An exemplary call blocking system is generally illustrated in FIG. 13 (1300), wherein the system is substantially similar to that of FIG. 1 (0100) with the exception that the TMD (1313) is augmented with a TTI/NTI call blocking list (1314) listing TTIs that are call blocked by the TTD (1330) (or by government or other similar legally mandated NTI (e.g. Fraudsters, etc.)) via control messages (1332) sent to the TMS (1311). The embedded TMS (1311) software (1312) incorporates an additional TTI call blocking screening process (1315) that attempts to match a TTI translation request (1322) from the STD (1320) with the call blocked list (1314) provided (1332) by the TTD (1330). If a match is not detected, the resolved NTI is sent (1323) is sent to the STD (1320). Otherwise, if the TTI is matched to the call blocked list (1314), the TTI is not translated and the call is not completed. Within this context the STD (1320) return message (1323) may incorporate an error message and the TTD (1330) may be notified (1333) of the blocked call. In some circumstances the STD (1320) may not be notified of the rejected call but rather the call may just fail to be processed or initiated to the TTD (1330).

Variants of this system configuration may also use a variety of other keys to activate the call blocking feature, including but not limited to the following:

The resolved NTI of the TTI.
The machine CPU ID of the STD.
SIM card serial number of the STD. A subscriber identity module or subscriber identification module (SIM) is an integrated circuit that securely stores the international mobile subscriber identity (IMSI) and the related key used to identify and authenticate subscribers on mobile telephony devices (such as mobile phones and computers).
URL/IP address of the STD.
IP address of the STD.

Thus, the present invention anticipates that any key that may be used to identify the STD (1320) may be used as the basis (1314) for the call blocking screening process (1315).

As indicated in FIG. 3 (0300), an alternative system implementation of FIG. 1 (0100) may be implemented with the TMS being integrated within the PSTN. The present invention also anticipates that the call blocking system depicted in FIG. 13 (1300) can be implemented within the context of the PSTN as a parallel to the system configuration depicted in FIG. 3 (0300). The details of this implementation are identical to that presented in FIG. 13 (1300) with the exception of the placement of the TMS as being PSTN-integrated.

Call Blocking Method (1400)

Figure 14:
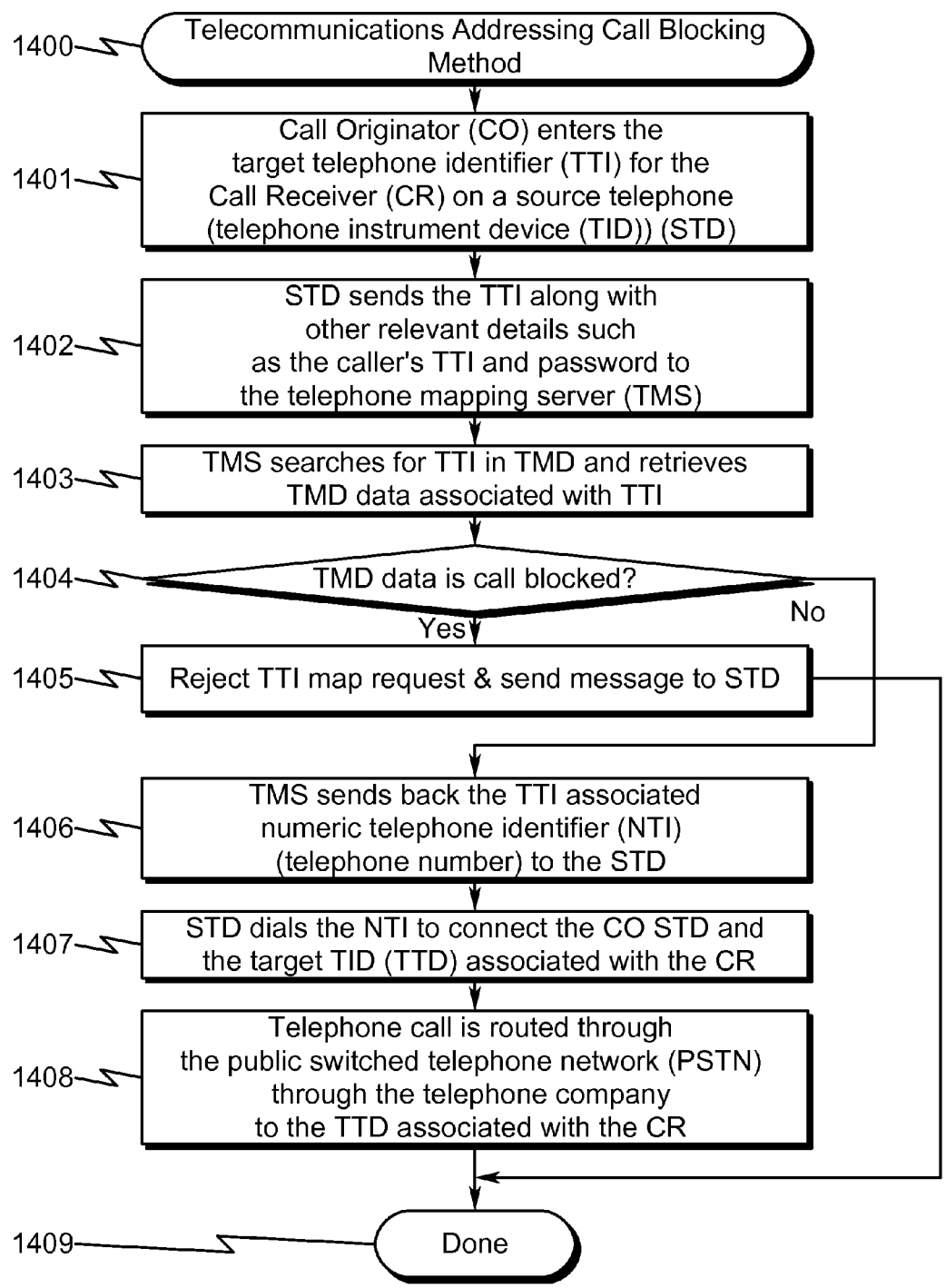
FIG. 14 illustrates a flowchart of an exemplary TTI call blocking methodology useful in some preferred invention embodiments.

A method associated with the system depicted in FIG. 13 (1300) is generally illustrated by the flowchart in FIG. 14 (1400) and comprises the following steps:

(1) The Call Originator (CO) enters the target telephone identifier (TTI) for the Call Receiver (CR) on a source telephone (telephone instrument device (TID)) (STD) (1401).
(2) The STD sends the TTI along with other relevant details such as the caller's TTI and password to the telephone mapping server (TMS) (1402).
(3) The TMS searches for the TTI within the TMD and retrieves TMD data associated with the TTI (1403).
(4) The TMS determines if the associated TMD data is call blocked from access by the STD, and if not, proceeds to step (6) (1404).
(5) The TMS rejects the TTI mapping request and issues an error message to the STD and proceeds to step (9) (1405).
(6) The TMS sends back the numeric telephone identifier (NTI) (telephone number) to the STD (1406).
(7) STD dials the NTI to connect the CO STD and the target TID (TTD) associated with the CR (1407).
(8) The telephone call is routed through the public switched telephone network (PSTN) through the telephone company central office (CCO) to the TTD associated with the CR (1408).
(9) The method is terminated (1409).

Within this context a variety of optional activities are anticipated, and may include informing the STD and/or TTD of the blocked call. Note that blocked calls can be used in some circumstances to block calls while the TTD is determined to be scheduled for a meeting or other blocked activity (present in a movie theater as determined by GPS, etc.)

Exemplary TTI Definition System/Method (1500)-(1600)

Exemplary TTI Definition System (1500)

Figure 15:
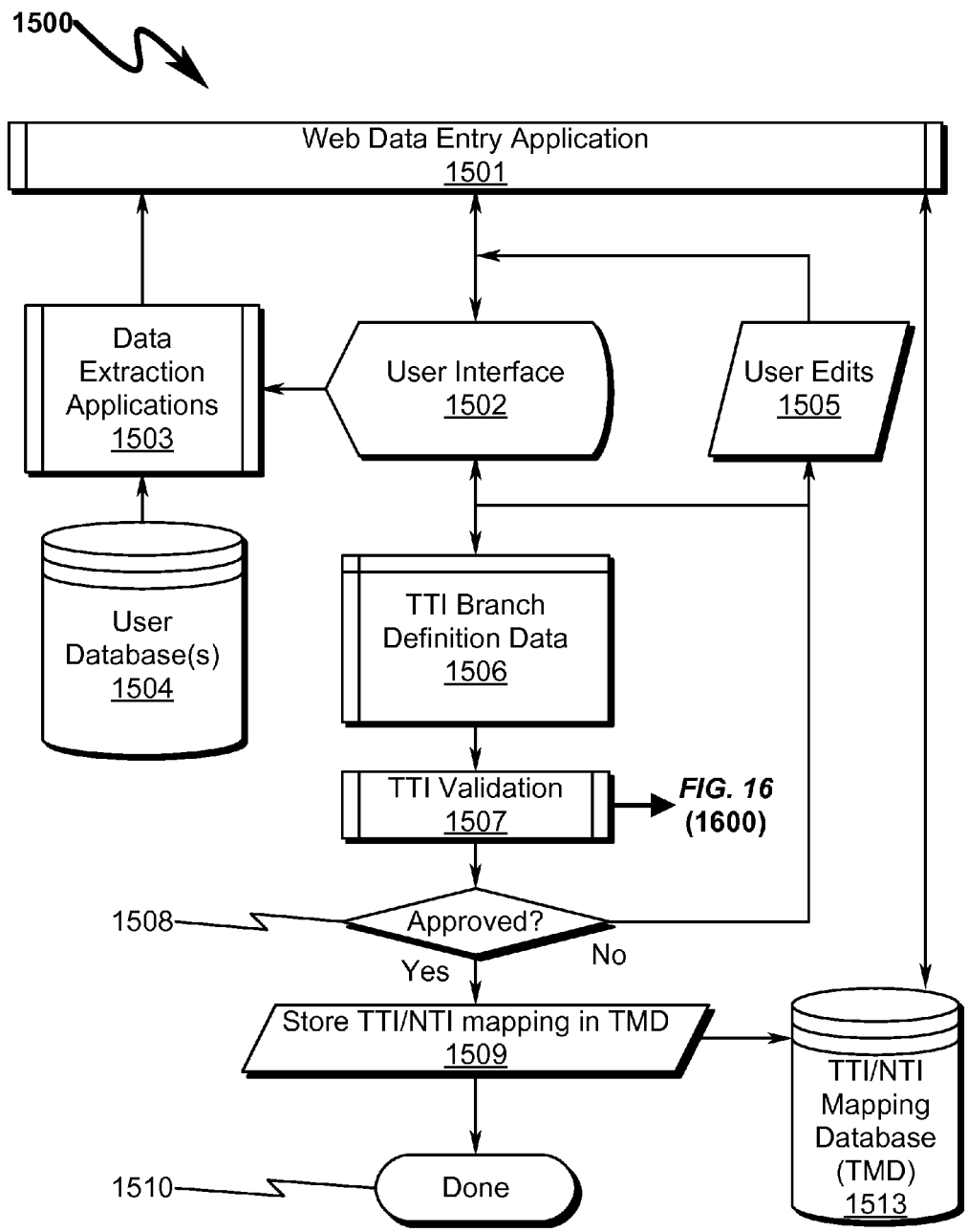
FIG. 15 illustrates an exemplary data flow diagram describing how TTI information is entered, validated, and stored within the TMD.

While the present invention anticipates that many methodologies may be employed to permit a user to create a TTI/NTI mapping entry within the TMD, an exemplary system configuration to accomplish this is generally depicted in FIG. 15

(1500). Here the system operates using a web-based data entry application (1501) (generally executed on a computing device running software read from a computer readable medium) that interfaces with a user interface (GUI) (1502) (generally a web browser or other GUI). This GUI (1502) may be augmented by data extraction applications (1503) that operate on user data (1504) to extract TTI/NTI information for processing by the web application (1501) for storage in the TMD (1513).

The user generally interacts with the GUI (1502) to define various TTI/NTI associations and associated parameters and conditionals, editing this information (1505) within this context as necessary. This results in an internal data structure representing TTI branch definition data (1506). Once this process is completed, the TTI branch definition data (1506) is processed by a TTI validation process (1507) that is further detailed in FIG. 16 (1600). If the validation process (1507) indicates an approved TTI (1508), the TTI/NTI branch definition data (1506) is then stored (1509) in the TMD (1513). An approval failure is generally followed by additional user edits (1505) within the web application (1501).

Note that the system as illustrated may permit TTI definitions for NTIs not associated with telephones that are Internet-enabled. For example, it is possible using this system to define TTIs for conventional "landline" telephone, PBXs, etc. that are not capable of communicating with the TMS/TMD as described herein.

Exemplary TTI Definition Method (1600)

Figure 16:
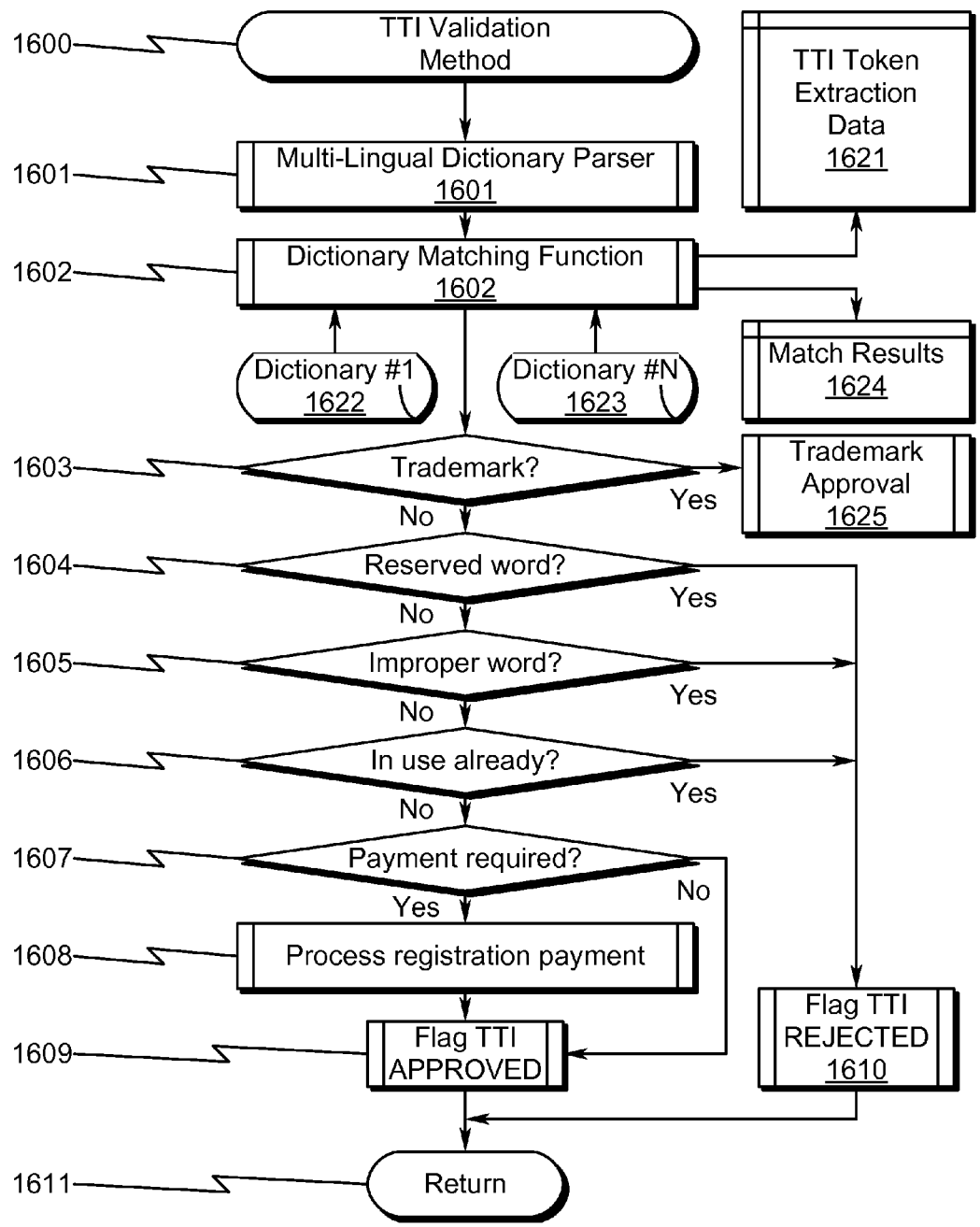
FIG. 16 illustrates a flowchart of an exemplary TTI validation methodology useful in some preferred invention embodiments.

An exemplary TTI validation process associated with this system is generally illustrated in FIG. 16 (1600) wherein the method generally includes the following steps:

(1) Process the proposed TTI with a multi-lingual dictionary parser to extract token trees from the TTI string and place them in a local TTI token data structure (1621) for further evaluation (this breaks up the TTI into portions that may have meaning in a variety of languages) (1601);
(2) Match the TTI tokens (1621) against a number of dictionaries (that may be multi-lingual) (1622, 1623) to produce a set of comparison match results (1624) that will be used to determine TTI validity (1602);
(3) If the TTI match (1624) indicates that the TTI may include a trademark, perform a trademark approval process (1625) to ensure the user has authorization to use the trademark (1603);
(4) If the TTI match (1624) indicates that the TTI is reserved word, proceed to step (10) (1604);
(5) If the TTI match (1624) indicates that the TTI is an improper (foul/vulgar) word, proceed to step (10) (1605);
(6) If the TTI match (1624) indicates that the TTI is already in use by another user, proceed to step (10) (1606);
(7) If payment is not required to register the TTI, proceed to step (9) (1607);
(8) Process a user payment for registration of the TTI (1608);
(9) Flagging the TTI as APPROVED and proceeding to step (11) (1609);
(10) Flagging the TTI as REJECTED (1610); and
(11) Terminating the validation method (1611).

Here it can be seen that the TMS serves as an authentication gateway to ensure that TTI identifiers satisfy a host of constraints to make them unique, reliable, and secure. One skilled in the art will recognize that the list of validity checks detailed in FIG. 16 (1600) is only exemplary of other types of validation that may occur during the TTI registration process.

TTI Hierarchical Path Structure (1700)-(1800)

Figure 17:
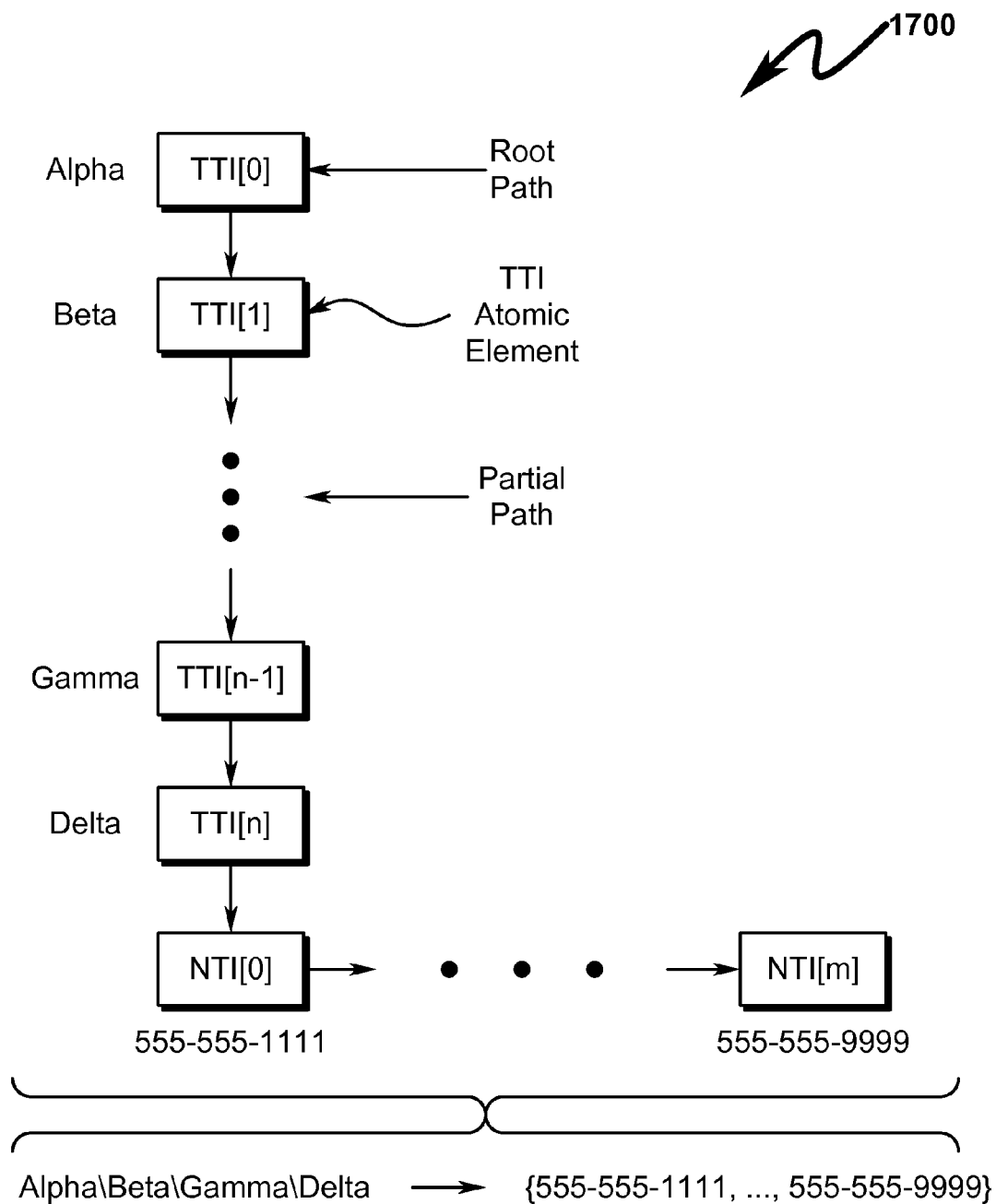
FIG. 17 illustrates an exemplary TTI hierarchical data structure (note that the term hierarchical data structure should not be confused with very old databases termed "Hierarchical Databases"; more advanced databases such as Oracle, DB2, etc. are termed relational databases)

The TTI may incorporate a hierarchical path structure as detailed in FIG. 17 (1700). Within this context, a specified TTI mapping may incorporate a tree structure and be specified to incorporate any path along that tree structure. As detailed in FIG. 17 (1700), the path "Alpha\Beta\ . . . \Gamma\Delta" would point to the resulting NTI incorporating the telephone numbers "{555-555-1111, . . . , 555-555-9999}." The present invention teaches that partial paths including only a portion of the full path may be used to specify the resulting NTI. For example, use of "Delta" as the partial path would resolve to the first tree element matching that term, or the full path "Alpha\Beta\ . . . \Gamma\Delta". Similarly, specification of "Beta" would result in "Alpha\Beta" with the path being truncated at that point indicating no terminal NTI elements but resolving to include the remaining tree elements " . . . \Gamma\Delta" as potential paths to follow.

Figure 18:
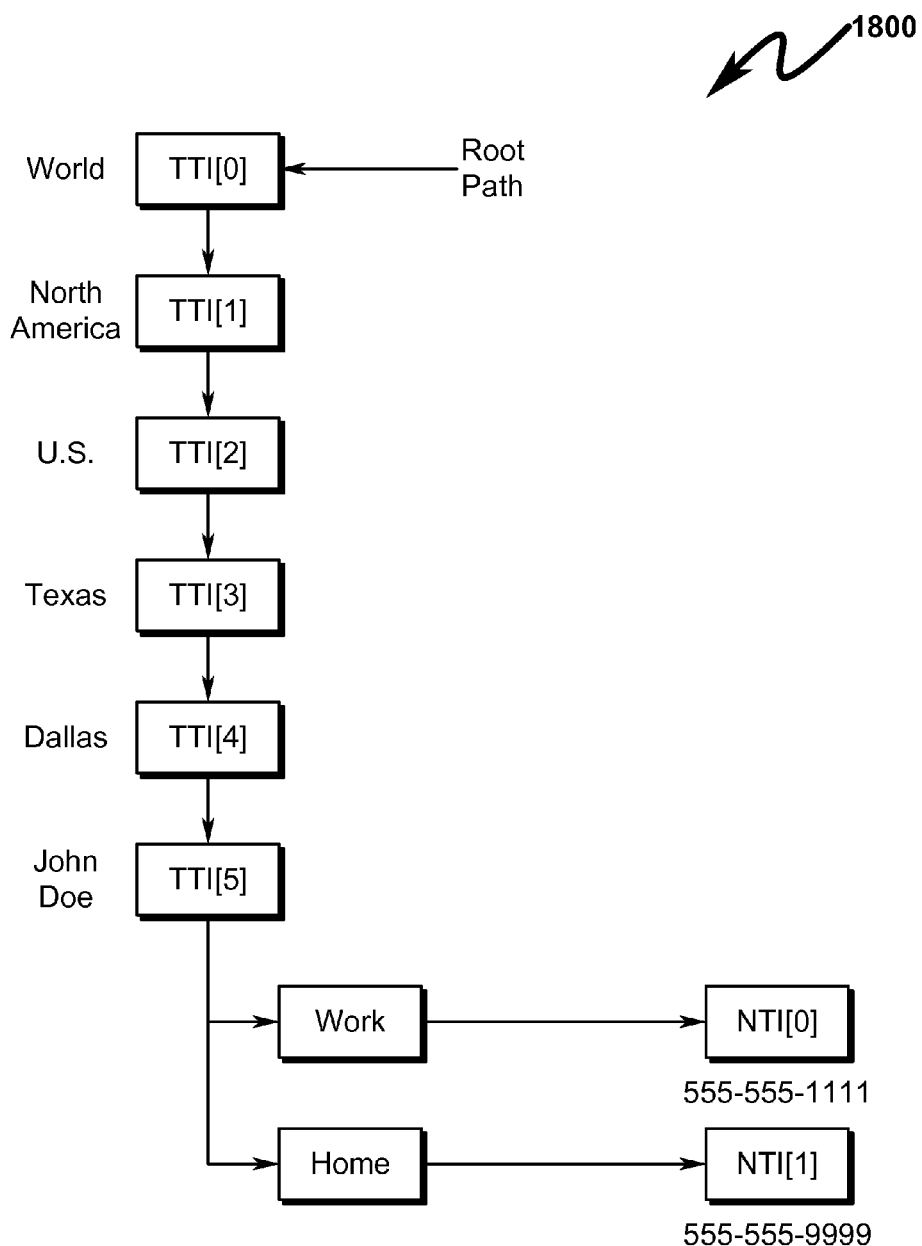
FIG. 18 illustrates an exemplary TTI hierarchical data structure depicting a geographic hierarchy.

This hierarchy may be used to define geographical or other relationships between various TTI atomic path elements. For example, as generally illustrated in FIG. 18 (1800), a geographic TTI path could be defined for "John Doe" located in "Dallas, Tex." to be "World\NorthAmerica\U.S.\Texas\Dallas\JohnDoe" which would resolve to two potential TTI paths including "Work" (555-555-1111) and "Home" (555-555-9999). This type of hierarchy can permit localization of individuals/businesses/etc. to a particular geographic region.

Local TTI Tree Branch Control (1900)

Figure 19:
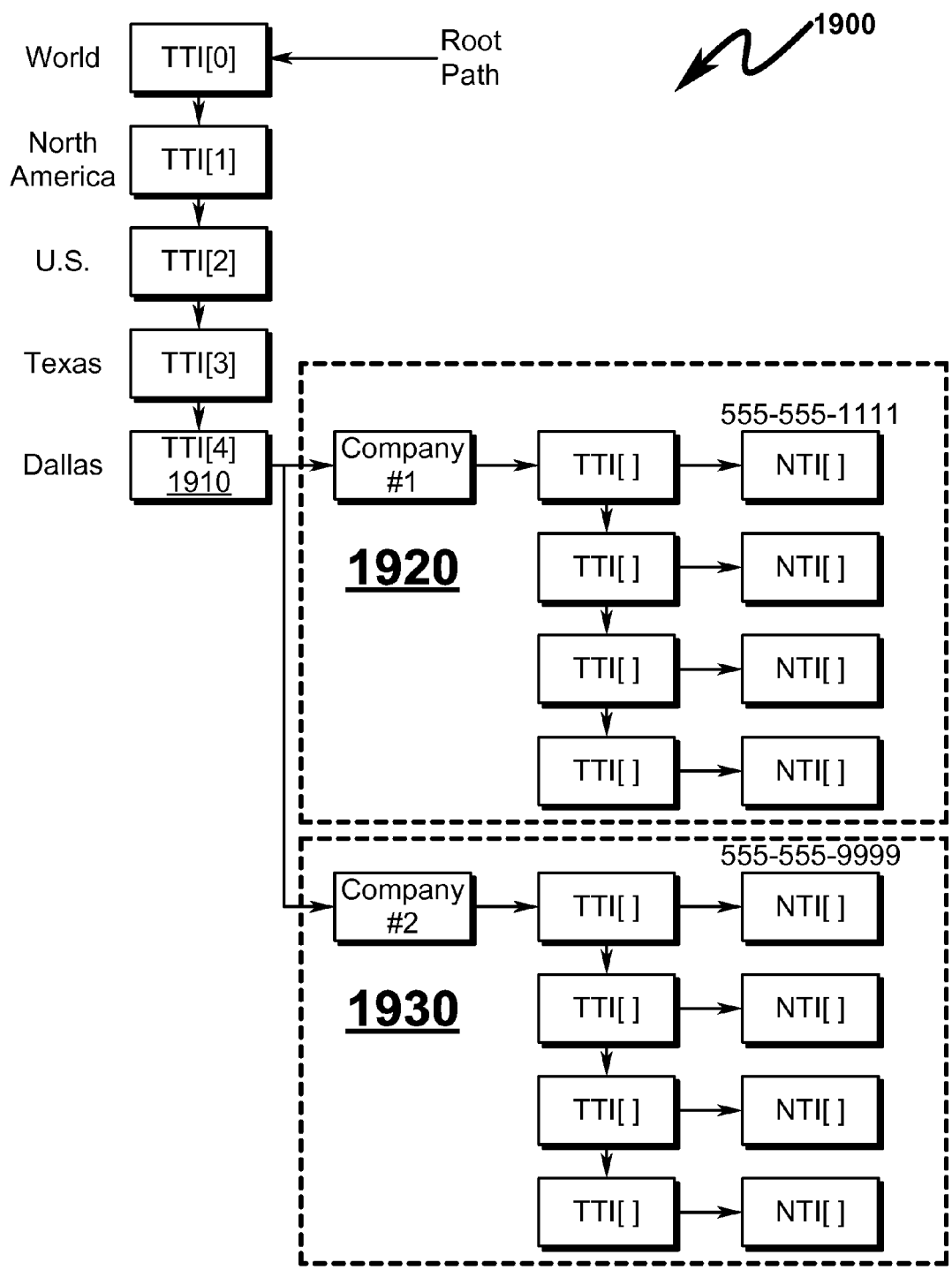
FIG. 19 illustrates an exemplary TTI hierarchical data structure depicting localized control of a TTI branch.

The present invention anticipates that the TTI trees depicted in FIG. 17 (1700)-FIG. 18 (1800) may incorporate branches that are controlled and managed independently of the main TTI tree. As generally depicted in FIG. 19 (1900), a TTI branch head (1910) at any level can reference one or more branch trees (1920, 1930) that may be independently maintained and controlled by separate entities such as companies or individuals. Thus, changes within the individual TTI branches (1920, 1930) can be maintained by the individual owners of the branches and automatically updated within the overall TTI root NTI lookup structure.

TTI Search Path (2000)

Figure 20:
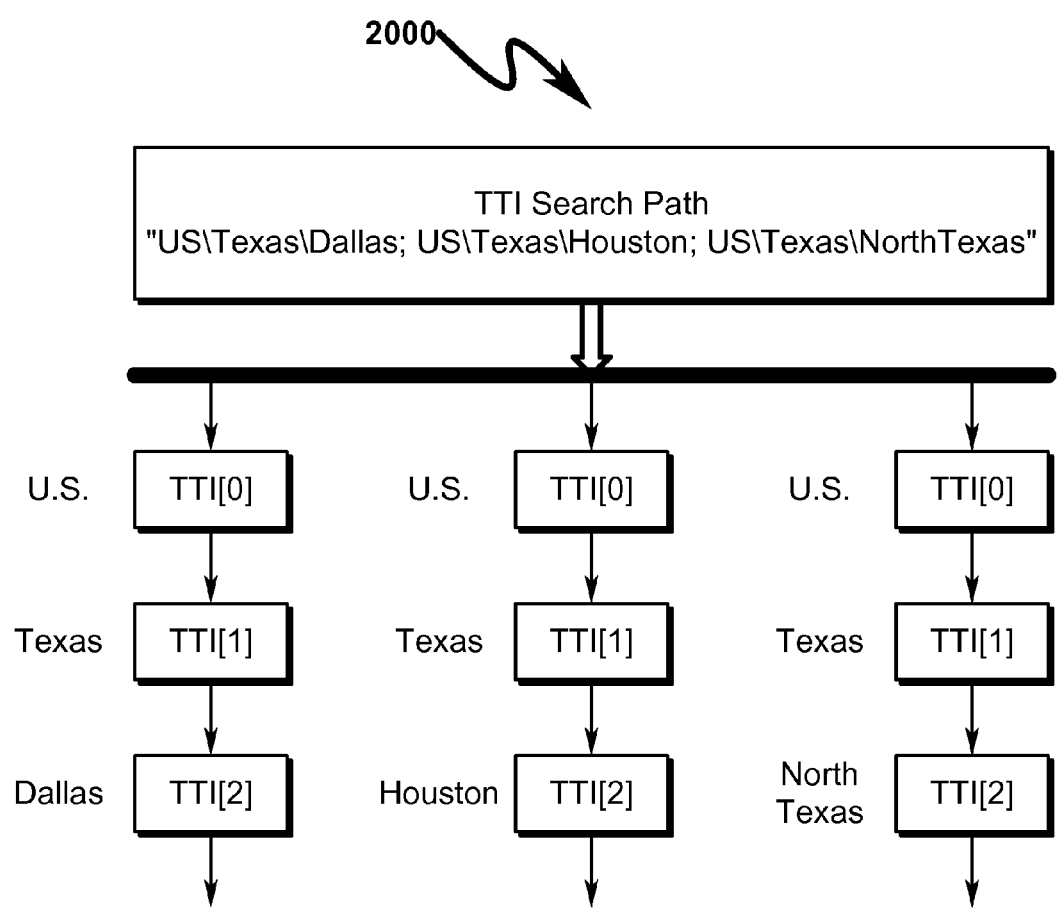
FIG. 20 illustrates an exemplary TTI search path hierarchy.

Within any application interfacing with the TMS there is anticipated to be a mechanism for defining set of "search paths" associated with list of TTI trees from which a user may set their localized "environment" for TTI searching. For example, as illustrated in FIG. 20 (2000), a search path might be of the form "US\Texas\Dallas; US\Texas\Houston; US\Texas\NorthTexas;" which would search these individual search paths to find the TTIs matching data entered in to a user dialog box. This search path methodology may incorporate a wide variety of other types of TTI groupings. For example, it is possible to define a search path including the terms "LinkedIn\NewsGroup" or "Facebook\Friends" to incorporate potential telephone number information associated with a LINKEDIN® "NewsGroup" group or to scour for information on your "friends" within FACEBOOK®.

TTI Access Control Lists (ACLs) (2100)-(2200)

The present invention may in some preferred embodiments implement the use of Access Control Lists (ACLs) that permit modification of TTI entries to incorporate TTI links provided by parties other than the owner of the TTI hierarchy. In this fashion, a TTI hierarchy can be managed by a TTI owner, but the TTI owner may permit insertion of TTI information not managed by the TTI owner within the TTI hierarchy.

Figure 21:
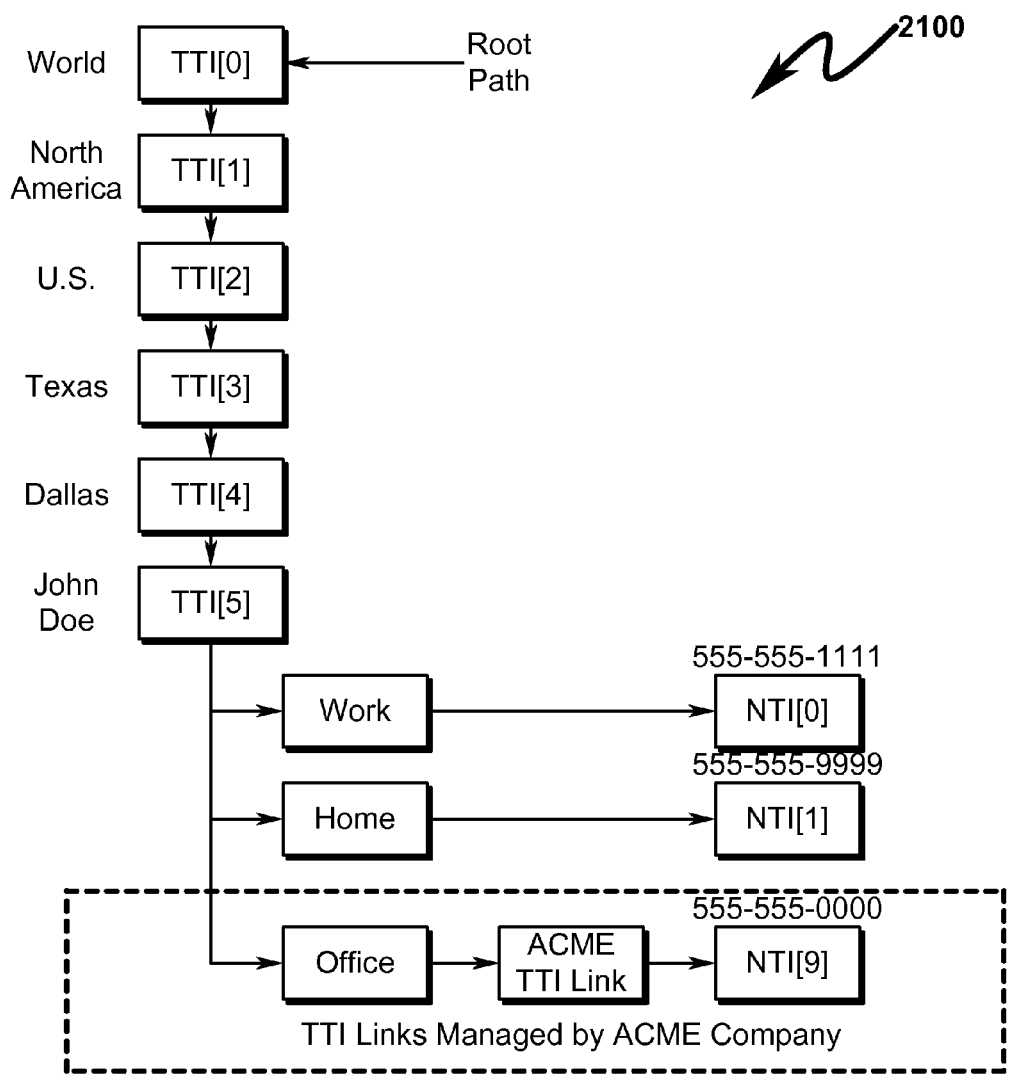
FIG. 21 illustrates an exemplary TTI search path hierarchy incorporating a TTI entry managed by a third party.
Figure 22:
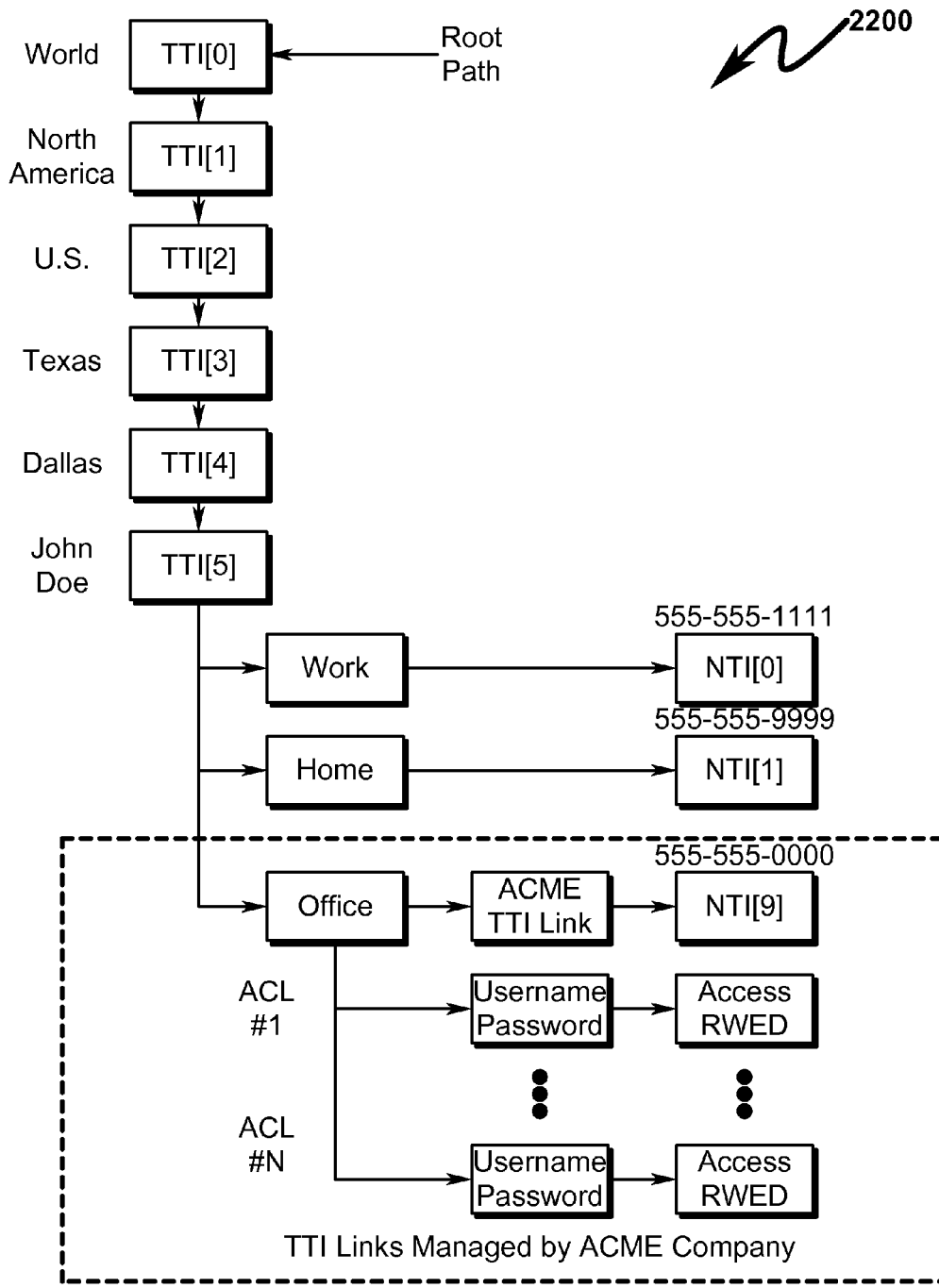
FIG. 22 illustrates an exemplary TTI search path hierarchy incorporating a TTI entry managed by a third party secured with an Access Control List (ACL)

An example of this is generally illustrated in FIG. 21 (2100), wherein the OFFICE TTI link (and its associated hierarchy) is managed and controlled by ACME Company and not JOHN DOE, the owner of the TTI tree. The ability to modify the OFFICE link may be in many forms, but many preferred forms may use an Access Control List (ACL) as indicated that associates a username/password chain with a given TTI chain element as generally illustrated in FIG. 22 (2200). Each username/password combination may be associated with an authorized access mode (for example: R—read TTI; W—write TTI; E—call TTI; D—delete TTI). One skilled in the art will recognize that other forms of authorization access may be incorporated in this generalized ACL structure.

Outgoing Call Blocking (2300)

Figure 23:
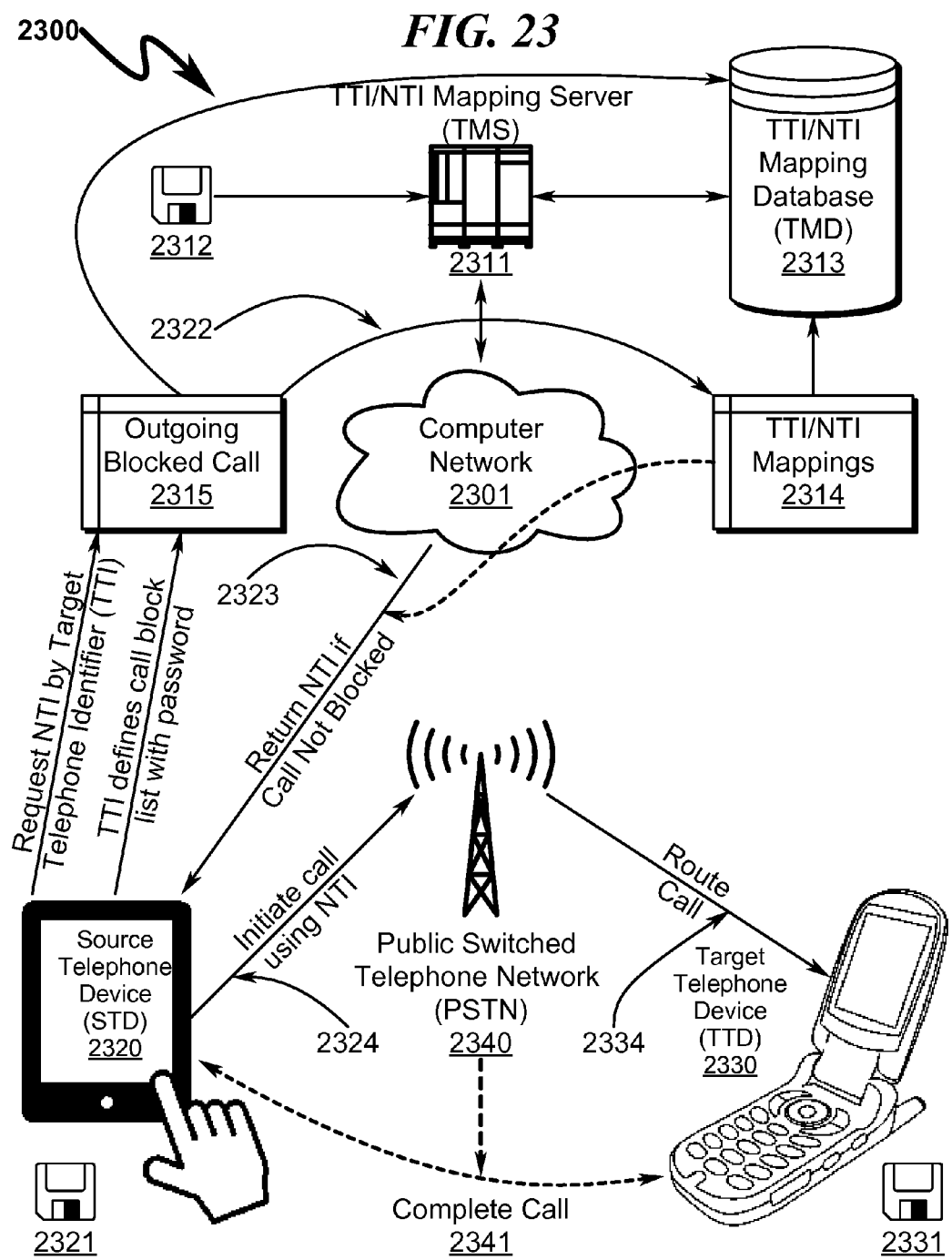
FIG. 23 illustrates an exemplary system embodiment incorporating outgoing call screening.

As generally depicted in FIG. 23 (2300), the present invention anticipates that in some preferred embodiments the STD (2320) may define (2326) (under password control) an outgoing call blocked list (2315) that may be integrated in the STD (2320) and/or the TMD (2313). This call blocked list (2315) permits outgoing calls to be screened such that the outgoing TTI call request (2322) is first screened by the blocked call list (2315) before being matched (2325) against the TTI/NTI mappings (2314) within the TMD (2313). This feature permits parental (or other) controls for outgoing calls to limit the scope of calls that may be placed from the STD (2320), and may incorporate country/area/exchange blocking and a variety of phone number masking techniques to limit the scope of calls that may be placed from the STD (2320).

It should be noted that while the system depicted in FIG. 23 (2300) implements forward calling, the system configuration may incorporate forward and/or reverse calling methodologies as taught herein with or without the use of call queueing as taught herein.

Incoming Call Blocking/Prioritization (2400)

Figure 24:
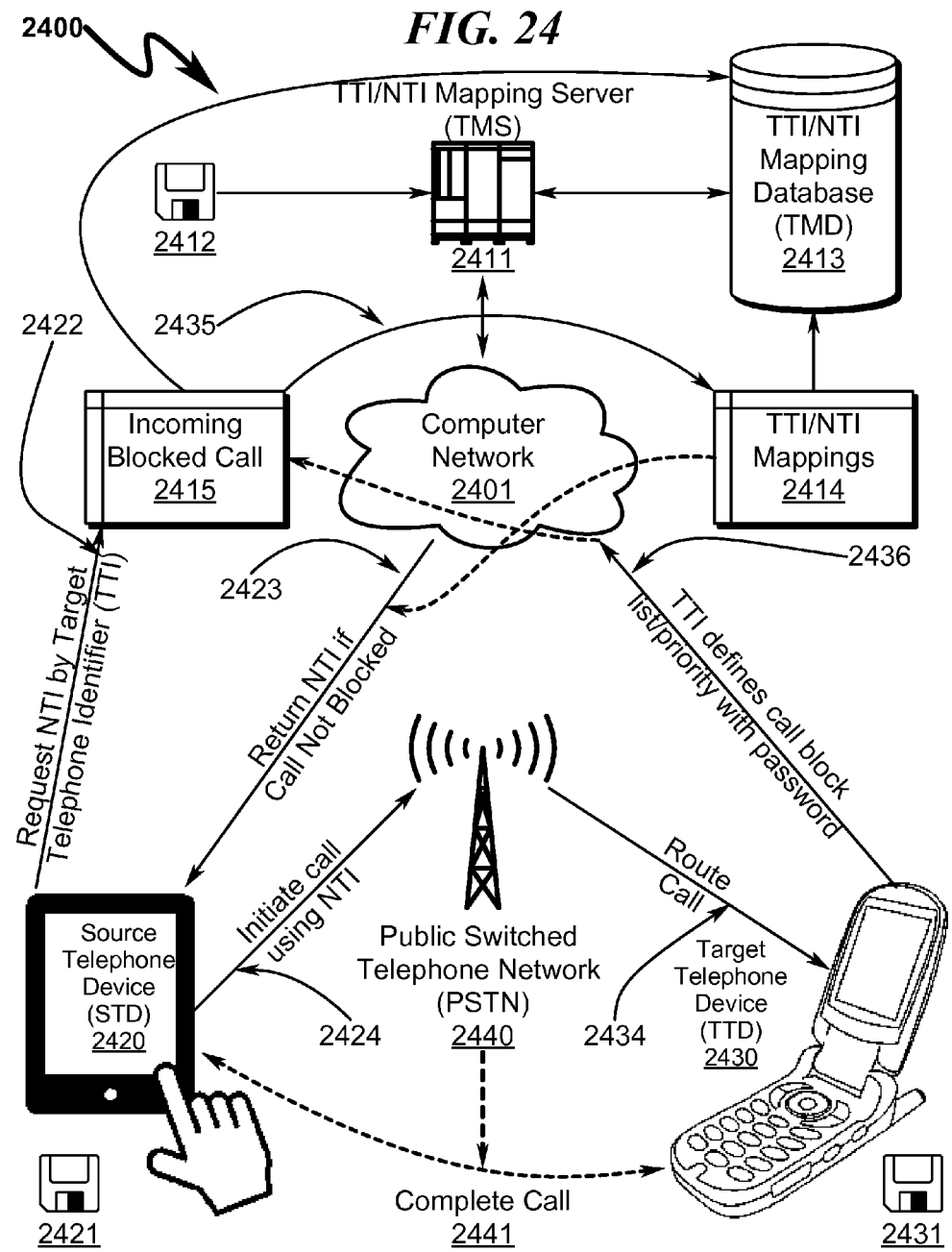
FIG. 24 illustrates an exemplary system embodiment incorporating incoming call screening.

As generally depicted in FIG. 24 (2400), the present invention anticipates that in some preferred embodiments the TTD (2430) may define (2436) (under password control) an incoming call blocked list (2415) that may be integrated in the TTD (2430) and/or the TMD (2413). This call blocked list (2415) permits incoming calls to the TTD (2430) to be screened such that the incoming TTI call request (2422) is first screened by the blocked call list (2415) before being matched (2435) against the TTI/NTI mappings (2414) within the TMD (2413). This feature permits parental (or other) controls for incoming calls to limit the scope of calls that may be received by the TTD (2430), and may incorporate country/area/exchange blocking and a variety of phone number masking techniques to limit the scope of calls that may be received by the TTD (2430).

In addition to call screening/blocking, the incoming call blocked list (2415) may incorporate a call PRIORITY associated with a given TTI (or TTI chain) such that as the call is received by the TTD (2430), it is automatically prioritized in the TTD call queue based on a queue priority as defined by the TTD within the call blocked list (2415). Thus, the TTD (2430) may prioritize incoming calls from a given STD TTI based on a fixed priority level or a priority level that varies based on a calculated value such as calendar events and other criterion. In some circumstances the priority level may be set to a value that completely blocks the incoming call, as for example a parent who wishes to call block all calls for their daughter after 10 pm at night during school days, etc.

It should be noted that while the system depicted in FIG. 24 (2400) implements forward calling, the system configuration may incorporate forward and/or reverse calling methodologies as taught herein with or without the use of call queueing as taught herein.

TTI Integration with Web Services (2500)-(3200)

TTI/NTI Mapping Metadata (2500)

Figure 25:
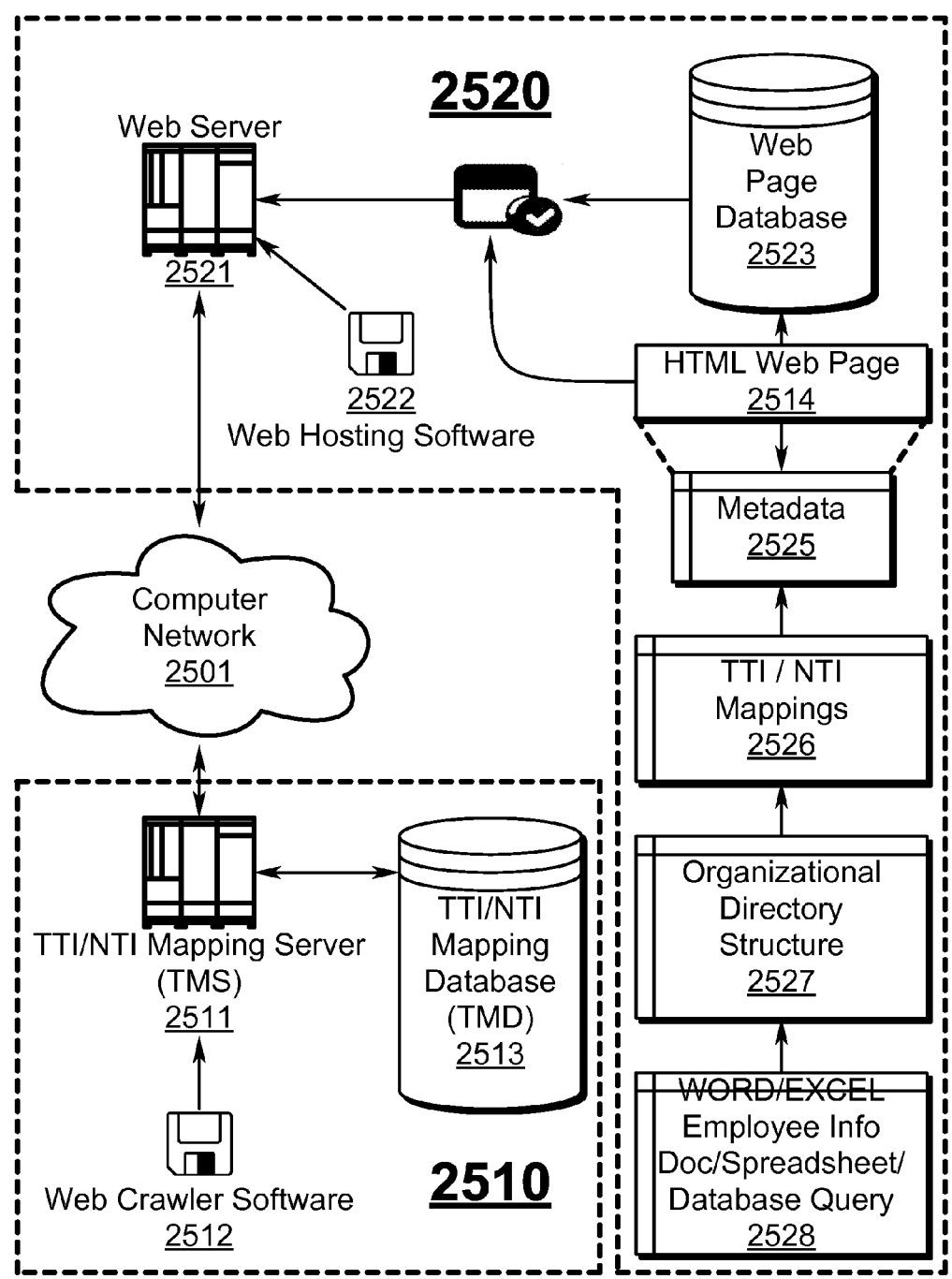
FIG. 25 illustrates an exemplary system block diagram depicting integration of TTI/NTI data within enterprise websites and the gathering of this data by a global TTI/NTI mapping server operating as a web crawler.

The TTI/NTI mappings may be directly populated within a TTI/NTI Mapping Database (TMD) (0113) as generally illustrated in FIG. 1 (0100) or in some preferred embodiments as generally illustrated in FIG. 25 (2500) this database (2513) may be populated automatically by using a web crawler subsystem (2510) to scan web pages maintained within an enterprise computing environment (2520). Within this context the TTI/NTI Mapping Server (TMS) (2511) has augmented software functionality to operate as a web crawler (2512) to "scan" the Internet (2501) for web pages that contain metadata incorporating TTI/NTI mappings. As this information is scanned from the web over the Internet (2501) and placed in the TTI/NTI Mapping Database (2513). One skilled in the art will recognize that a dedicated web crawler server could be used in this scenario and that the TTI/NTI Mapping Server (TMS) (2511) could be operated as a separate computer in this configuration.

In this scenario, the enterprise environment (2520) maintains a web server (2521) running web hosting software (2522) that services a web page database (2523) (that could be as simple as a directory of HTML web pages (2524) supported by the server (2521)). Within these web pages (2524) metadata (2525) is stored which may or may not be visually depicted on the displayed web page. This metadata (2525) can incorporate TTI/NTI mapping strings (2526) that may be directly populated in the TTI/NTI Mapping Database (TMD) (2512) once detected in the metadata (2525). These TTI/NTI mapping strings (2526) may be configured to directly represent a hierarchical organizational directory structure (2527) within the enterprise (2520). In some circumstances the organizational directory structure (2527) may be represented by internal documents such as MICROSOFT® WORD® documents and/or MICROSOFT® EXCEL® spreadsheets (2528) (or any other query of a database or data file format such as a sequential file incorporating insert/update/delete of TMD using SQL or any programming language such as C, Visual Basic, Java, etc.). Traditional database update methodologies may also be used, such as direct software interfaces using SQL (Standard Query Language).

Exemplary TTI/NTI Mapping Metadata Structure (2600)

Figure 26:
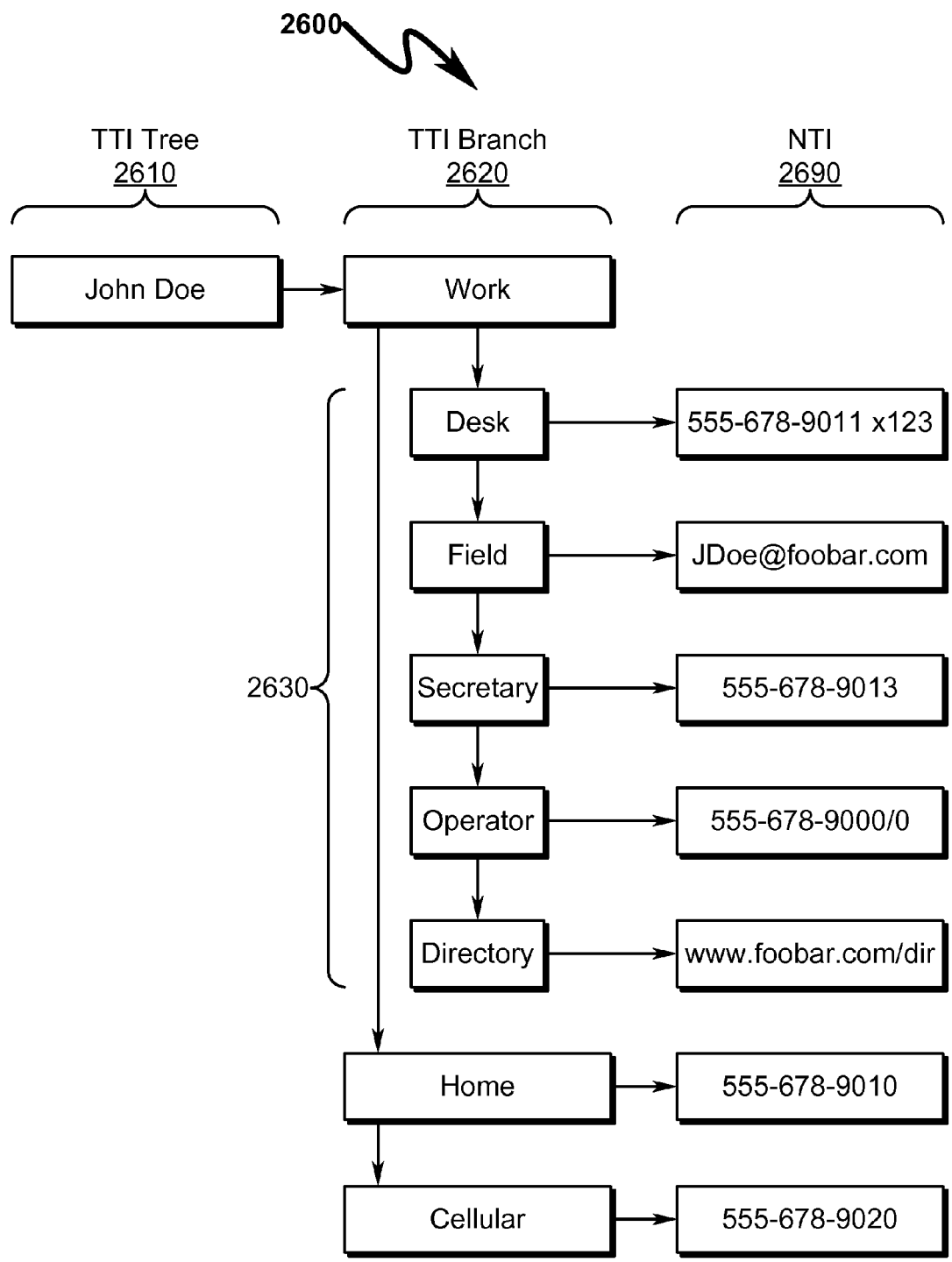
FIG. 26 illustrates an exemplary TTI/NTI tree structure.

An exemplary TTI/NTI directory mapping structure is generally illustrated in FIG. 26 (2600) and comprises a TTI tree (2610) with constituent TTI branches (2620), subbranches (2630) (a given TTI tree (2610) may have nested branches and subbranches to any depth), and terminal NTI values (2690). This diagram (2600) generally illustrates the fact that hierarchical TTI structures taught by the present invention are general tree structures and may be nested to any depth. Also illustrated is the use of NTI sequence modifiers ("x NNN" to indicate selection of an extension once the main number has been dialed; "/" to indicate selection of DTMF keypad navigation options; "@" to indicate availability via e-mail; and "www" to indicate indirection to another web page incorporating TTI/NTI metadata).

Exemplary TTI/NTI UI Navigation Structure (2700)

Figure 27:
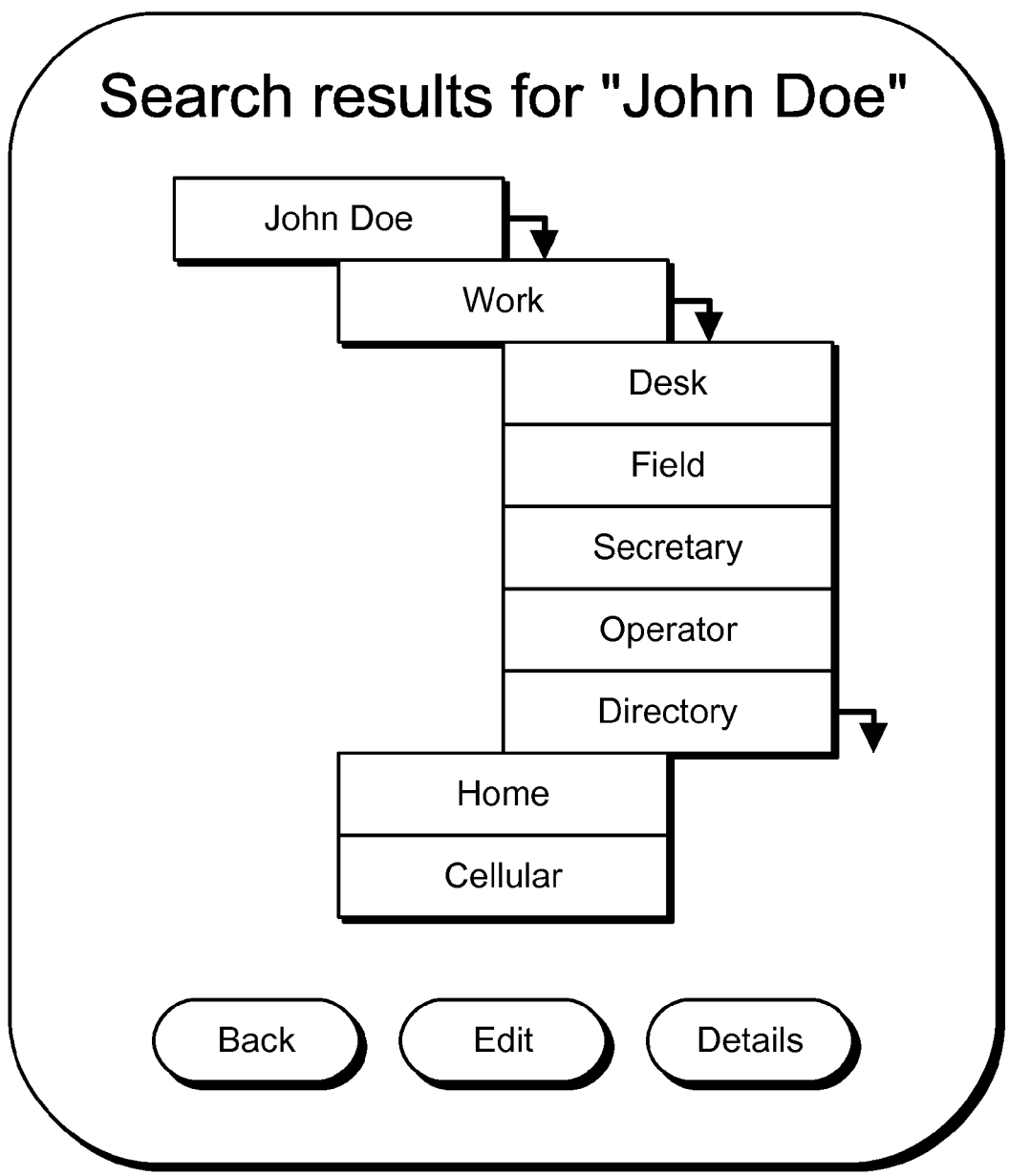
FIG. 27 illustrates an exemplary TTI/NTI navigation screen suitable for a typical mobile communication device.

The TTI/NTI Mapping Metadata Structure depicted in FIG. 26 (2600) may result in a search results screen as generally illustrated in FIG. 27 (2700). Note that the telephone numbers have been hidden in this dialog, as they are maintained by the TTI/NTI database. Options to return to a previous directory level (BACK) (or scroll up/down or sideways in a manner similar to a WINDOWS® file directory), change a current directory entry (EDIT), and provide more details on the directory entry content (DETAILS) are also provided in this exemplary user interface.

Exemplary TTI/NTI Metadata Content (2800)

The TTI/NTI Mapping Metadata Structure depicted in FIG. 26 (2600) can be represented in a wide variety of metadata formats, but an exemplary format is generally illustrated in FIG. 28 (2800). Here the "keywords" tag content indicates that the metadata author/description tag content is to be interpreted as data for the TTI/NTI mapping database. The "author" tag content defines the top level TTI associated with the currently presented TTI tree (which may be a branch or subbranch of some other metadata tree). The "description" tag content defines the hierarchical tree of TTI/NTI maps (which may be nested) and eventually results in an atomic TTI/NTI pairing. One skilled in the art will recognize that there are many possible syntaxes and grammars that may be used to define and interpret these exemplary metadata fields and that the specific grammar depicted here is only exemplary and is subject to wide variation based on application context.

Several metadata examples are provided in FIG. 28 (2800). The first example (2810) illustrates the use of personal names ("JohnDoe") as the TTI indexing methodology. However, the use of email addresses ("JDoe@foobar.com") (2820) or website addresses ("www.foobar.com") (2830) are also anticipated as potential TTI indexing methodologies.

Exemplary Metadata Grammar (2900)

While many different syntaxes/grammars may be utilized to implement the inclusion of TTI/NTI mappings within website metadata, an exemplary Extended Backus-Naur Form (EBNF) grammar is illustrated in FIG. 29 (2900). One skilled in the art will recognize that this exemplary grammar can vary widely based on application context.

It is instructive to note that the EBNF provided in FIG. 29 (2900) incorporates "conditional" structures that permit activation of a given NTI atom based on some conditional relation that may in some cases be determined by external activity (such as availability of a cellular telephone, indications from a MICROSOFT® OUTLOOK®/GOOGLE OFFICE schedule that an individual is in a meeting, or conditions based on calendar events (use e-mail after 5 pm; only cellphone on weekends; only vacation cabin telephone on holidays, etc.). These conditional structures may create an intelligent reformation of the user interface displays presented (FIG. 27 (2700)) in response to the realtime state of the TTD.

Exemplary NTI Atoms (3000)

Figure 30:
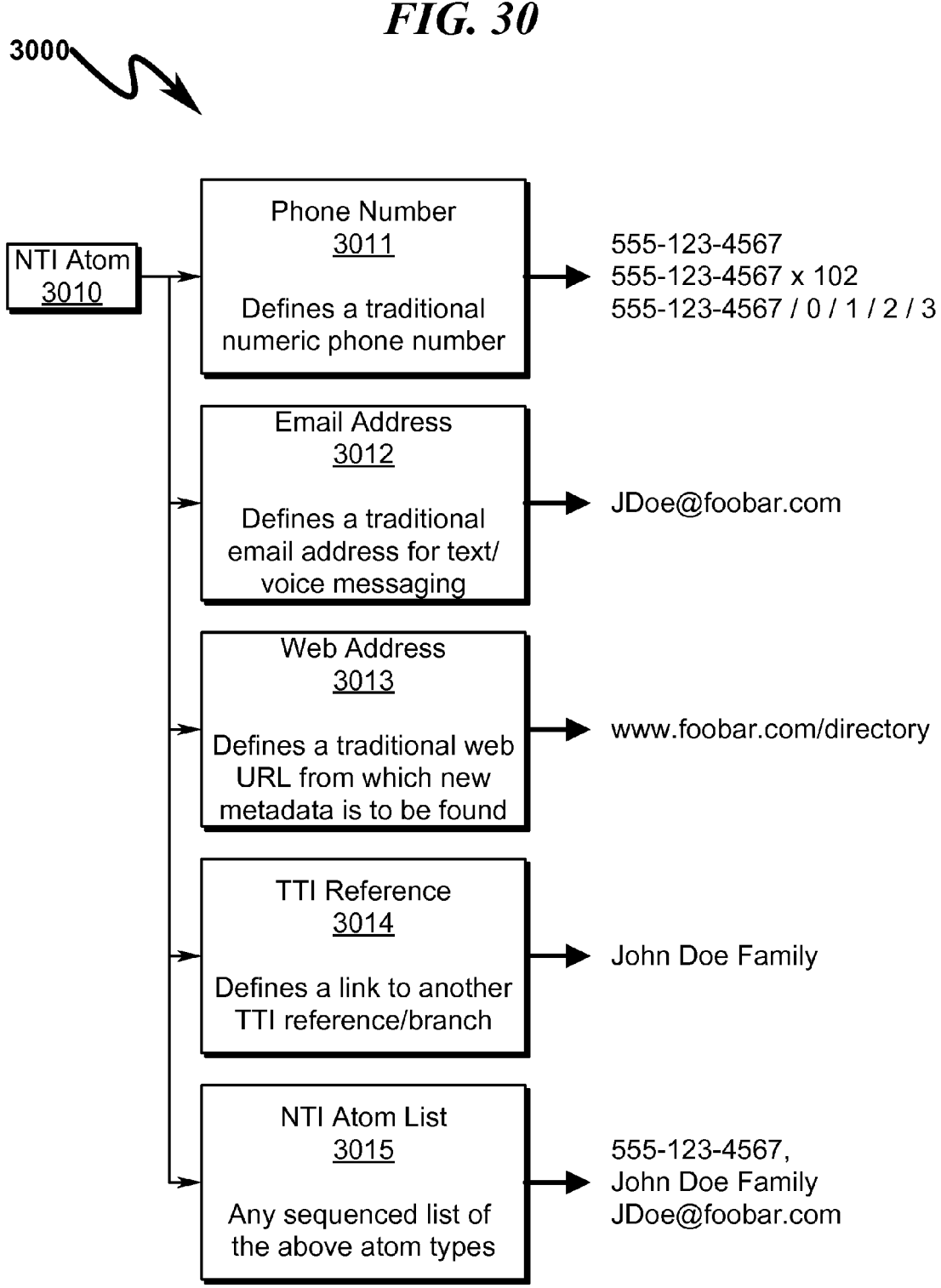
FIG. 30 illustrates variations in the types of NTI atomic types that may be used in a variety of preferred invention embodiments.

Within various implementations of TTI/NTI metadata mapping, a number of NTI atom (3010) variations are possible. Illustrative of just a few of these possibilities include those detailed in FIG. 30 (3000):

Numeric Telephone Numbers (3011). These may include traditional numeric telephone number strings ("555-123-4567") but may also incorporate suffix modifiers to permit navigation to a specific telephone extension ("x123") and/or support for timed traversal through conventional voice-driven keypad navigation ("/") wherein pauses are inserted as necessary to respond properly to the timing of messages within a given voice menu context. Note that within this context the system anticipates not only the use of conventional DTMF codes "0123456789" but also "*" and "#" as well as the unused but available DTMF codes for "ABCD". This capability permits enterprise call centers to quickly route a caller to a given internal telephone extension without wasting hold time or long distance charges.

Email Address (3012). This NTI atom variant permits an email address to be used as the target communication link. In this case a telephone call may be converted from voice to a digital data stream and sent as an e-mail to the TTD.

Web Address (3013). This NTI atom variant permits a web address to be used as a reference for another tree of potential TTI references. In this manner, a set of TTI/NTI mappings not necessarily maintained by the local metadata can be directly included by reference.

TTI Reference (3014). This NTI atom variant permits a generic TTI to be identified as a branch point for the current TTI/NTI pair. This permits branches of other TTIs to be referenced symbolically.

NTI Atom List (3015). Any of the above described atoms may be concatenated in list form to indicate that the set represents an equivalent (or demanded) series of communications. In other words, it may be desirable in some circumstances to pick ONE of the atoms in this list or in other circumstance pick the ENTIRE list as the target for communication addressing.

One skilled in the art will recognize that this list is not exhaustive and may vary widely based on application context.

Exemplary TTI Metadata Creation Method (3100)

Figure 31:
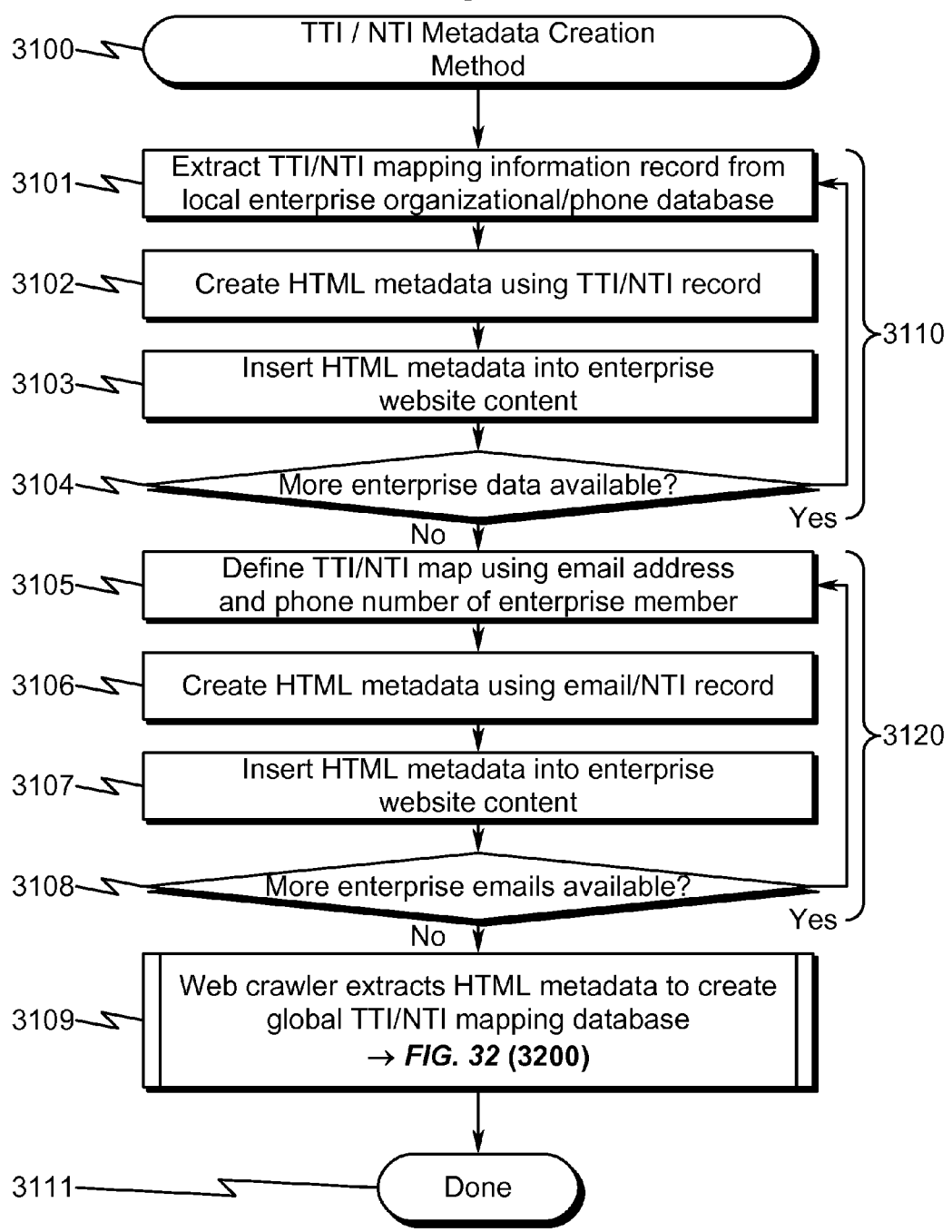
FIG. 31 illustrates a flowchart depicting exemplary methods to extract TTI/NTI mapping data from enterprise databases and present this information as metadata within an enterprise website for later scanning by a web crawler.

While the TTI/NTI metadata mapping described above may be implemented using manual entry of TTI/NTI data, a more preferred methodology for many enterprise implementations is the use of automated metadata creation as generally illustrated in the flowchart of FIG. 31 (3100). Here an exemplary automated system is detailed that incorporates methodologies to extract TTI/NTI data from enterprise organizational records (employee names, internal telephone numbers, department names, product lines, etc.) (3110) and using enterprise email addresses (3120). The general steps to this metadata creation method include:

(1) Extract TTI/NTI mapping information record from a local enterprise organizational/phone database (3101);
(2) Create HTML metadata using the TTI/NTI information record (3102);
(3) Inserting the HTML metadata into enterprise website content (3103);
(4) Determining if there are more enterprise organizational/phone records to process, and if so, proceeding to step (1) (3104);
(5) Defining a TTI/NTI map using an enterprise email address (as the TTI) and the corresponding telephone number associated with the email address (as the NTI) (3105);
(6) Create HTML metadata using the TTI/NTI information record (3106);
(7) Inserting the HTML metadata into enterprise website content (3107);
(8) Determining if there are more enterprise email records to process, and if so, proceeding to step (5) (3108); and
(9) Invoking a web crawler (or assuming an external web crawler will eventually be activated) to scan the HTML metadata in the enterprise website to generate one or more global TTI/NTI mapping databases (3109).

As discussed above, steps (1)-(4) are generally responsible for extracting conventional internal telephone directory information from the enterprise and creating metadata from this information (3110) and steps (5)-8) are generally responsible for mapping employee/department email information to corresponding NTI information (3120).

Note that this methodology anticipates the use of a web crawler to later scan the HTML metadata records and populate one or more global TTI/NTI mapping databases. An exemplary web crawler search method is generally illustrated in FIG. 32 (3200) and discussed in more detail below.

Exemplary TTI Metadata Search Method (3200)

Figure 32:
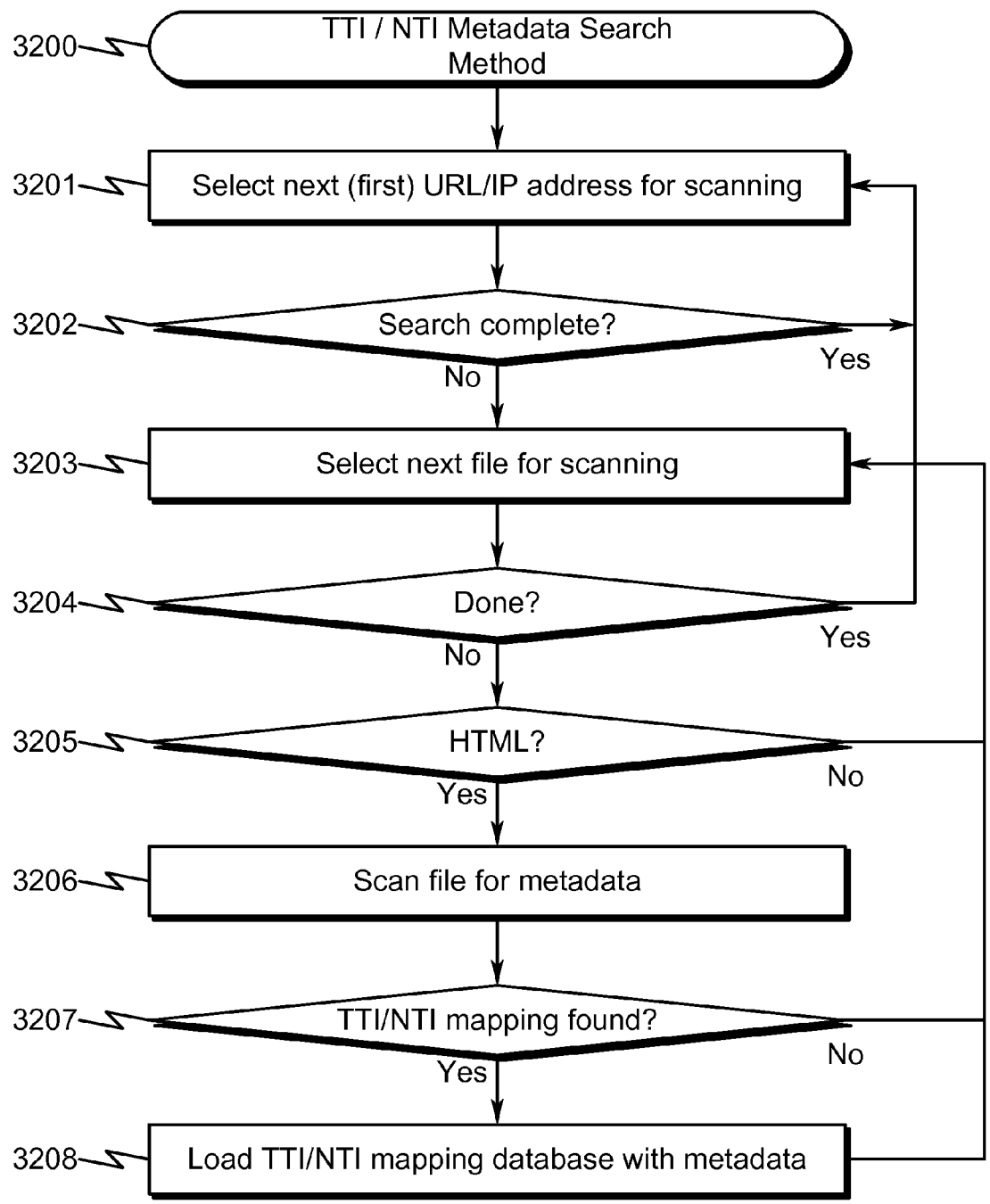
FIG. 32 illustrates an exemplary web crawler application that may be used to scan HTML web pages containing TTI/NTI mapping information to populate a TTI/NTI mapping database (TMD)

A detail of an exemplary metadata search method is provided in FIG. 32 (3200), wherein the steps associated with collecting the TTI/NTI mapping metadata include the following:

(1) Selecting the next (or first) URL/IP address for scanning (3201);
(2) Determining if the URL/IP search is completed, and if so, proceeding to step (1) (3202);
(3) Selecting the next (or first) file in the selected URL/IP address for scanning (3203);
(4) Determining if all files on the URL/IP address have been scanned, and if so, proceeding to step (1) (3204);
(5) Determining if the selected file is an HTML file, and if not, proceeding to step (3) (3205);
(6) Scanning the selected file for metadata (3206);
(7) If TTI/NTI metadata is not found, then proceeding to step (3) (3207);
(8) Loading the TTI/NTI metadata into a TTI/NTI mapping database and proceeding to step (3) (3208).

It should be noted that selection of the URL/IP address can take several forms, from sequentially accessing records in a master Internet domain name server (DNS) (to retrieve pairings of domain name and IP address), or by simply generating sequential IP addresses (xxx.xxx.xxx.xxx) and using these to directly access nodes on the Internet for the purposes of collecting metadata.

This methodology may be implemented in a standalone fashion or integrated within conventional web crawler search engine scanning (GOGGLE®, YAHOO®, etc.) to consolidate conventional web searching functions with accumulation of TTI/NTI mapping data.

Advantages to Web-Based Mapping Metadata

A significant advantage to the use of web-based mapping metadata to populate a more globally accessible TTI/NTI mapping database is the fact that corporations and other enterprises which maintain localized telecommunications infrastructures can easily update their local information and then have it "scraped" and integrated into any number of global mapping databases that can then be accessed by a plethora of users on the Internet. Thus, the individual enterprise is not responsible for maintenance of any number of TTI/NTI mapping databases, just for the localized copy that can be scanned by external web crawlers. Within this context, search engine companies such as GOGGLE®, MICROSOFT® BING®, YAHOO®, etc. can apply their sophisticated web crawling technology to index, prioritize, and serve the most commonly and closest search results of TTI/NTI and the names associated with the TTI/NTI.

This capability has significant advantages in dissemination of changes to the enterprise telecommunications infrastructure. As the NTIs within an enterprise may change with time (as does their organizational structure), the enterprise need only maintain this structure in ONE place, and then it can be replicated using web crawlers to outside TTI/NTI mapping databases for use by external users. One skilled in the art will recognize that an application to translate internal telephone/web addresses within an enterprise into the metadata framework described herein would be application specific to an organization but within the capability of one of ordinary skill in the programming arts.

Automated TMD Generation from Website Scans (3300)-(3400)

System Data Flow (3300)

Figure 33:
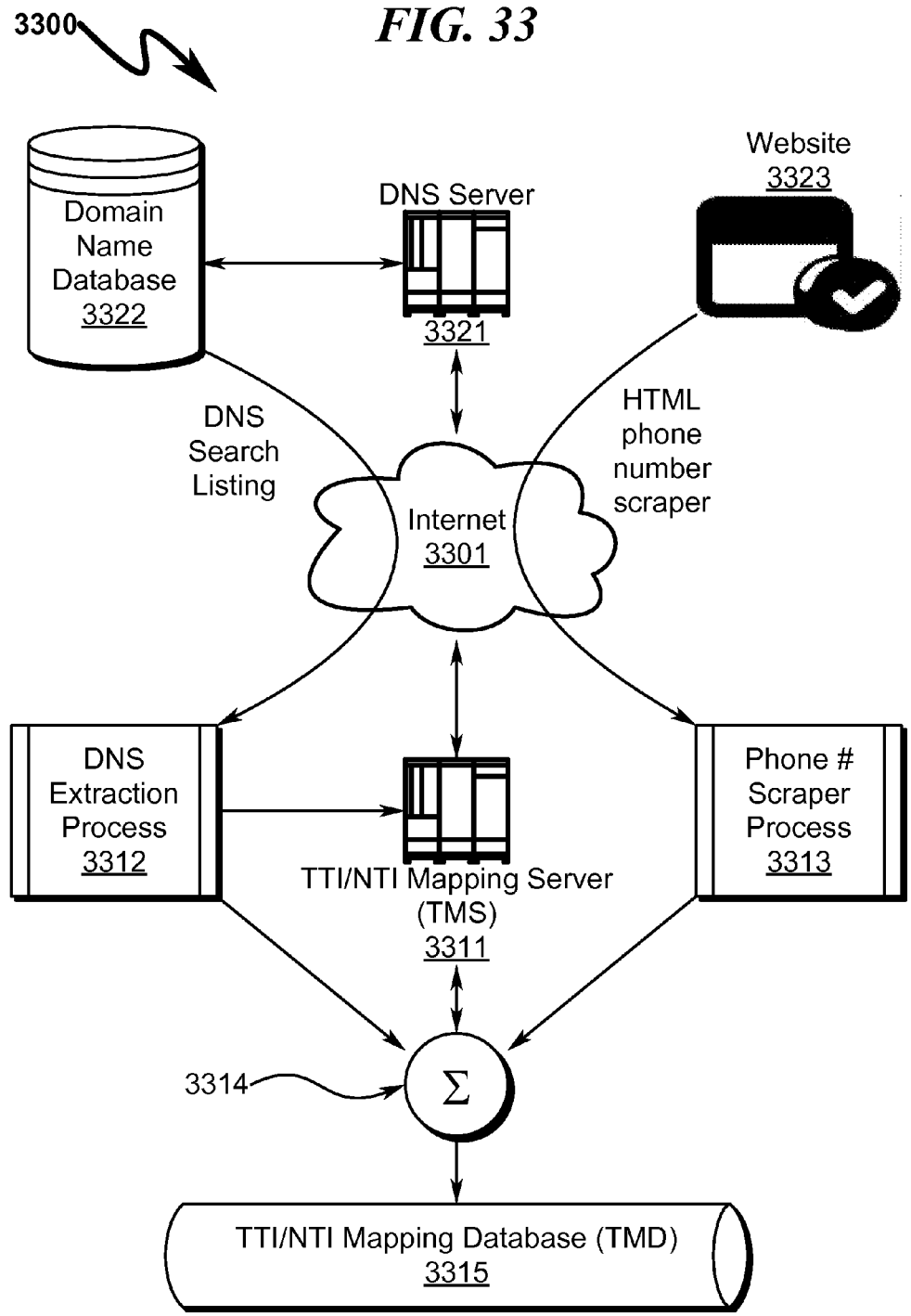
FIG. 33 illustrates an exemplary system capable of populating the TMD using information gathered by searching websites for HTML containing valid telephone numbers.

In some circumstance the present invention may be implemented using an automated methodology to create the TTI-to-NTI mapping database (TMD). As generally illustrated in FIG. 33 (3300), this can be implemented by the TMS (3311) executing a DNS extraction process (3312) and a telephone number scraper process (3313). The DNS extraction process (3312) interacts with a DNS server (3321) over the Internet (3301) to gain access to a domain name database (3322) that details domain names as textual URL strings. These URLs are then used to access the corresponding websites (3323) associated with the URLs. The telephone number scraper process (3313) then scans the website (3323) for HTML files containing telephone numbers. Telephone numbers found using this process that meet contextual search parameters (proximity to address info, embedded metadata, placement on banner/footer of website, etc.) are then concatenated (3314) with the URL found by the DNS extraction process (3312) to yield a TTI/NTI mapping database (TMD) (3315) entry.

Exemplary Website Search Method (3400)

Figure 34:
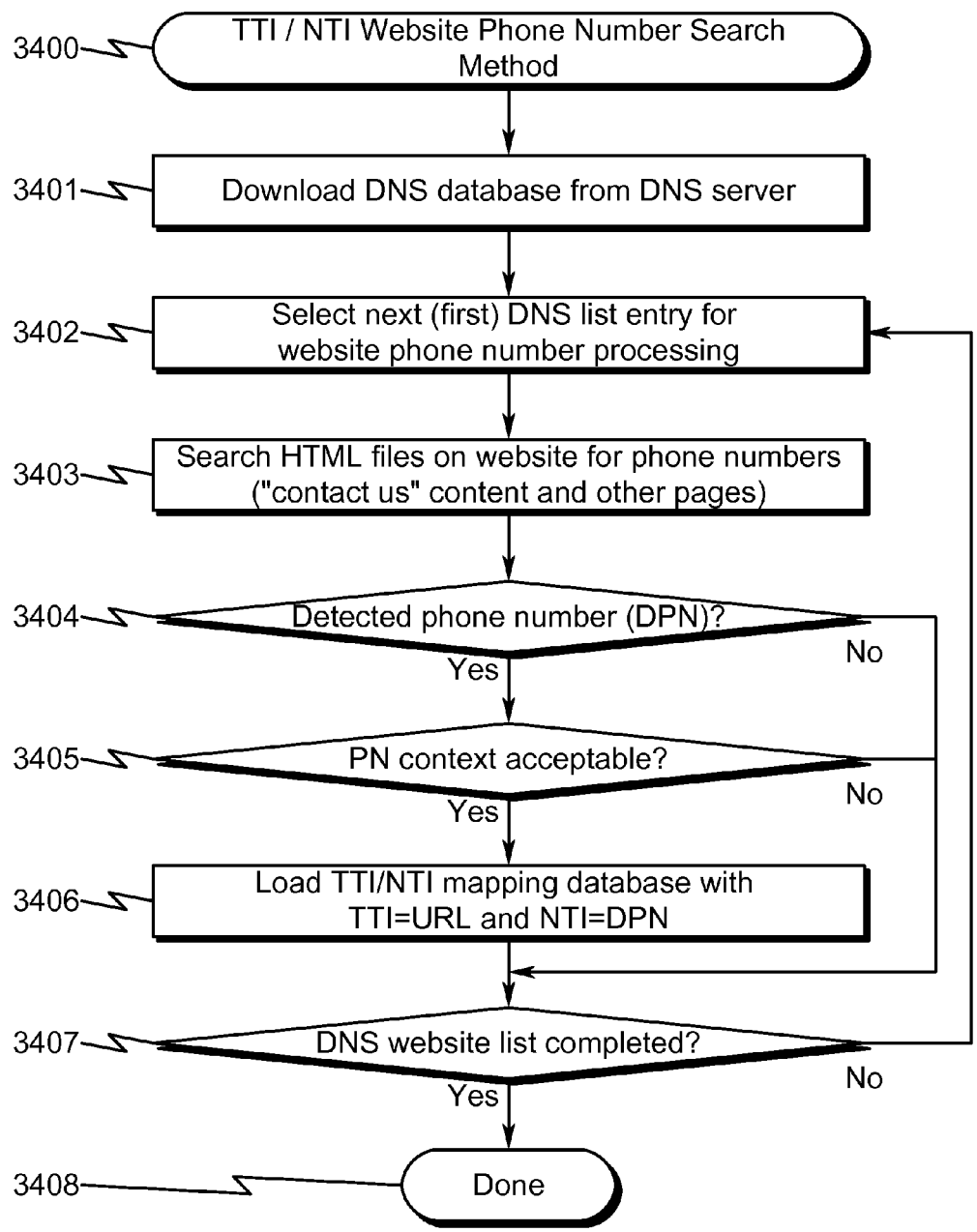
FIG. 34 illustrates an exemplary method flowchart detailing the populating of the TMD using information gathered by searching websites for HTML containing valid telephone numbers.

A detail of an exemplary website telephone number search method is provided in FIG. 34 (3400), wherein the steps associated with collecting the TTI/NTI mapping information include the following:

(1) Downloading a DNS database from a DNS server to identify URLs for telephone number searching (3401);
(2) Selecting the next (first) DNS list entry (URL) for website telephone number processing (3402);
(3) Searching HTML files associated with the website URL for valid telephone numbers (this may require textual filtering based on a variety of different telephone number formats) (3403);
(4) Determining if a valid detected telephone number (DPN) has been detected in the search, and if not, proceeding to step (7) (3404);
(5) Determining if the context of the DPN within the HTML is acceptable, and if not, proceeding to step (7) (3405);
(6) Loading the TTI/NTI mapping database (TMD) with an entry pair consisting of the URL (TTI)/DPN (NTI) pair (3406); and
(7) Determining if the DNS website list has been completely scanned, and if not, proceeding to step (2) (3407).

This methodology may be implemented in a standalone fashion or integrated within conventional web crawler search engine scanning (GOGGLE®, YAHOO®, etc.) to consolidate conventional web searching functions with accumulation of TTI/NTI mapping data.

Automated TMD Generation from Social Media (3500)-(3600)

System Data Flow (3500)

Figure 35:
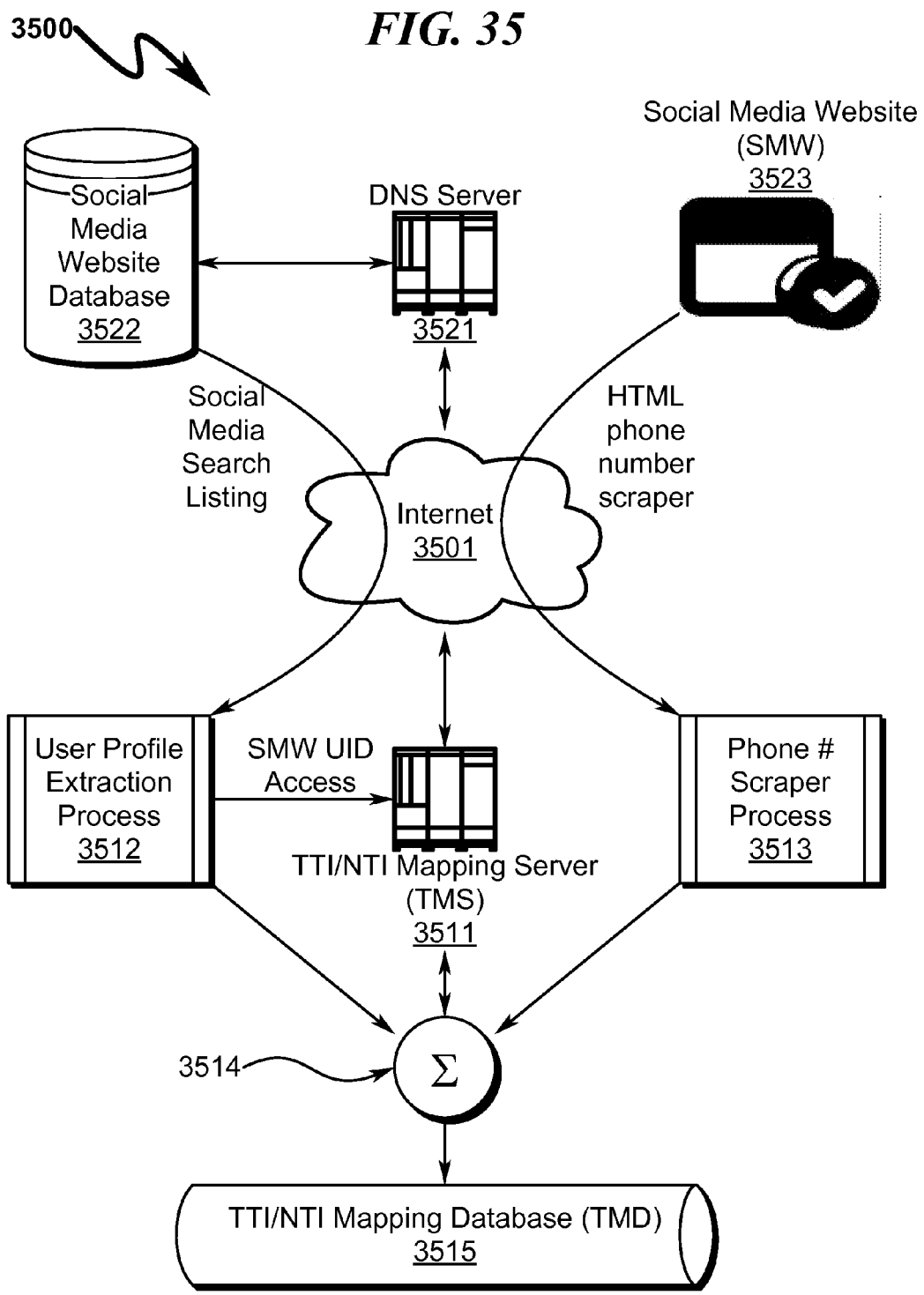
FIG. 35 illustrates an exemplary system capable of populating the TMD using information gathered by searching social media websites for HTML containing valid telephone numbers.

In some circumstance the present invention may be implemented using an automated methodology to create the TTI-to-NTI mapping database (TMD) extracted from social media websites (SMW). As generally illustrated in FIG. 35 (3500), this can be implemented by the TMS (3511) executing a user profile extraction process (3512) and a telephone number scraper process (3513). The user profile extraction process (3512) interacts with a social media website server (SMS) (3521) over the Internet (3501) to gain access to a social media website search database (3522) that details domain names and extraction methodologies for extracting information from a SMW. This information is then used to access the corresponding SMW (3523) associated with the SMW URLs. The telephone number scraper process (3513) then scans the SMW (3523) for user profile identifier (UPI) HTML files containing telephone numbers. Telephone numbers found using this process that meet contextual search parameters (proximity to address info, embedded metadata, placement within specific areas of website, etc.) are then concatenated (3514) with the SMW/UID found by the user profile extraction process (3512) to yield a TTI/NTI mapping database (TMD) (3515) entry.

Exemplary Website Search Method (3600)

Figure 36:
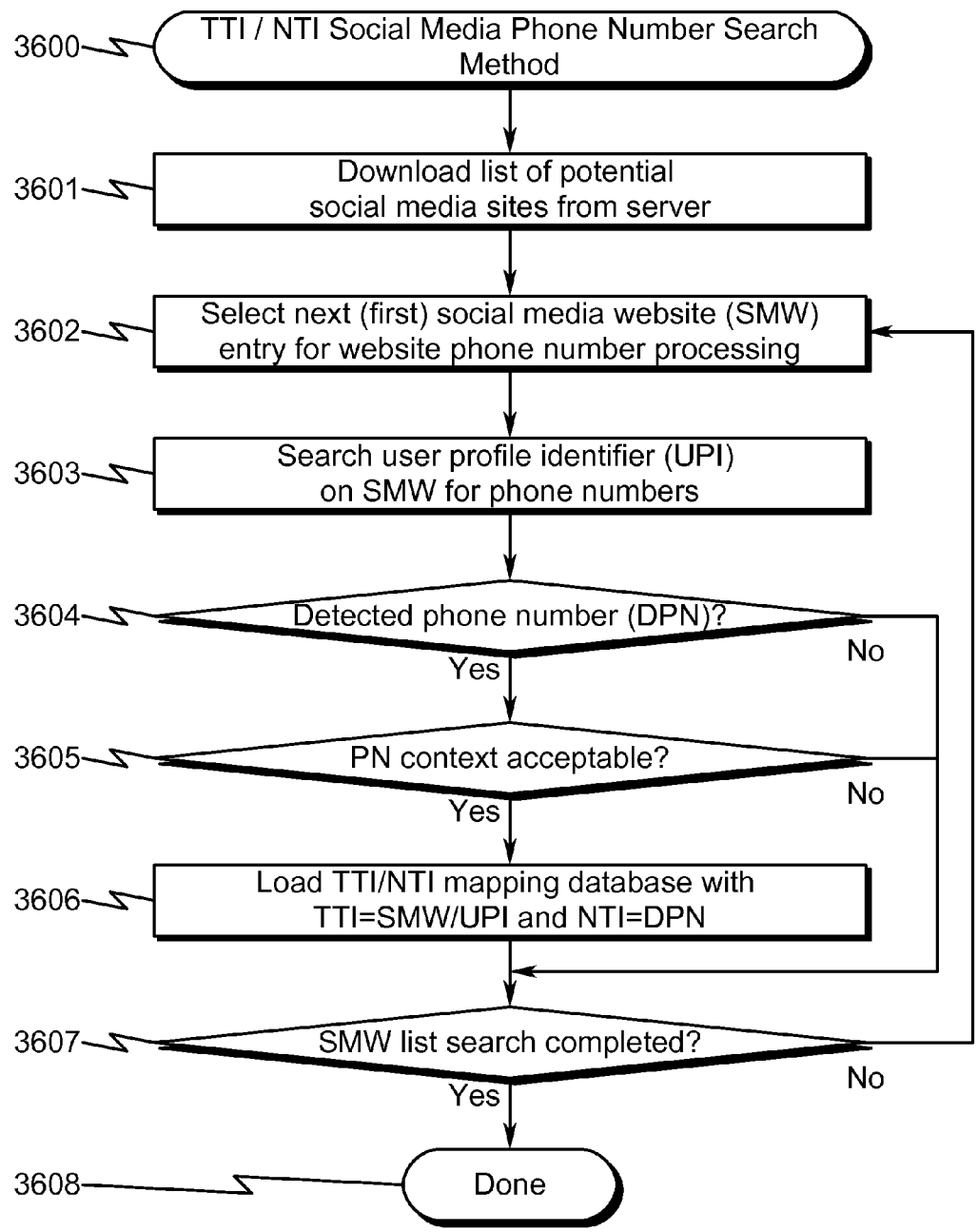
FIG. 36 illustrates an exemplary method flowchart detailing the populating of the TMD using information gathered by searching social media websites for HTML containing valid telephone numbers.

A detail of an exemplary social media telephone number search method is provided in FIG. 36 (3600), wherein the steps associated with collecting the TTI/NTI mapping information include the following:

(1) Downloading a list of potential social media websites (SMW) from a social media server (SMS) to identify SMW URLs (and data extraction methodologies) for telephone number searching (3601);
(2) Selecting the next (first) SMW list entry (URL) for website telephone number processing (3602);
(3) Searching user profile identifiers (UPI) on the SMW and HTML files associated with the SMW URL for valid telephone numbers (this may require textual filtering based on a variety of different telephone number formats and SMW text placement/display methodologies) (3603);
(4) Determining if a valid detected telephone number (DPN) has been detected in the search, and if not, proceeding to step (7) (3604);
(5) Determining if the context of the DPN within the SMW HTML is acceptable, and if not, proceeding to step (7) (3605);
(6) Loading the TTI/NTI mapping database (TMD) with an entry pair consisting of the SMW URL/UPI (TTI)/DPN (NTI) pair (3606); and
(7) Determining if the SMW website list has been completely scanned, and if not, proceeding to step (2) (3607).

This methodology may be implemented in a standalone fashion or integrated within conventional web crawler search engine scanning (GOGGLE®, YAHOO®, etc.) to consolidate conventional web searching functions with accumulation of TTI/NTI mapping data. This process is generally applicable to all social media websites such as FACEBOOK®, MYSPACE®, LINKEDIN®, and the like.

STD TTI/NTI Caching (3700)-(3800)

Exemplary STD Caching System (3700)

The present invention anticipates that in some circumstances the STD and/or TTD may cooperate with the TMS to maintain TTI/NTI mapping database (TMD) information locally within the context of the STD/TTD environment, eliminating the need for TMS access during every telephone call initiated from the STD to the TTD.

Figure 37:
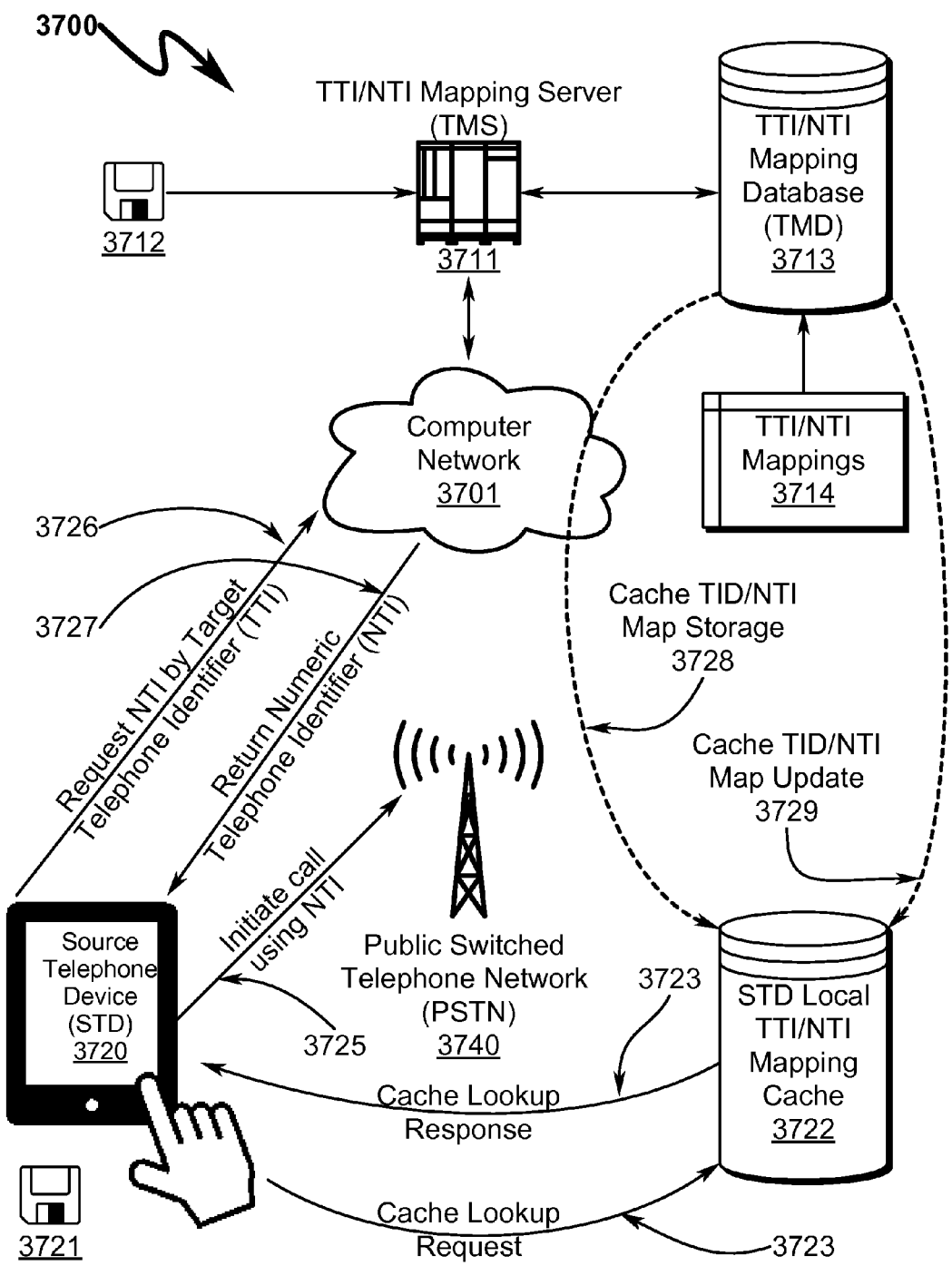
FIG. 37 illustrates an exemplary system block diagram depicting a present invention preferred exemplary embodiment incorporating STD TTI/NTI mapping cache.

An exemplary embodiment of such a system is generally illustrated in FIG. 37 (3700), where the STD (3720) communicates with the TMS (3711) and TMD (3713) via the computer network (3701). Here the STD (3720) maintains a local STD TTI/NTI mapping cache (3722) which is accessed via a lookup request (3723) upon selection of a TID entry by the user. If the local cache (3722) lookup response (3724) indicates that the TTI has been found, it is used to generate the TTI/NTI translation and initiate the PSTN telephone call (3725). Otherwise, the STD (3720) initiates communication with the TMS (3711) to request (3726) a TTI/NTI translation with the TMS (3711) response mapping (3727) used to initiate the telephone call (3725). Any resulting TTI/NTI mapping information received from the TMS (3711) is stored (3728) within the local STD cache (3722) for use later if needed. Note that this system anticipates that update messages (3729) from the TMS (3711) may be synchronously or asynchronously received by the STD (3720) to initiate cache (3722) updates when the TTI/NTI mapping database (TMD) (3713) is changed.

Exemplary STD Caching Method (3800)

Figure 38:
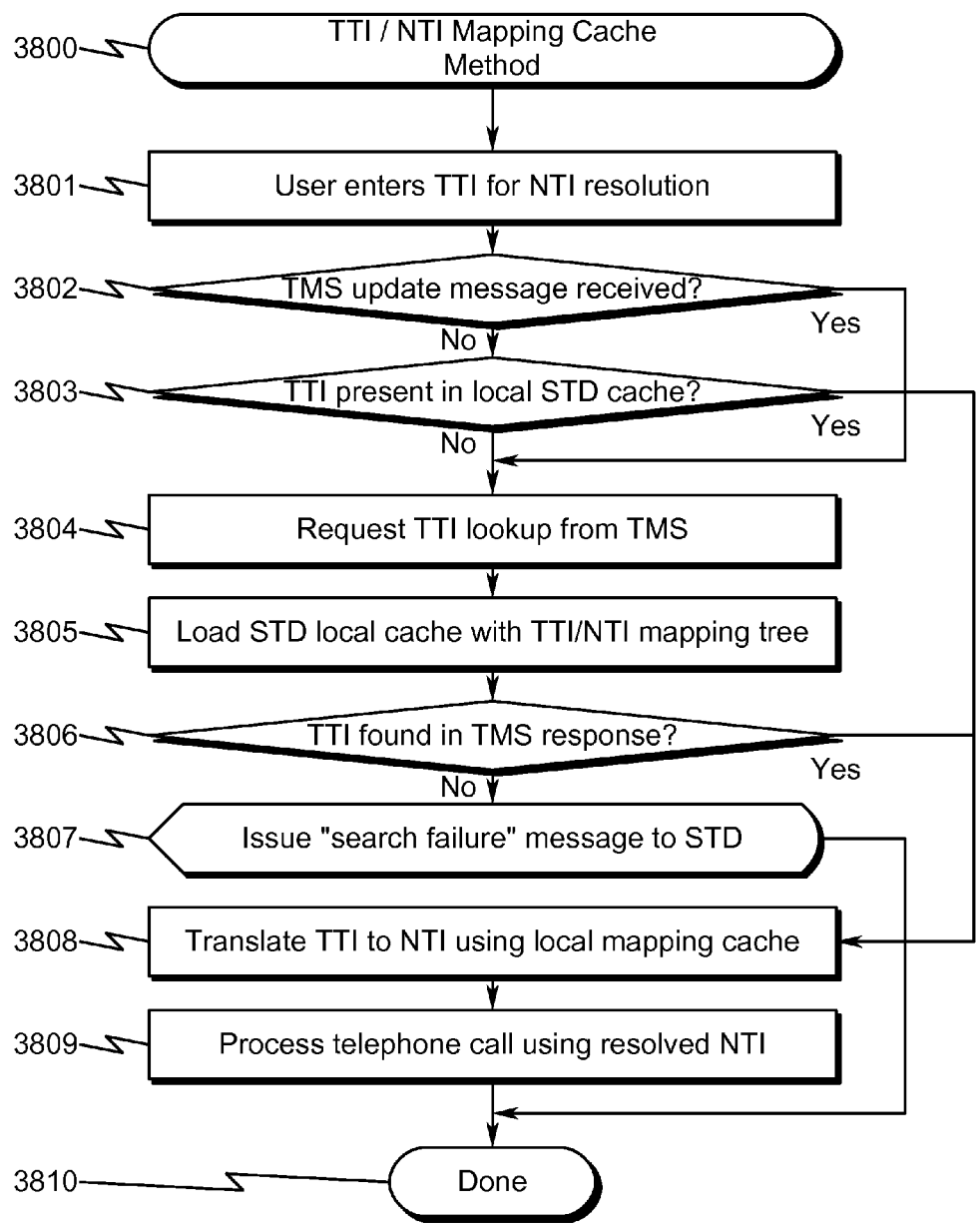
FIG. 38 illustrates a flowchart depicting an exemplary STD TTI/NTI mapping cache method.

A detail of an exemplary STD TTI/NTI caching method is provided in FIG. 38 (3800), wherein the steps associated with the method include the following:

(1) Entering a TTI for NTI translation via a STD user interface (3801);
(2) Determining if a TMS update has been received for this TTI, and if so, proceeding to step (4) (3802);
(3) Determining if the TTI is already in the local STD cache, and if so, proceeding to step (8) (3803);
(4) Requesting a TTI lookup from the TMS (3804);
(5) Loading the STD local TTI/NTI mapping cache with the TTI/NTI mapping tree retrieved from the TMS (3805);
(6) Determining if the TTI was found in the returned mapping tree, and if so, proceeding to step (8) (3806);
(7) Issuing a "search failure" message to the STD and proceeding to step (10) (3807);
(8) Translating the TTI to a resolved NTI using the local STD mapping cache (3808);
(9) Processing the STD telephone call using the resolved NTI (3809); and
(10) Terminating the method (3810).

This methodology may incorporate additional security/password access restrictions as may be required for direct access to the TMS. The ability to locally cache the TTI/NTI mappings most commonly used by the STD may in some circumstances result in improved telephone call placement performance. Since the TMS has knowledge of which STDs have requested TTI/NTI mapping operations, it may maintain a list of STDs that must be updated in response to any changes in the TTI/NTI mapping database (TMD).

Automated Telecom Infrastructure Updates (3900)-(4000)

The present invention anticipates that several embodiments of the present invention may be advantageously applied to automatically adjust TTI/NTI mappings within the TMD in response to change orders generated by telephone companies, telecommunication standards industries, or other entities that have operational control over the PSTN. The purpose of this invention embodiment variant is to eliminate the need for customers or other telephone users to modify their telephone address books or other information that would normally incorporate a NTI.

Exemplary Automated Telecom Updating System (3900)

Figure 39:
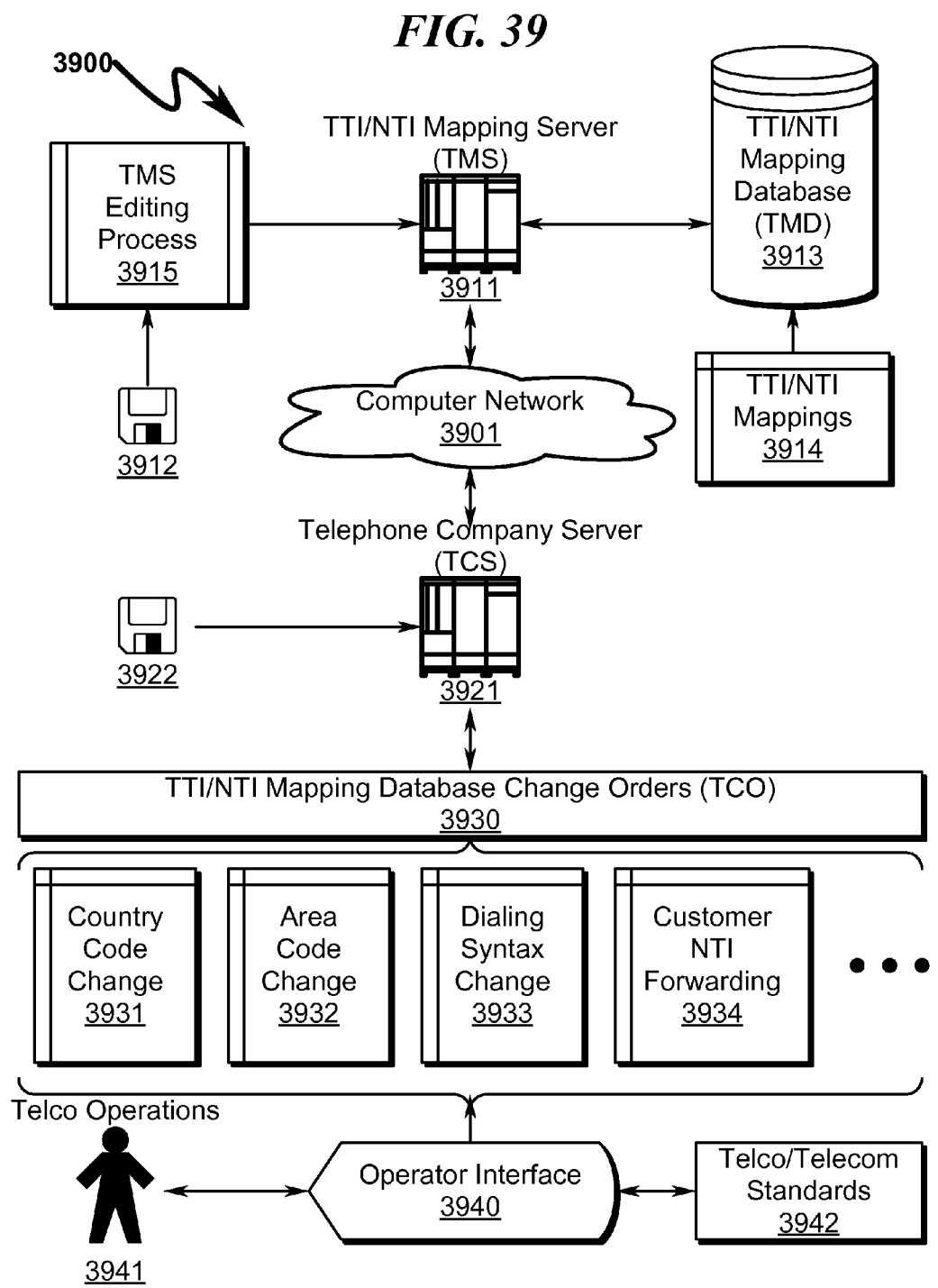
FIG. 39 illustrates a preferred exemplary invention system embodiment applied to automated telecom updating of TTI/NTI mappings based on telco operator input and/or input from telecom standards organizations.

An exemplary system embodying this concept is generally illustrated in FIG. 39 (3900) wherein the TMS (3911), operational software (3912), TTI/NTI mapping database (TMD) (3913) and related TTI/NTI mappings (3914) operate as described above. This system is augmented with a TMS editing process (3915) that permits a remote telephone company server (TCS) (3921) executing control software read from a computer readable medium to initiate programmed edits to the TMD (3913) based on a set of TTI/NTI mapping database change orders (TCO) (3930). The TCOs may take many forms, including but not limited to the following:

Country Code Changes (3931). Changes in country code (or portions thereof) can be replaced en masse using wildcard substitutions ("123"→"456").

Area Code Changes (3932). This permits a wildcard substitution of area codes that may include a subrange of exchanges ("(214)-555-**"→"(972)-555-**"). This permits additional area codes to be added with remapping of individual NTIs in a manner that is transparent to the operation of the TTIs associated with the original NTIs.

Dialing Syntax Changes (3933). Changes to the basic syntax of a given NTI string can be substituted as necessary to accommodate changes in a country's dialing syntax. This can occur without the knowledge of the telephone user on either end of the telephone link, as each party still refers to the other using the STI/NTI arbitrary data string. While the specific syntax for this type of change may vary widely, one skilled in the art will recognize that this function would be easily implemented by one of skill in the programming arts.

Customer NTI Forwarding (3934). When a telephone customer leaves a geographic area served by a telephone company to an area served by another telephone company (or moves within a geographic area served by the same telephone company) it is often the case that their NTI will change. This is especially true for land line communications. Within this context, the present invention anticipates that NTI changes associated with a particular customer which occur due to these moves can be reflected in a change order that automatically updates the TMD (3913) with the mapping change. Therefore, rather than receiving a message from the telephone company indicating that a telephone number has been changed, the originating caller will automatically be routed to the correct NTI by virtue of reference to the updated TMD (3913) which incorporates the new customer NTI change order (3934). This TCO may also be applied to situations in which a business or other organization is migrated from a singular telephone number (555-123-4567) to a private branch exchange (PBX) having a number of direct lines (555-999-xxxx).

Manual Telco Operations (3940). The system as described may incorporate a telephone company (TELCO) operator interface (3940) that permits manual changes (3941) to the TMD (3913) and/or interfaces to telephone standards organizations (3942) that may direct TMD (3913) changes in a more global context.

One skilled in the art will recognize that the range of change orders (TCOs) that may be supported in this configuration is not limited to the examples provided above.

Exemplary Automated Telecom Updating Method (4000)

Figure 40:
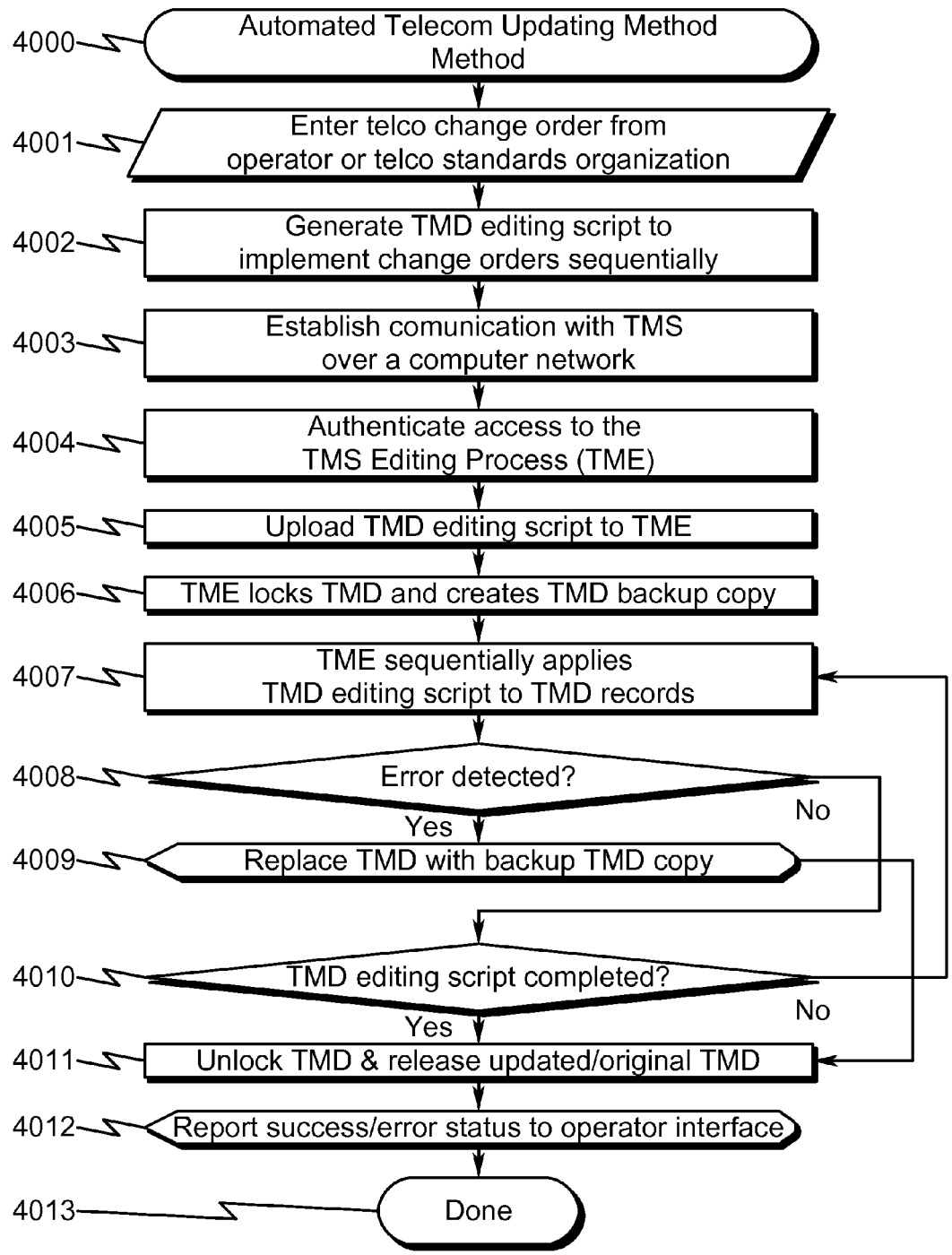
FIG. 40 illustrates a flowchart depicting a preferred exemplary invention method embodiment applied to automated telecom updating of TTI/NTI mappings based on telco operator input and/or input from telecom standards organizations.

A detail of an exemplary automated telecom updating method is provided in FIG. 40 (4000), wherein the steps associated with the method include the following:

(1) Entering a telco change order (TCO) from an operator or telco standards organization (4001);
(2) Generating a TMD editing script from the TCO to implement the TCO sequentially within the TMD (4002);
(3) Establishing communication with the TMS over a computer network (4003);
(4) Authenticating access to the TMS editing process (TME) (4004);
(5) Uploading the TMD editing script to the TME (4005);
(6) TME locks the TMD and creates a backup copy of the TMD (4006);
(7) TME sequentially applies (executes) the TMD editing script (4007);
(8) If an error is not detected in TMD script execution of the current edit step, control is passed to step (10) (4008);
(9) TME replaces TMD with backup TMD copy and proceeds to step (11) (4009);
(10) Determining if the TMD editing script execution is complete, and if not, proceeding to step (7) (4010);
(11) TME unlocks the TMD and releases the updated (or original) TMD for use by telco consumers (4011); and
(12) TME report the success/error completion status of the TMD editing script to the TCO originating entity (4012).

This methodology may be implemented in a standalone fashion or integrated within conventional web crawler search engine scanning (GOGGLE®, YAHOO®, etc.) to consolidate conventional web searching functions with accumulation of TTI/NTI mapping data.

Reverse Calling/Callback Support (4100, 4200)

Figure 41:
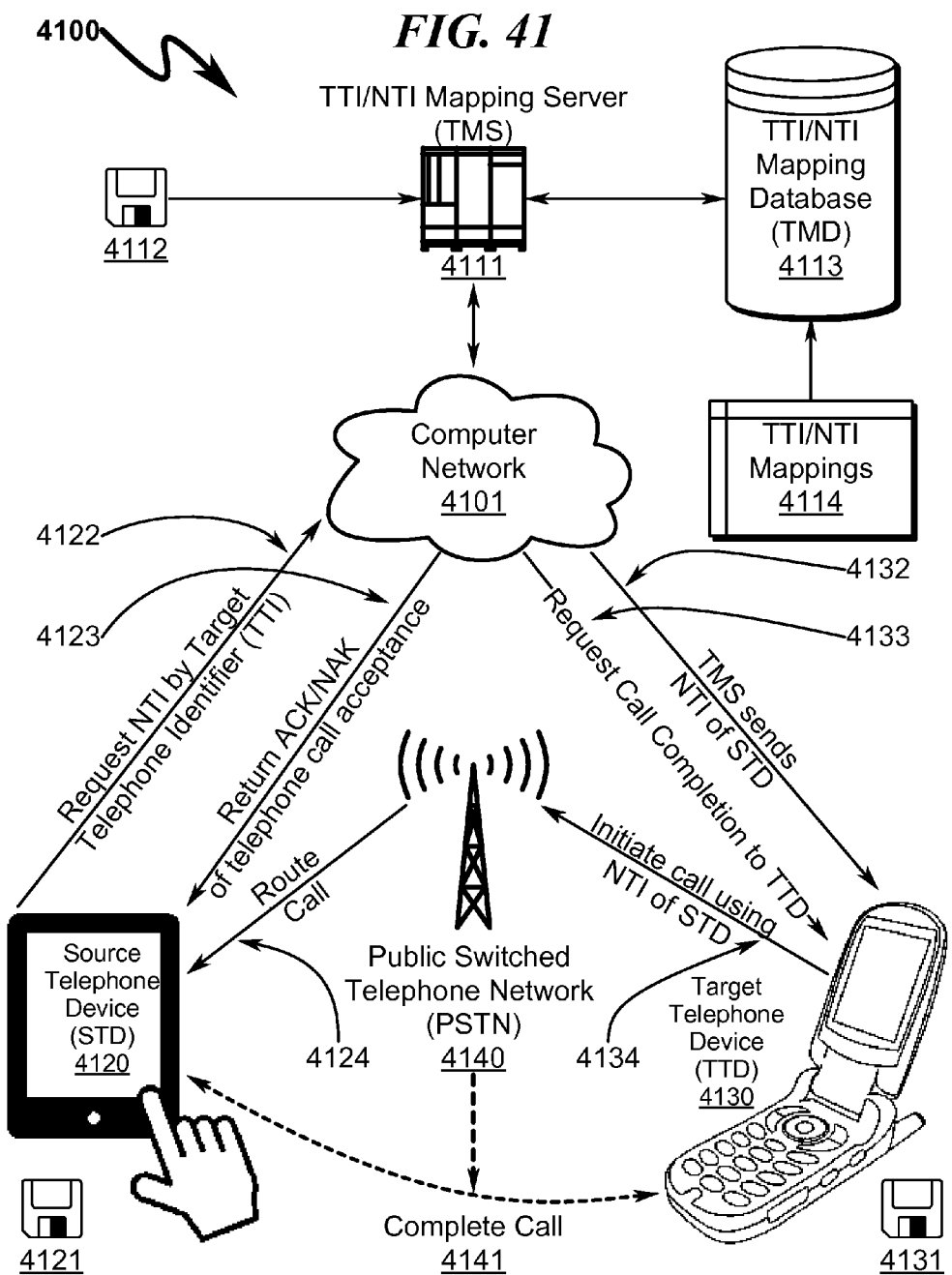
FIG. 41 illustrates a preferred exemplary system embodiment implementing reverse callback addressing.
Figure 42:
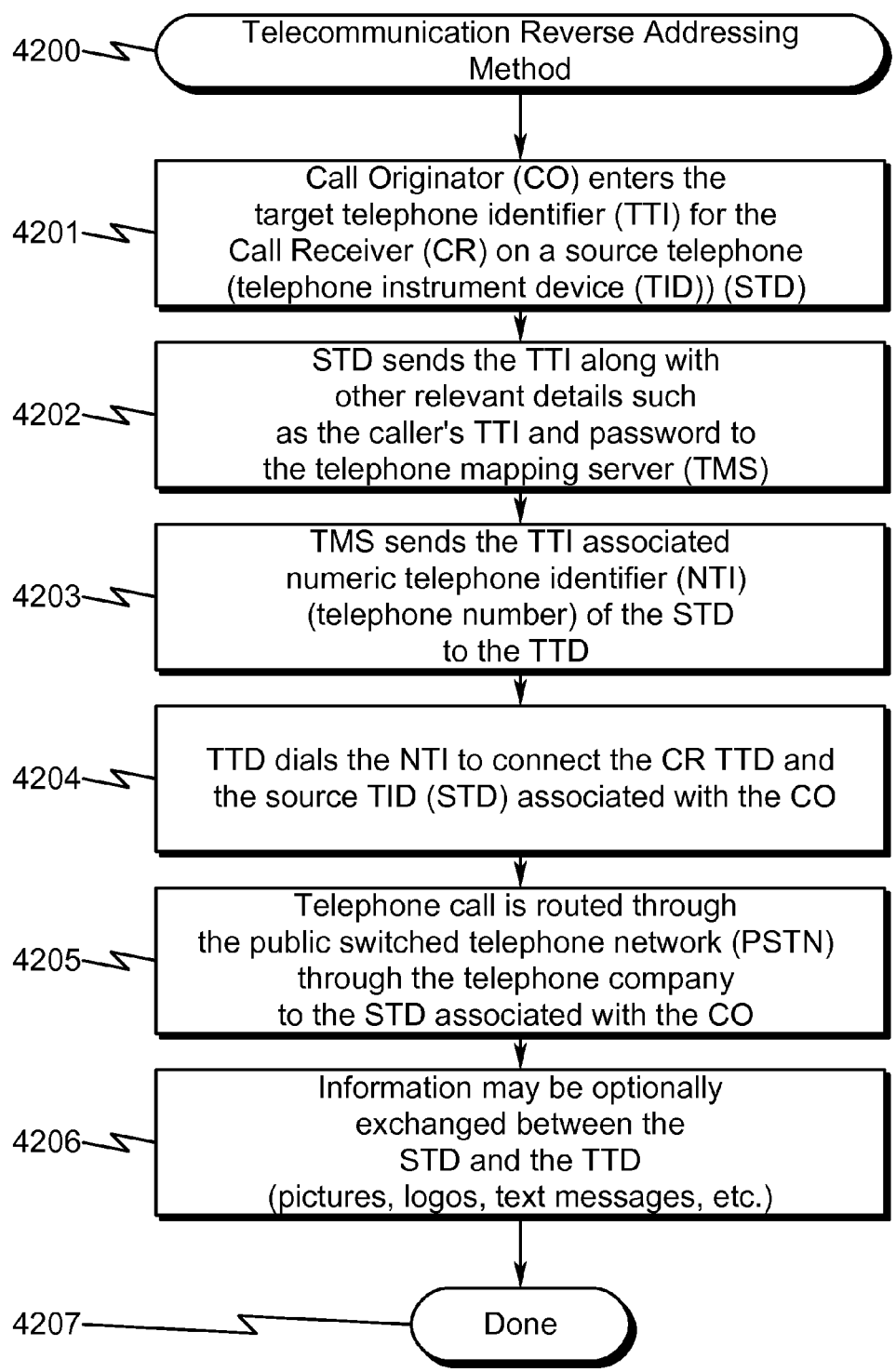
FIG. 42 illustrates a preferred exemplary method embodiment implementing reverse callback addressing.

In certain circumstances the present invention may incorporate "reverse callback" functionality as generally illustrated in FIG. 41 (4100) and FIG. 42 (4200). In this configuration the responsibility of initiating the telephone call rests with the TTD (4130) rather than the STD (4120) as generally illustrated in FIG. 41 (4100).

Exemplary Reverse Callback System (4100)

As generally illustrated in FIG. 41 (4100), the STD (4120) initiates a telephone call by making a request for TTI/NTI lookup (4122) to the TMS (4111). The TMS (4111) then sends the NTI of the STD (4132) to the TTD (4130) along with a request (4133) to the TTD (4130) to initiate a call (4134) to the STD (4120). The initiated call (4134) is then routed (4124) to the STD (4120) and the call progresses until call completion (4141).

This reverse callback feature may be advantageously utilized in many circumstances where the cost of call initiation/completion is lower when initiated from the TTD (4130) rather than the STD (4120). The present invention anticipates that in some preferred embodiments the TMS (4111) may incorporate cost analysis software to determine the optimal cost of call completion and automatically select between call originator (CO) (STD) (4120) and call receiver (CR) (TTD) (4130) origination of the telephone call.

This technique that permits the TTD to initiate the return call to the STD rather than the STD initiating the telephone call may have advantage in situations where the TTD doesn't want the STD to have knowledge of their true NTI. For example, a person in witness protection might want the ability to be contacted, but without any ability for the call originator to identify their telephone number or location. This might permit, for example, a celebrity to create a temporary TTI and permit access to their phone for a set period of time but not permit callers access to their real NTI that they use on a daily basis. Other applications to secure communications are anticipated using this "reverse callback" technology.

Exemplary Reverse Callback Method (4200)

A detail of an exemplary reverse callback method is provided in FIG. 42 (4200), wherein the steps associated with the method include the following:

(1) The Call Originator (CO) enters the target telephone identifier (TTI) for the Call Receiver (CR) on a source telephone (telephone instrument device (TID)) (STD) (4201).
(2) The STD sends the TTI along with other relevant details such as the caller's TTI and password to the telephone mapping server (TMS) (4202).

(3) The TMS sends the numeric telephone identifier (NTI) (telephone number, and possibly other information objects such as pictures, logo, short messages, GPS location, GPS location translation, etc.) of the STD to the TTD (4203).

(4) TTD dials the NTI to connect the CR TTD and the source TID (STD) associated with the CO (4204).

(5) The telephone call is routed through the public switched telephone network (PSTN) through the telephone company central office (CCO) to the STD associated with the CO (4205).

(6) CO (if properly equipped with application specific software) may optionally connect to TMD and get CR info such as CR TTI, picture/logo, GPS location, GPS location translation, etc. (cross-information transmission between TTD and STD may be implemented) (4206).

It should be noted that TTD reverse callback in this context may be used by the TMS (4111) to force the TTD (4130) to dial more than one STD (4120) to initiate conference calls and the like.

Collect Calls

The reverse callback methodology depicted in FIG. 41 (4100)-FIG. 42 (4200) may also be used to implement "collect" calls in which the call receiver is prompted by the TMS to initiate the call from the TTD to the STD and thus make the TTD responsible for the calling charges. This is similar to telephone company "collect calling" but in this situation the telephone company is not involved in the transaction. Normally the STD is the CO and the TTD is the CR. But this role is reversed in this collect calling scenario where the TTD is the CO initiating the call and the STD is a call receiver (CR) who "invites/requests" the TTD to initiate a call. Both STD and TTD device user interface/displays may provide options to send and receive the request. The may be implemented by having a COLLECT CALL/ACCEPT CALL menu option on the TUI display. When the STD user selects this option then the functionality shown in FIG. 41 (4100)-FIG. 42 (4200) is initiated to make the collect call and when such a call is indicated on the TTD, the TTD user may either select the COLLECT CALL/ACCEPT CALL option or CANCEL to reject the collect call.

Optimized Telecommunications Addressing (4300)

Figure 43:
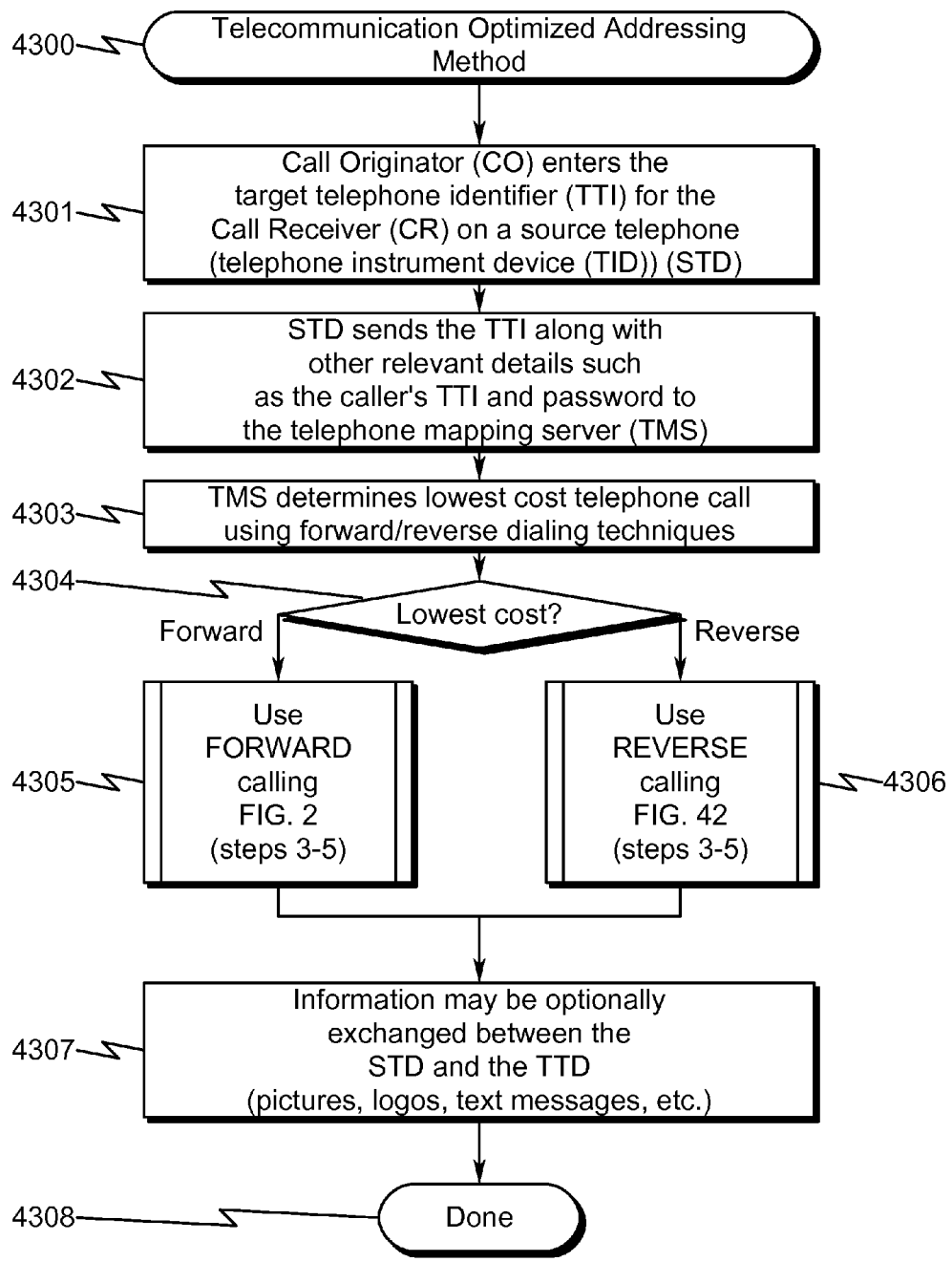
FIG. 43 illustrates a preferred exemplary method embodiment implementing optimized addressing with a view to reducing telephone charges.

One skilled in the art will recognize that the method depicted in FIG. 42 (4200) may be used in conjunction with the method in FIG. 2 (0200) to provide for a telecommunications addressing method that selects between "forward dialing" (STD-to-TTD) and "reverse dialing" (TTD-to-STD) based on a goal of minimizing expected telephone call costs associated with the selected call completion technique. This method as depicted in FIG. 43 (4300) generally comprises the following steps:

(1) The Call Originator (CO) enters the target telephone identifier (TTI) for the Call Receiver (CR) on a source telephone (telephone instrument device (TID)) (STD) (4301).

(2) The STD sends the TTI along with other relevant details such as the caller's TTI and password to the telephone mapping server (TMS) (4302).

(3) The TMS determines the lowest cost telephone call using forward/reverse dialing techniques (4303).

(4) If the lowest cost telephone call is a reverse call, control is passed to step (6) (4304).

(5) FORWARD calling is utilized invoking steps (3)-(5) in FIG. 2 (0200) and control is passed to step (7) (4305).

(6) REVERSE calling is utilized invoking steps (3)-(5) in FIG. 42 (4200) (4307).

(7) CO (if properly equipped with application specific software) may optionally connect to TMD and get CR info such as CR TTI, picture/logo etc. (cross-information transmission between TTD and STD may be implemented) (4307).

It should be noted that this optimized calling procedure may permit multiple STDs to communicate with multiple TTDs in conference calls and the like as was previously discussed in the call forward and call reverse cases discussed previously.

Queued Telecommunications Addressing (4400)-(4800)

In any of the scenarios in which the present invention may be implemented the system/method may incorporate methodologies to support queued addressing of the TTD. In this manner, a TTD may manage a "queue" of incoming calls from various STDs and prioritize the order of the communications that occurs between the TTD and the STDs. Incoming calls from various STDs may be given priorities by the TTD based on TTIs and/or NTIs associated with the incoming calls. Furthermore, the STDs may be notified by the TMS of their priority, queue index (number of higher priority calls), and estimated wait time for connection to the TTD.

Exemplary Queued Telecommunication System (4400, 4500)

Figure 44:
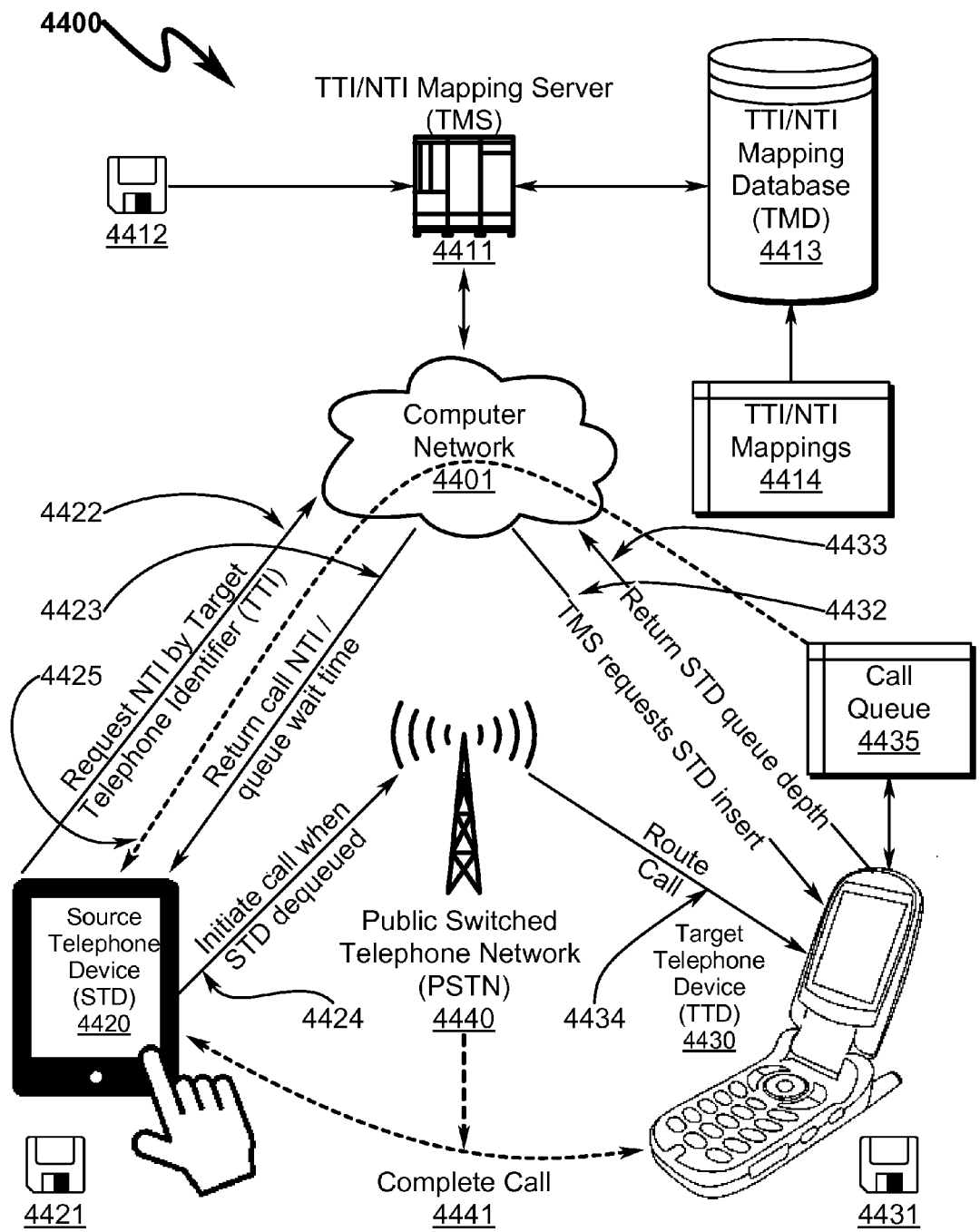
FIG. 44 illustrates a preferred exemplary system embodiment implementing queued forward call processing.
Figure 45:
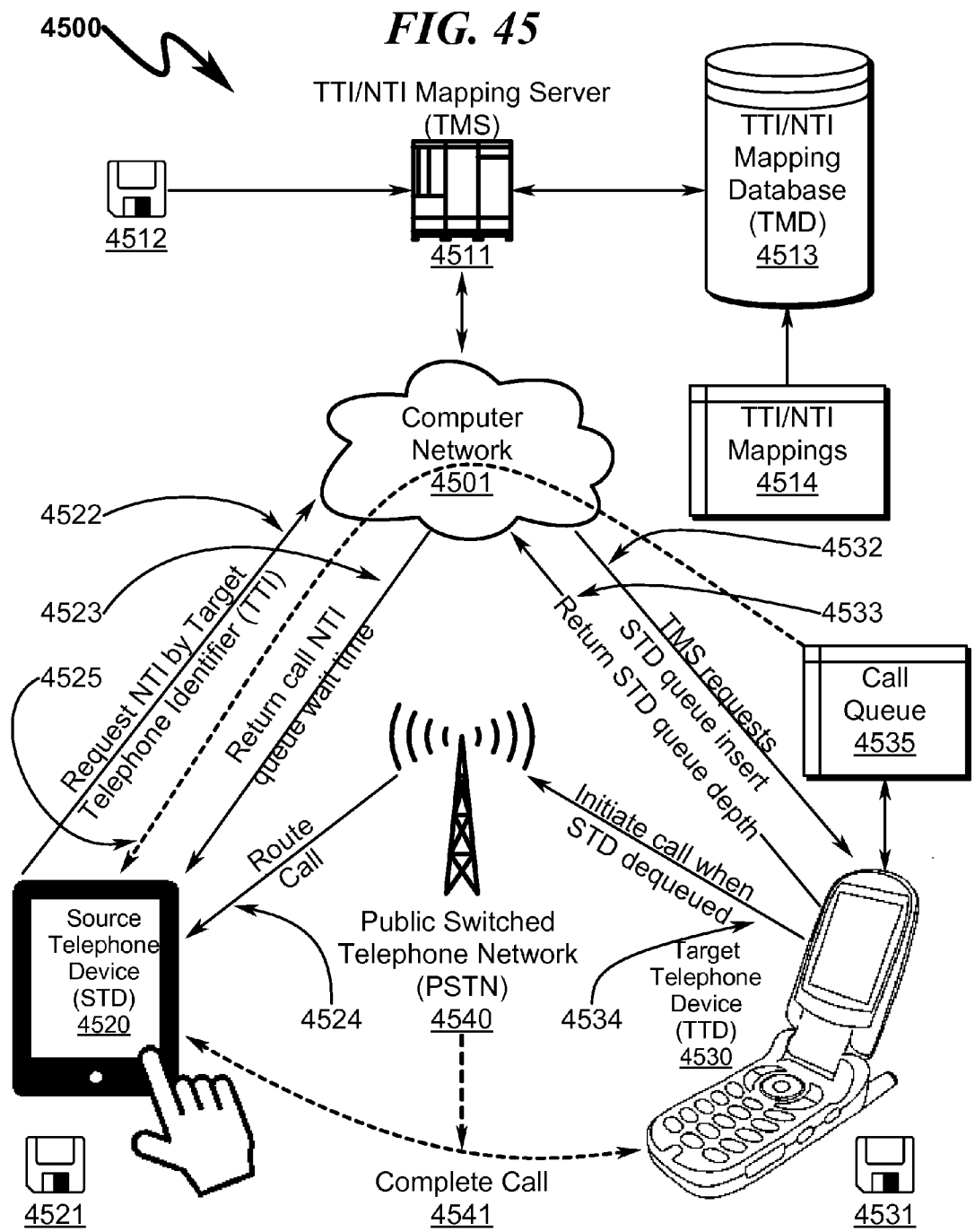
FIG. 45 illustrates a preferred exemplary system embodiment implementing queued reverse call processing.

An exemplary system embodiment of this as applied to forward call processing is generally illustrated in FIG. 44 (4400) which generally parallels FIG. 1 (0100) (a corresponding parallel to the reverse callback system in FIG. 41 (4100) is generally provided in FIG. 45 (4500)). Here the TTD (4430) incorporates a call queue (4435) that is maintained to order incoming call requests from the TMS (4411). The TTD (4430) prioritizes the incoming call request (4432) and returns the STD queue priority (4433) to the TMS (4411). The TMS (4411) then returns the NTI (4423) along with this information (4425) to the STD (4420) and coordinates call initiation (4424) when the STD has been dequeued (made active) by the TTD (4430). Information regarding the call queue wait time (4423) and other information regarding the status of the TTD (4430) may be communicated to the STD (4420) to permit optimum allocation of time and resources on the STD (4420) during the pendency of the telephone call request to the TTD (4430). A similar system scenario is depicted in FIG. 45 (4500) with the exception that the call initiation (4534) is done by the TTD (4530) rather than the STD (4520).

Note that in both scenarios depicted in FIG. 44 (4400) and 45 (4500) the call between the STD-to-TTD (FIG. 44 (4400)) or TTD-to-STD (FIG. 45 (4500)) is not necessarily initiated until the STD request for communication has been dequeued for active service by the TTD (4430, 4530). This means that there is no need to add to telephone congestion within the PSTN (4440, 4540) during the wait time for communications initiation. This can greatly reduce the susceptibility of the PSTN (4440, 4540) to overload failures during peak demand events (natural disasters, etc.) and provide an orderly methodology of processing incoming calls to the TTD during periods of "impulse" demand.

These systems may as described herein also be integrated with calendaring software on the TTD and/or STD to schedule a time for service of the STD-initiated call by the TTD. Thus, one potential response for the STD call initiation to the TTD is for the TTD and/or STD to negotiate a time in the future to initiate the actual telephone call if at present the parties cannot agree on communicating.

Exemplary Queued Telecommunication Addressing Method (4600)

Figure 46:
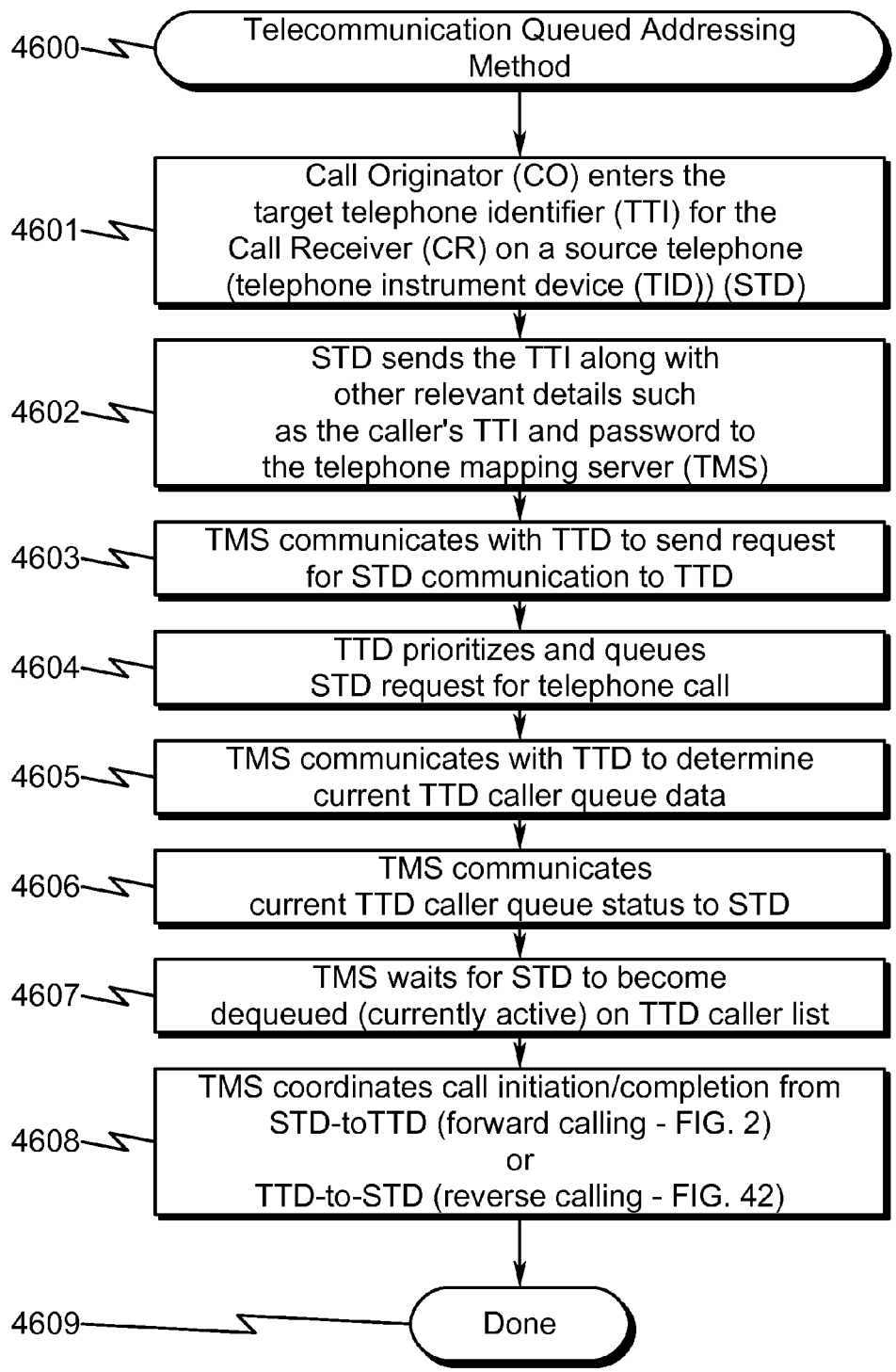
FIG. 46 illustrates a flowchart depicting a preferred exemplary method embodiment implementing queued call processing.

A detail of an exemplary queued telecommunication addressing method is provided in FIG. 46 (4600), wherein the steps associated with the method include the following:

(1) The Call Originator (CO) enters the target telephone identifier (TTI) for the Call Receiver (CR) on a source telephone (telephone instrument device (TID)) (STD) (4601).

(2) The STD sends the TTI along with other relevant details such as the caller's TTI and password to the telephone mapping server (TMS) (4602).

(3) The TMS communicates with the TTD to send a request for STD communication to the TTD (4603).

(4) The TTD prioritizes and queues the STD request for a telephone call (4604).

(5) The TMS communicates with the TTD to determine the current TTD caller queue depth (4605).

(6) The TMS communicates the current TTD caller queue status to the STD (4606).

(7) The TMS waits for the STD to become dequeued (currently active) on the TTD caller list (4607).

(8) The TMS coordinates call initiation/completion from the STD-to-TTD (forward calling using FIG. 2 (0200)) or TTD-to-STD (reverse calling using FIG. 42 (4200)) (4608).

One skilled in the art will recognize that information in the TMD relating to the TTIs of the STD and/or TTD may be used within this process to prioritize the call within the TTD call processing queue. This information may (for example) be used to raise the priority of call processing for some incoming calls dynamically based on information held/maintained by the TMD. This might have application in situations where calls are "escalated" within the technical support centers operated within the context of TTD call centers.

As mentioned previously, this method may incorporate calendaring functions to schedule calls between the STD and TTD based on mutually agreeable times defined either by the users or automatically determined by the TMS after scanning calendar information provided by the STD and TTD.

Exemplary Incoming Call Queue Display (4700)

Figure 47:
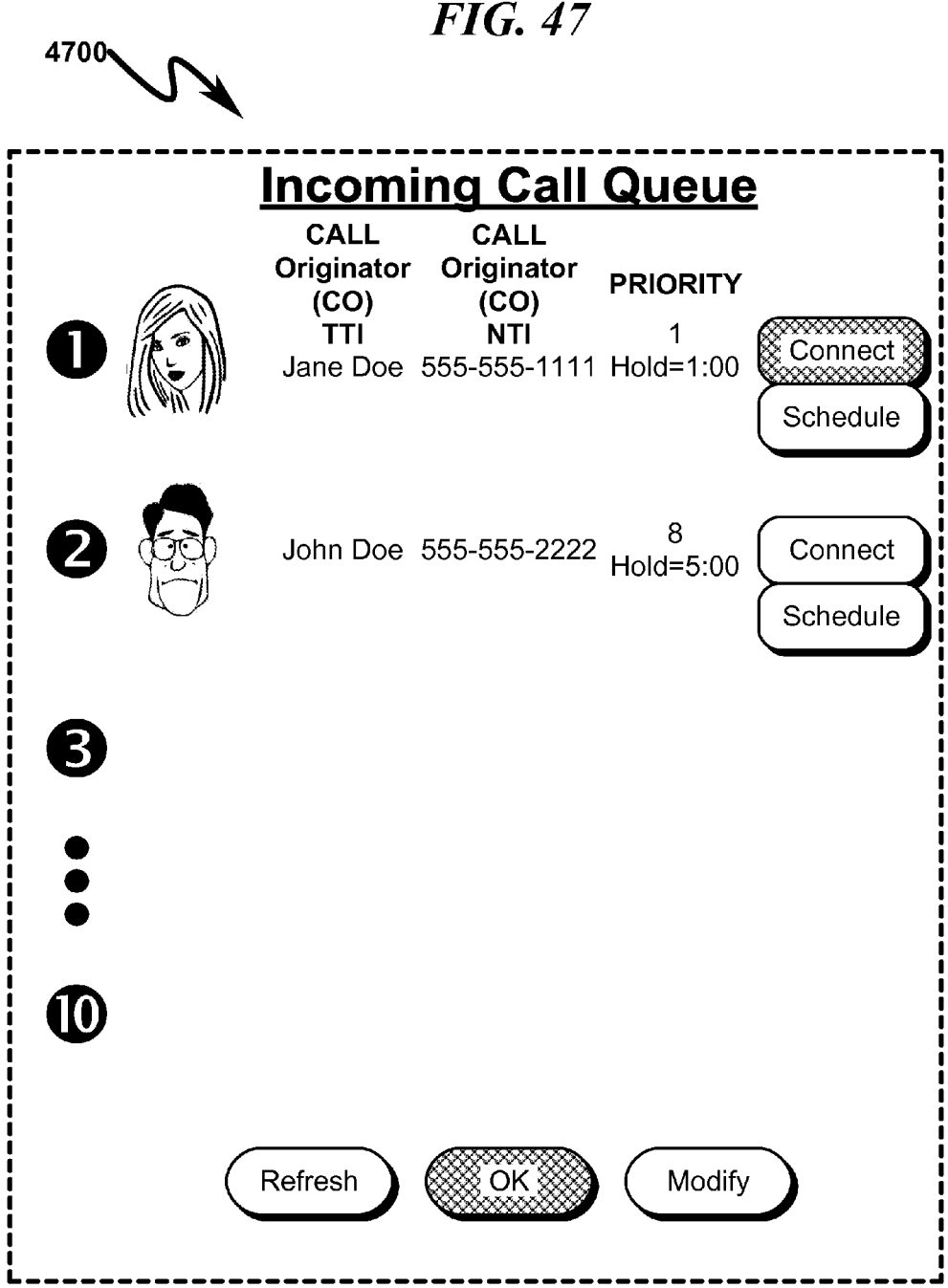
FIG. 47 illustrates an exemplary user interface depicting a TTD incoming call queue prioritization display.

As generally depicted in FIG. 47 (4700), some preferred invention embodiments may utilize an incoming call queue prioritization user interface that permits TTD incoming calls to be displayed for inspection and review. This user interface may have many forms, but in some preferred embodiments may incorporate a list of TTIs that are queued for communication with the TTD along with their TTI/NTI information, processing priority, hold time, etc. This information may be updated by the TTD user and used to select a given incoming STD call for processing immediately, or optionally scheduled for processing later using a calendaring function. The calendaring function may operate to coordinate calendars on the STD and TTD to accommodate a mutually agreeable time; it may select from meeting times proposed by the STD; or it may select time slots available on the TTD and send this information back to the STD for confirmation of a fixed call initiation time.

This incoming call queue display function is a significant improvement over conventional "call waiting" technology implemented in current telephones for several reasons, including but not limited to:

Unlike conventional "call waiting," any number of TTD incoming calls may be queued for processing (and later connection through the PSTN) without the need for the telephone call to be processed by the PSTN at the time the call is queued.

Calls may be prioritized by the STD, the TTD, and information stored in the TMD that associates a "baseline" priority for the STD-TTD communication link.

The prioritization of incoming calls is dynamic and capable of queue priority reordering as incoming calls are processed.

TTDs connected to PSTN infrastructure that supports "call waiting" may support TWO incoming queues (one for each 'virtual' telephone line in the call waiting infrastructure).

While the TTD may receive calls from any number of STDs, each STD may have initiated the call to the TTD using a different TTI, allowing prioritization of incoming calls using TTI differentiation. For example, TTIs for "ACME Service—Warranty Repair" and "ACME Service—Critical Machine Down!" may resolve to the same TTD, but with different service priorities.

Unlike conventional "call waiting" support in the PSTN, the incoming call queue display never issues a "busy" signal to the STD initiating the call. Rather, the call can be queued for processing or scheduled for a callback by the TTD.

Unlike conventional "call waiting" support in the PSTN, the incoming call queue display has full knowledge of all incoming calls from any STD, not just a single "call waiting" STD.

One skilled in the art will recognize that this list is non-exhaustive and only exemplary of the benefits of call queuing as taught by the present invention.

Exemplary Outgoing Call Queue Display (4800)

Figure 48:
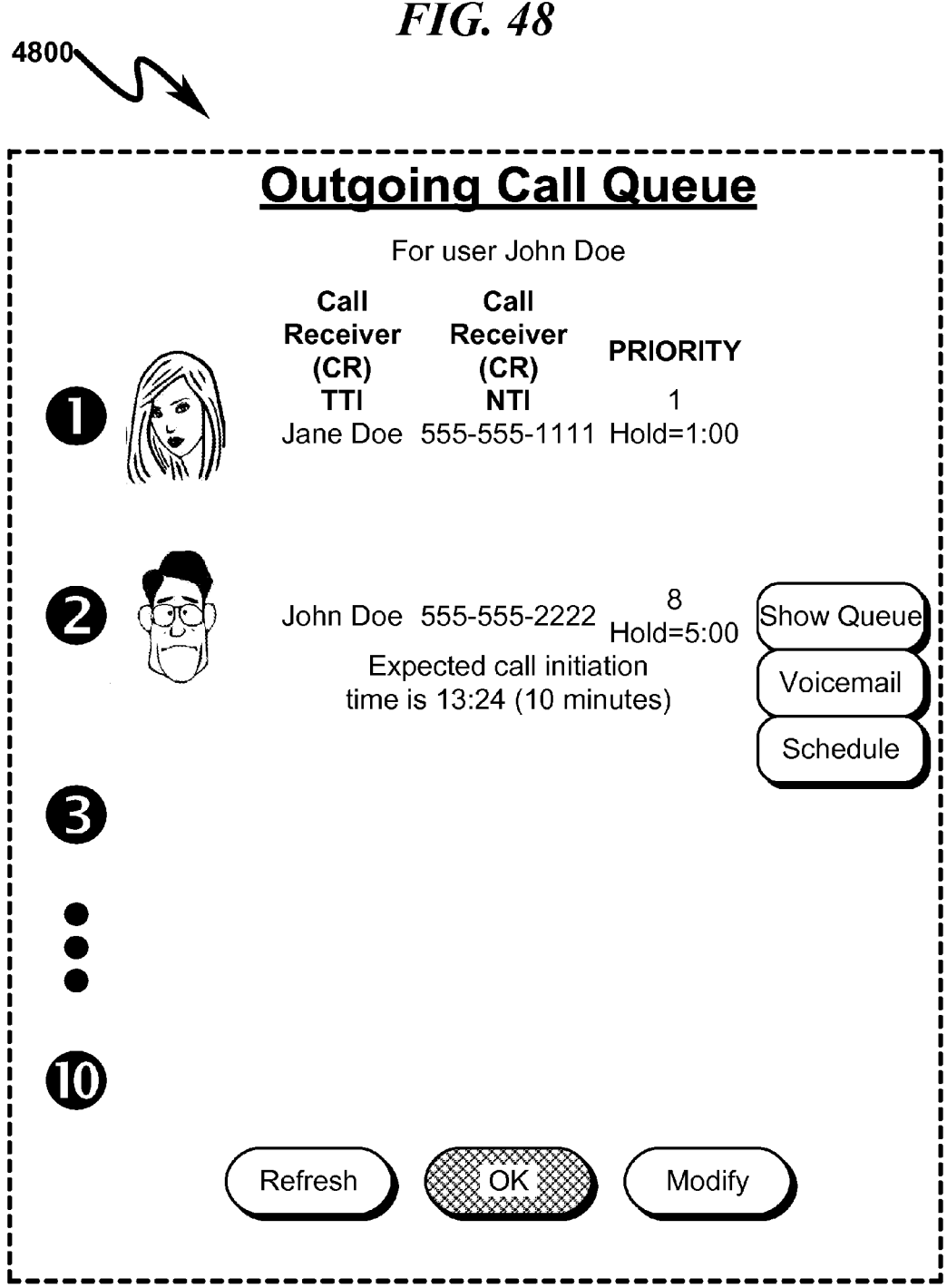
FIG. 48 illustrates an exemplary user interface depicting an STD outgoing call queue status display.

As generally depicted in FIG. 48 (4800), some preferred invention embodiments may utilize an outgoing call queue status user interface that permits STD outgoing call status to be displayed. This user interface may have many forms, but in some preferred embodiments may incorporate a list of TTIs that are queued for communication with the STD along with their TTI/NTI information, current queue priority, hold time, expected call initiation time, etc.

This status display may permit the STD to leave a voicemail message (in addition to their TTI/NTI information) as well as opt for alternate call processing by the TTD (escalated call processing to the next administrative level within the TTI hierarchy). As with the TTD display, this status display may permit a scheduled call initiation time to be determined by the STD as a request for STD-to-TTD communication to occur at a specific time (or range of times) in the future.

Calendaring Interface (4900)-(5000)

As generally illustrated in FIG. 49 (4900), the present invention anticipates that the TMS (4911) may interface with a computing device (4920) (desktop, laptop, tablet, mobile device, STD, TTD, etc.) that incorporates some form of calendaring software (4921). This TMS (4911) TTI Application Software I/F (4922) interfaces with the calendaring software (4921) in real-time and reads status information (regarding meetings/out-of-office/busy, etc.) on user schedules and updates TTI calendaring profiles (4914) within the TMD (4913).

An exemplary user interface for the TTI application software (4922) is depicted in FIG. 50 (5000). As with call blocking and call restriction (parental control) functionality, the TMS may check the call schedule before routing calls to "Dr. John Howard". This check is generally performed for all call recipients. As depicted, entries on this user interface page can be made directly by the account holder after logging in by using add/delete options options/buttons on the page or entries could be added/deleted by remote software described in FIG. 49 (4900). One skilled in the art will recognize that this user interface could be integrated within application calendaring software (4921) rather than implemented as a separate application (4922). The default option for call receivers is that they are available and will receive calls unless otherwise restricted or blocked.

Note that call forwarding in this context may be used to dynamically forward calls based on TTI. In the example depicted in FIG. 50 (5000), STDs attempting to contact the TTI 'DRJH' will be redirected to the TTI 'JHWKNDHM' (Dr. John Howard's weekend home) during the period of the specified vacation. This methodology of dynamically redirecting calls can be used to time screen calls and/or ensure that important calls are properly redirected to a TTD that may be accessed by the call receiver.

Call Initiation/Integration Interface (5100)

In some circumstances the present invention may be integrated as a plug-in or add-on to existing software within a computing device as generally illustrated in FIG. 51 (5100). Here a computing device (5120) (desktop, laptop, tablet, mobile device, STD, TTD, etc.) may incorporate host software (5121) that may comprise a web browser or other host software that has knowledge of TTI/NTI data associated with the STD owner. This host software (5121) may be augmented with a plug-in/add-on (5122) that has knowledge of the TTI and/or password associated with the STD, and may be used to interface the computing device (5120) to the TMS (5111) for the purposes of performing TTI/NTI translations (5114) using the TMD (5113).

The TMS (5111) receives the STD TTI and/or password from the STD (5120) along with the TTI of the selected call recipient and sends this information to the TMS (5111) for translation against the TMD (5113). Scheduling software (5115) within the TMS (5111) then directs call initiation between the STD and TTD if no scheduling conflict exists and the STD call processing is initiated.

This scenario illustrates that existing computing platforms (5120) having a wide variety of host applications can be augmented with TTI application software (5122) that can interface with the TMS (5111) and affect operation of the invention in a wide variety of application contexts.

Parental Controls/Call Restrictions (5200)-(5300)

Parental Controls/Call Restrictions Dialog (5200)

Figure 52:
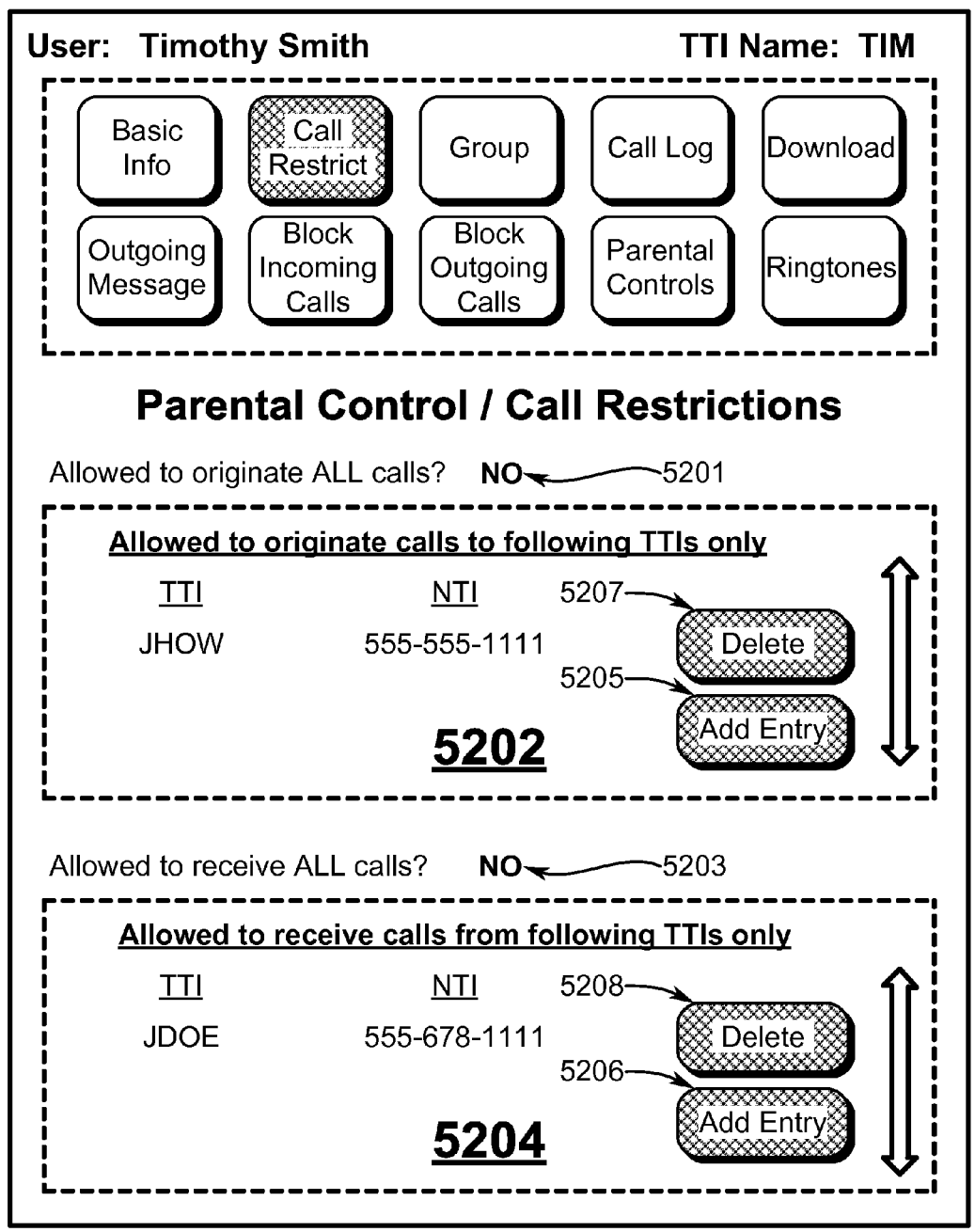
FIG. 52 illustrates an exemplary parental control/call restrictions definition user interface dialog.

The TMS in processing telephone calls between the STD and TTD may in some embodiments implement parental controls/call restrictions functionality in which outgoing and/or incoming calls associated with the STD and/or TTD may be restricted to particular TTIs (or TTI trees). An exemplary user interface dialog implementing this functionality is generally depicted in FIG. 52 (5200) wherein outgoing calls may be blocked (5201) within a dialog definition (5202) as well as incoming calls may be blocked (5203) within a corresponding dialog definition (5204). Entries may be added (5205, 5206) or removed (5207, 5208) from these restriction lists as necessary. This exemplary dialog permits specification of the call restrictions based on TTI and/or NTI as desired. Note that the present invention anticipates that parental controls may permit only specific outgoing calls and/or specific incoming calls. Other variations of this call permission/blocking methodology may permit TTI trees of outgoing calls or TTI trees of incoming calls or the selection of TTI trees that may be specifically blocked.

Once the call restriction list is defined as indicated in FIG. 52 (5200), this information is stored in the TMD and used by the TMS to determine if a given telephone call is to be processed/completed.

Parental Controls/Call Restrictions Method (5300)

Figure 53:
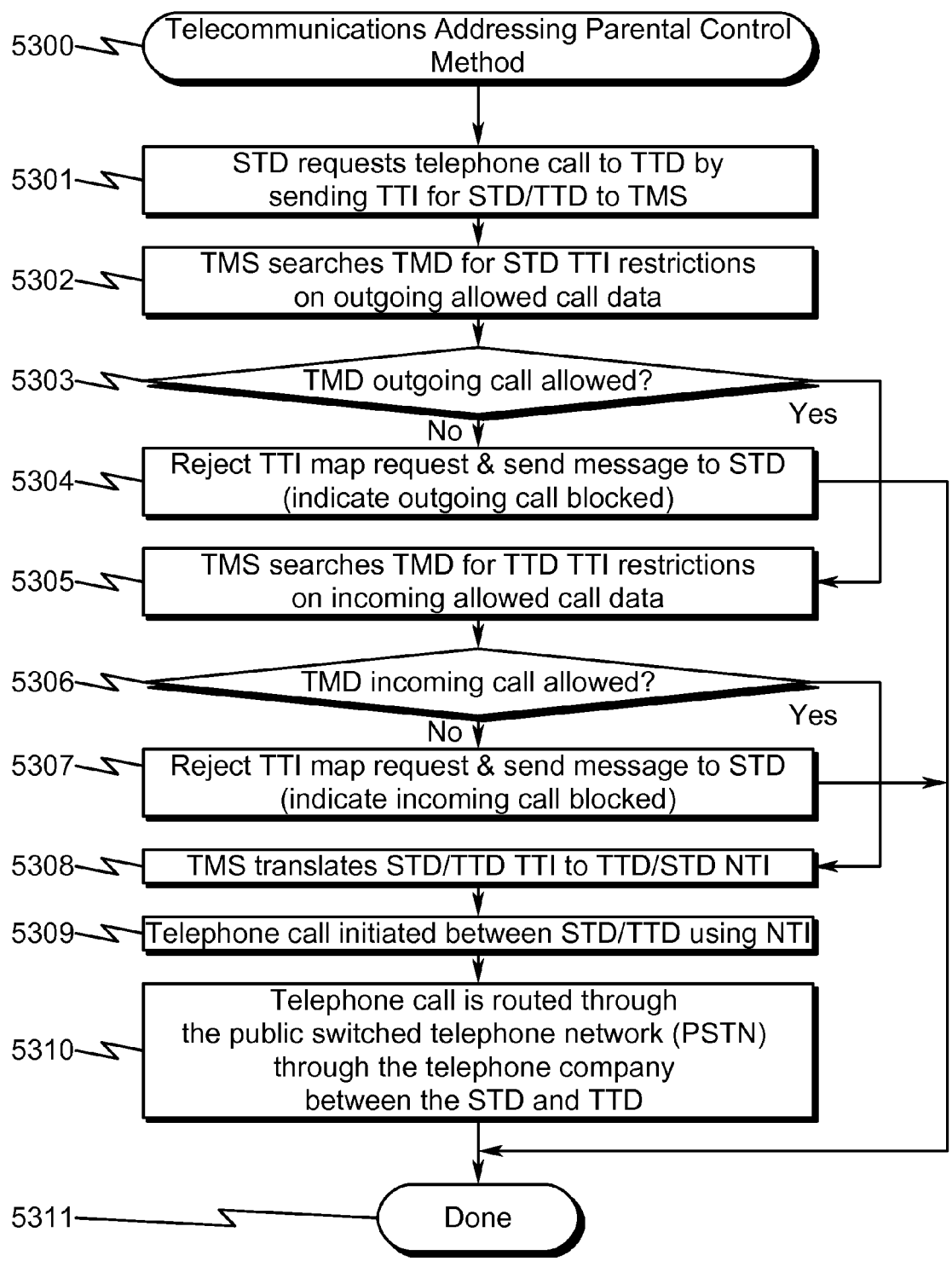
FIG. 53 illustrates an exemplary parental control/call restrictions method.

The above described parental control/call restriction system may operate in conjunction with a corresponding method as depicted in FIG. 53 (5300) comprising the following steps:
(1) requesting a telephone call between the STD and the TTD using a STD-supplied TTI that is sent to the TMS (5301);
(2) searching the TMD with the TMS for STD TTI outgoing allowed call data (5302);
(3) determining if the outgoing call is allowed, and if so, proceeding to step (5) (5303);
(4) rejecting the TTI map request and sending a message to the STD indicating the outgoing call is blocked and proceeding to step (11) (5304);
(5) searching the TMD with the TMS for TTD TTI incoming allowed call data (5305);
(6) determining if the incoming call is allowed, and if so, proceeding to step (8) (5306);
(7) rejecting the TTI map request and sending a message to the STD indicating the incoming call is blocked and proceeding to step (11) (5307);
(8) translating the STD/TTD TTI using the TMS and TMD to generate an associated TTD/STD NTI (this translation may vary based on whether the telephone call processing uses forward or reverse dialup procedures) (5308);
(9) initiating the telephone call between the STD/TTD using the translated TTD/STD NTI (5309);
(10) routing the telephone call through the PSTN between the STD and TTD (5310); and
(11) processing the telephone call to completion (5311).

As can be seen from this general procedure, parental controls may be implemented to allow only specific outgoing calls from the STD telephone and/or allow only specific incoming calls to the STD telephone. This general method summary may be augmented by the various elements described herein to produce a wide variety of invention embodiments consistent with this overall design description.

Call Location Identification (5400)-(5600)

The present invention anticipates that in some preferred embodiments the location of one or more of the TIDs associated with a telephone call may be displayed on other TIDs associated with the telephone call. For example, current mobile phones display the STD's phone number along with their phone location on the TTD's display. This location is based on where the STD phone number was registered with the telephone companies or the STD person's address registered with the phone company. This is often misleading, because the STD's actual physical location at the time of placing call could be anywhere in the world. For example, while the 732 area code is associated with central New Jersey, a person who has a 732 area code phone number would show up as Somerset N.J. on the TTD's phone.

The present invention anticipates that GPS information associated with a TID may be used to provide other persons associated with the telephone call with information regarding the location of the other telephone call participants. The present invention anticipates that the STD will communicate their actual physical location to the TMS at the time the telephone call is initiated. This information about STD will be sent to the TTD along with other information such as the STD TTI, a picture/logo associated with the STD, etc. Similarly, the TTD may also communicate it's actual physical location to the TMS and the TMS may provide this information to the STD. In this manner both the STD and TTD will know each other actual physical location at the time of the telephone call.

This feature is extremely useful for parents who would want to keep track of where their children are located when they call them. This feature would also allow companies to keep physical track of their employees who travel as part of their work duties (e.g., salesmen, delivery men, drivers, etc.).

It is anticipated that in many preferred invention embodiments the TMS will contain a STD/TTD user profile allowing the call location information to be blocked if this feature is disabled by the STD/TTD user.

Exemplary Call Location Identification System (5400)

Figure 54:
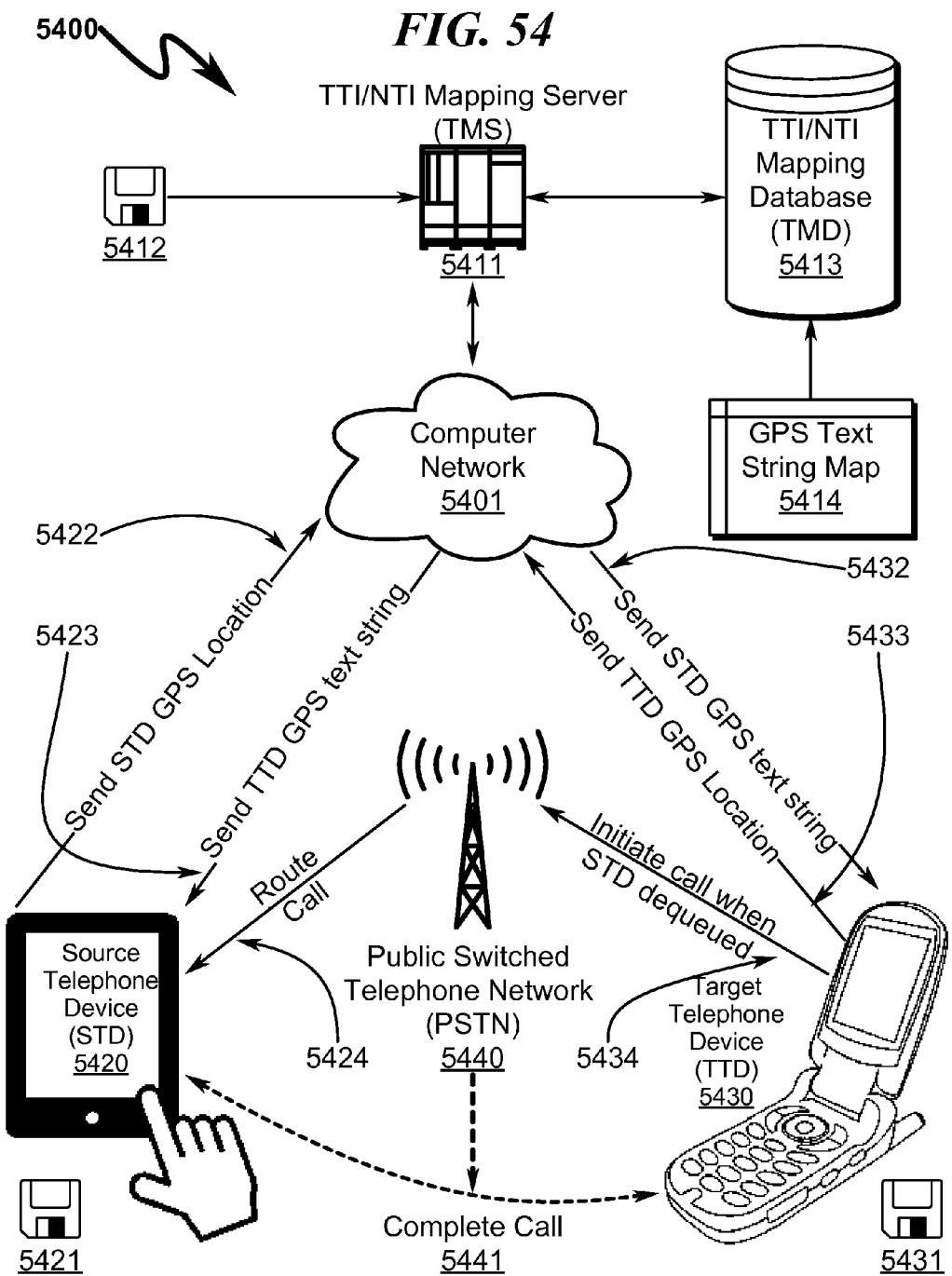
FIG. 54 illustrates a preferred exemplary system embodiment incorporating GPS location tracking.

An exemplary system embodiment of the present invention implementing call location identification is generally illustrated in FIG. 54 (5400). Here the call processing generally mimics other system embodiments (as depicted in FIG. 2 (0200), FIG. 4 (0400), FIG. 42 (4200), FIG. 43 (4300), FIG. 46 (4600) and elsewhere herein). However, in this preferred embodiment the STD (5420) transmits its GPS location (5422) to the TMS (5411) which then translates this information to a STD GPS text string via lookup in the TMD (5413) (or some other database) and transmits this STD GPS text string (5432) to the TTD (5430) for display. Similarly, the TTD (5430) transmits its GPS location (5433) to the TMS (5411) which then translates this information to a TTD GPS text string via lookup in the TMD (5413) (or some other database) and transmits this TTD GPS text string (5423) to the STD (5420) for display.

Within this context the database lookup (5413) may incorporate a variety of GPS text mapping strings (5414) that are user-defined or defined in terms of known geographical landmarks (e.g., "near Statue of Liberty, NYC"). Within this context the TMD (5413) may incorporate flags to indicate "LOCATION BLOCKED" for either the STD and/or TTD to disable this call location identification feature. This GPS location blocking feature may also be in some instances enabled in the application software running on the STD (5420) or the TTD (5430).

Exemplary Call Location Identification Method (5500)

Figure 55:
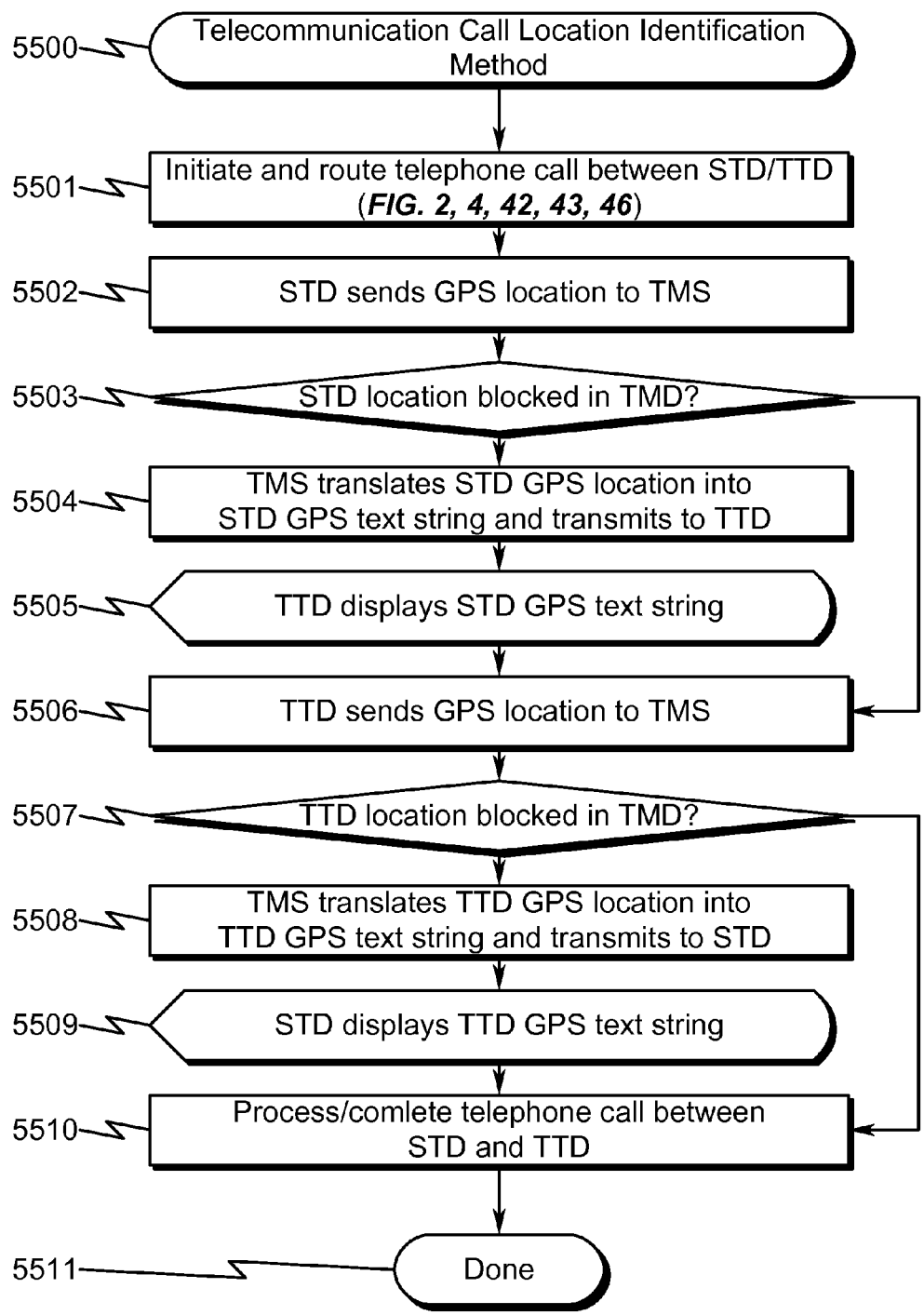
FIG. 55 illustrates a preferred exemplary method embodiment incorporating GPS location tracking.

The present invention preferred exemplary call location identification method embodiment anticipates a wide variety of variations in the basic theme of implementation, but can be generalized as depicted in FIG. 55 (5500) as a telecommunications addressing method, the method operating in conjunction with a telecommunications addressing system, the system comprising:
  (a) telephone mapping server (TMS);
  (b) telephone mapping database (TMD);
  (c) source telephone instrument device (STD);
  (d) target telephone instrument device (TTD); and
  (e) computer communication network (CCN);
  wherein
  said TMS is configured to store information that identifies a telephone instrument device (TID) in said TMD;
  said TMS is configured to locate a numeric telephone identifier (NTI) within said TMD using a target telephone identifier (TTI) data string as the locating index;
  said NTI permits said TID to be accessed via a public switched telephone network (PSTN); and
  said TMS is configured to initiate a telephone call via said PSTN between said STD and said TTD using said NTI;

wherein the method comprises the steps of:
  (1) initiating and/or routing a telephone call between the STD and TTD (as generally depicted in any of FIG. 2 (0200), FIG. 4 (0400), FIG. 42 (4200), FIG. 43 (4300), FIG. 46 (4600) and elsewhere herein) (5501);
  (2) sending the STD GPS location from the STD to the TMS (5502);
  (3) determining if the STD is flagged as LOCATION BLOCKED in the TMS, and if so, proceeding to step (6) (5503);
  (4) translating the STD GPS location within the TMS using the TMD as a translation database into a STD GPS text string and transmitting this text string to the TTD (5504);
  (5) displaying the STD GPS text string on the TTD (5505);
  (6) sending the TTD GPS location from the TTD to the TMS (5506);
  (7) determining if the TTD is flagged as LOCATION BLOCKED in the TMS, and if so, proceeding to step (10) (5507);
  (8) translating the TTD GPS location within the TMS using the TMD as a translation database into a TTD GPS text string and transmitting this text string to the STD (5508);
  (9) displaying the TTD GPS text string on the STD (5509);
  (10) process and complete the telephone call between the STD and the TTD (5510).

This general method summary may be augmented by the various elements described herein to produce a wide variety of invention embodiments consistent with this overall design description.

Exemplary Call Location Identification Dialog (5600)

Figure 56:
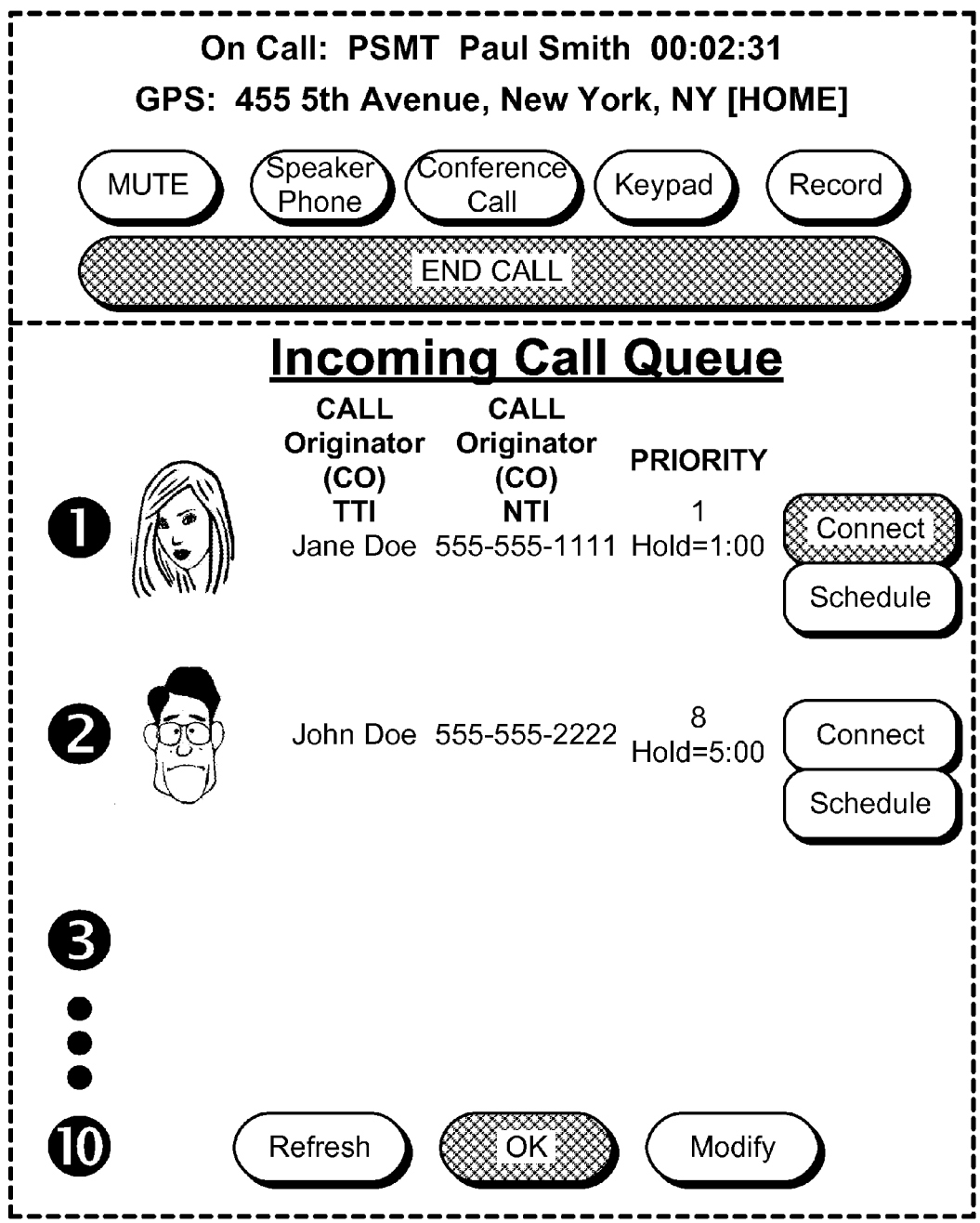
FIG. 56 illustrates a preferred exemplary TTD dialog incorporating GPS location tracking.

An exemplary call location identification dialog screen is generally illustrated in FIG. 56 (5600). Here it can be seen that the caller originator (CO) TTI is indicated ("PSMT") as well as the translated GPS location text string information ("455 5th Avenue, New York, N.Y.") in addition to a cross-referenced user-defined label associated with the GPS text string ("[HOME]"). This ability to user-define certain GPS locations with a variety of additional text identifiers is useful in many circumstances where the call receiver is unfamiliar with the specific GPS location identifiers and the caller wishes to impart additional information in the GPS text string display.

Note that while FIG. 56 (5600) illustrates a typical TTD call receiver (CR) display, a corresponding display may be associated with the STD call originator (CO). With appropriate access controls contained in the TMD, the TMS may manage which TIDs may receive GPS information depending on user access controls defined within the TMD.

The TMD may also incorporate distance modifiers defined by a given TID that may be associated with a given user-defined GPS text strings. For example, "near" may be associated with a distance of 100 yards, making the display read "near HOME" if the TID was within this range but not precisely identified with the GPS location associated with "HOME." The present invention anticipates that polygonal regions may be associated with these distance modifiers to define spatial regions that can be associated with a given GPS text string. For example, a polygonal region may be associated with a park or other recreational facility and the resulting GPS text string might read "within PARK" to indicate this location state.

Exemplary Telephone User Interface (5600)

It should be note that the various STD/TTD telephone user interface (TUI) can take many forms and incorporate many features. Exemplary TUI screens depicted in FIG. 9 (0900)- FIG. 12 (1200), FIG. 47 (4700), FIG. 48 (4800), FIG. 50 (5000) may also incorporate additional features as depicted in FIG. 56 (5600), including but not limited to MUTE, SPEAKER PHONE, CONFERENCE CALL, KEYPAD/KEYBOARD, and CALL RECORDING functions.

Reverse TTI Lookup (5700)-(5900)

Exemplary Reverse NTI Lookup System Embodiment (5700)

Figure 57:
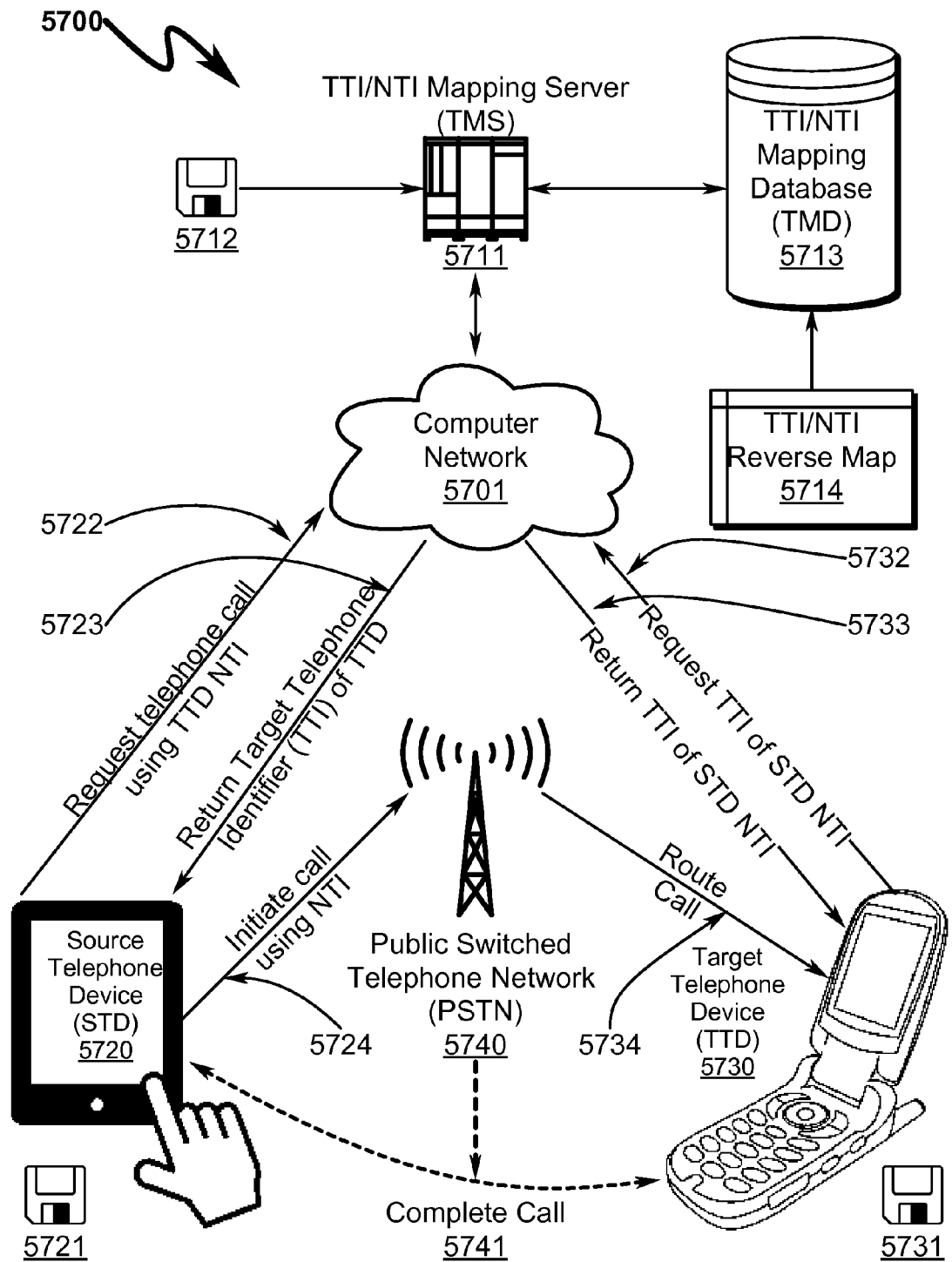
FIG. 57 illustrates an exemplary system embodiment incorporating TTI reverse lookup capability.

As generally illustrated in FIG. 57 (5700), the present invention may also be implemented in a manner supporting "reverse" TTI lookup. In this configuration, a STD (5720) may initiate a telephone call to a TTD (5730) using a conventional numeric telephone identifier (NTI) ("telephone number") via a telephone call TTD NTI request (5722) to the TMS (5711). This TTD NTI request is then used in a "reverse lookup" fashion within the TMD (5713) to determine a TTI tree map (5714) associated with the TTD NTI. This resolved TTD TTI is then returned (5723) to the STD (5720) to allow review of the various calling options possible that are associated with the TTD NTI originally submitted by the STD (5720).

This has many useful applications in situations where a business or company has a main branch telephone number that may be widely distributed and published, but also hundreds (or thousands) of telephone extensions associated with this main telephone number. By allowing the reverse lookup procedure, the TMS (5711) allows the STD (5720) to inspect which of the various telephone extensions or other company branches are a best fit for the target of the telephone call. Once this returned TTD TTI list is inspected and a target TTI selected within this TTD TTI tree, the telephone call can be completed using the other techniques taught by the present invention and discussed herein. Of significance to the TTD in this scenario is the possibility of reducing the number of telephone operators necessary to handle a large volume of incoming calls, as the call routing in this scenario is handled automatically by the TMS (5711) in conjunction with the TMD (5713).

A similar scenario may be utilized from the TTD (5730) perspective in which the TTD (5730) may receive a call having a particular STD CALLER ID telephone number. This STD NTI may be sent via a request (5732) to the TMS (5711) and a reverse lookup performed in order to obtain a returned TTI of the STD NTI (5733). This allows the TTD to populate local information regarding remote callers from a trusted database (the TMD (5713)) without the TTD (5730) having any knowledge of the TTI/NTI reverse mapping data (5714) or the capability of performing a reverse lookup of the TMD (5713) using information local to the TTD (5730).

Exemplary Reverse TTD-NTI Lookup Method Embodiment (5800)

Figure 58:
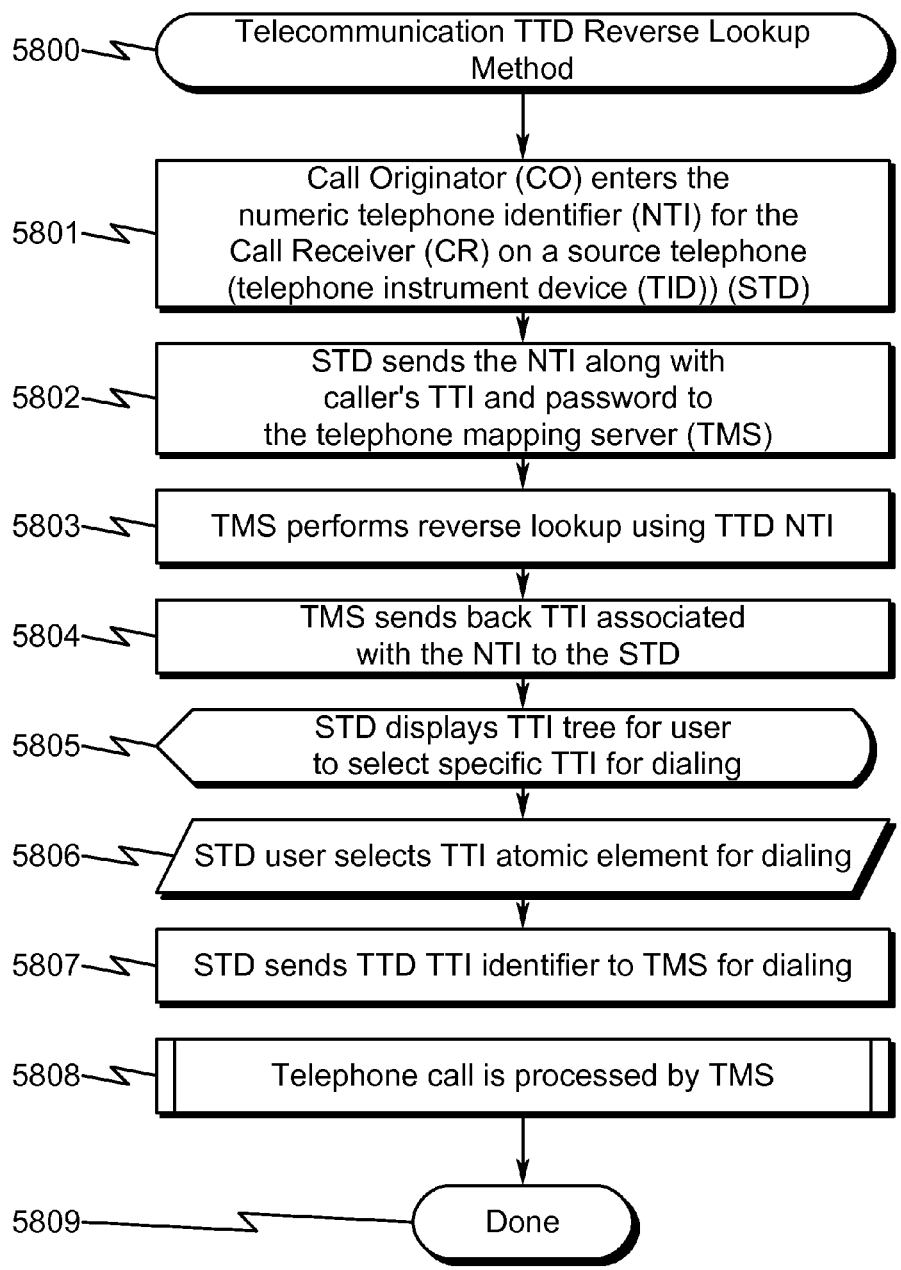
FIG. 58 illustrates an exemplary method embodiment incorporating TTD reverse lookup capability.

As generally illustrated in FIG. 58 (5800) a preferred exemplary method embodiment implementing reverse TTD-NTI lookup (where the STD provides the NTI for reverse lookup) comprises the following steps:

(1) entering a NTI from the call originator (CO) STD (5801);
(2) transmitting the NTI to the TMS (5802);
(3) performing a reverse lookup on the NTI with the TMS using data in the TMD (5803);
(4) translating the TTI tree associated with the NTI to the STD (5804);
(5) displaying the TTI tree on the STD and enabling user selection (5805);
(6) selecting an atomic element within the TTI for dialing by the STD (5806);
(7) transmitting the selected TTI to the TMS for telephone call processing (5807); and
(8) processing the selected target telephone call with the TMS (using procedures outline elsewhere herein) (5808).

This technique also permits the STD to "punch down" into TTI trees associated with businesses and other entities in order to directly select the target telephone identifier (TTI) associated with the intended target of the telephone call, thus eliminating the need for operators and other intervening parties during the telephone connection. This general method summary may be augmented by the various elements described herein to produce a wide variety of invention embodiments consistent with this overall design description.

Exemplary Reverse STD-NTI Lookup Method Embodiment (5900)

Figure 59:
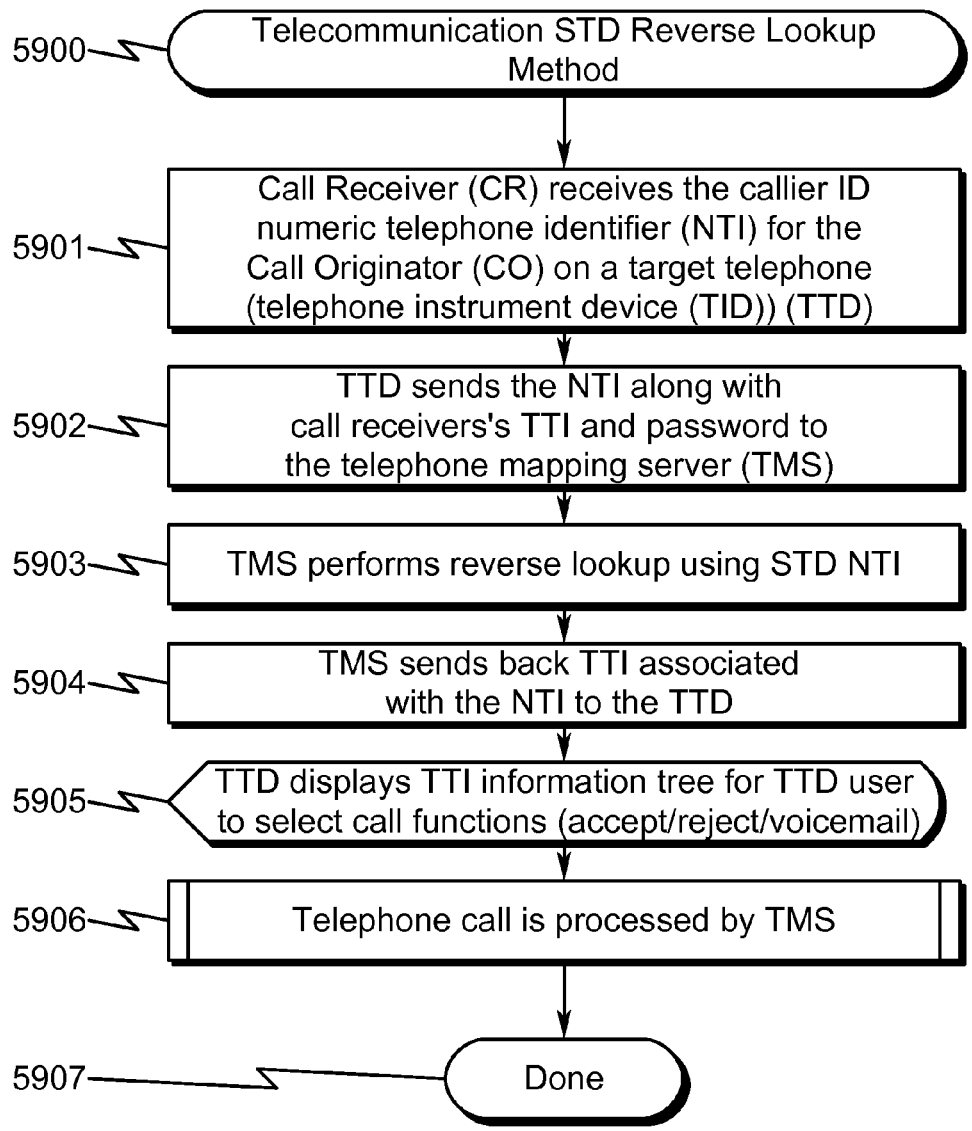
FIG. 59 illustrates an exemplary method embodiment incorporating STD reverse lookup capability.

As generally illustrated in FIG. 59 (5900) a preferred exemplary method embodiment implementing reverse STD-NTI lookup (where the TTD provides the NTI for reverse lookup using CALLER ID data) comprises the following steps:

(1) CALLER ID information sent to the call receiver (CR) provides a NTI for the STD (5901);
(2) TTD sends the STD NTI to the TMS for reverse translation (5902);
(3) TMS performs a reverse lookup translation using the STD NTI (5903);
(4) TMS sends the translated STD TTI associated with the STD NTI to the TTD (5904);
(5) TTD displays the TTI information associated with the STD NTI (5905);
(6) TTD permits TTD user to select call function appropriate to STD TTI content (accept/reject/voicemail/block calls permanently/etc.) (5906); and
(7) processing the selected target telephone call with the TMS with the user-selected call processing options (using procedures outline elsewhere herein) (5907).

This technique allows the TMS to serve as a "gateway" screening function for incoming calls to the TTD by displaying information associated with the STD that allows the TTD user to prioritize and/or redirect the action to be associated with the STD call originator. This information is far more descriptive than that possible with conventional CALLER ID because in many cases only the telephone number is available with CALLER ID and as such other information associated with the STD caller is not available to the TDD user when using CALLER ID alone. This general method summary may be augmented by the various elements described herein to produce a wide variety of invention embodiments consistent with this overall design description.

Outgoing Message (OGM) (6000)-(6200)

The present invention anticipates that since the identity of the incoming caller can be known with some certainty by virtue of information obtained by the TTI/NTI translation and information contained within the TMD (as translated by the TMS), it is possible for calls that are processed by voicemail or other automated greetings to be tailored to individual STDs and their associated TTIs.

Exemplary OGM System Embodiment (6000)

Figure 60:
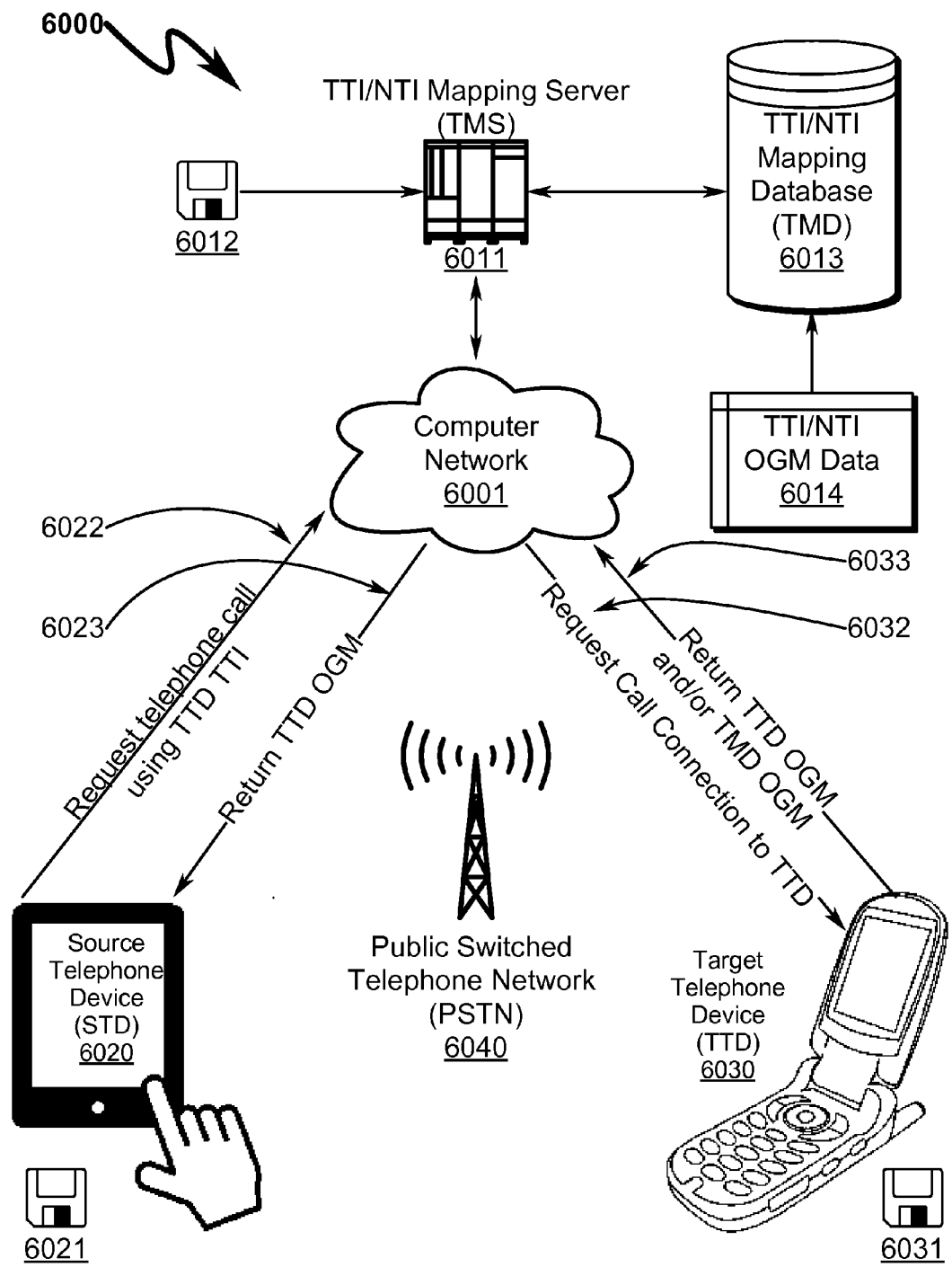
FIG. 60 illustrates an exemplary system embodiment incorporating outgoing message (OGM) capability.

This invention embodiment variation is depicted in FIG. 60 (6000), where the STD (6020) initiates a request for telephone communication (6022) to the TTD using an associated TTI. Assuming that the call cannot be processed (either because the TTD (6030) is unavailable or has blocked/voicemailed the call), the TMS (6011) may opt to utilize TTI/NTI outgoing message (OGM) data (6014) within the TMD (6013) that is provided by the TTD (6040) and which may be specifically indexed to the STD (6020) to return an OGM (6023) to the STD (6020). For example the STD TTI "John Doe" may be associated with an outgoing message stating "Hello John! Sorry I can't speak with you now, but feel free to come by the office if you have time today." This OGM information may incorporate voice, text data, images, video, and the like to provide a full function multimedia feedback to the STD (6020) in response to a call that cannot be completed.

The call request to the TTD (6032) issued by the TMS (6011) may also be responded to by the TTD (6030) with a local OGM or TMD OGM index (6033) that is linked to OGM data (6014) stored in the TMD (6013). Thus, the present invention anticipates that OGM information may be stored either locally within the TTD (6030) or within the TMD (6013) (or other ancillary database). The present invention also anticipates that OGM data may be resident on the Internet and referenced with hyperlinks or other like data references.

The present invention anticipates that the TTD (6030) may incorporate script substitutions within the OGM data stream to permit insertion of STD/TTD TTI specific information or other information gathered from calendaring or other office productivity software. For example, the OGM voice stream may be formed as "I am sorry <TTI_name>, but I can't come to the phone right now. Please leave a message." Which would vocally substitute the STD caller's name for the <TTI_name> token. Similarly, other tokens including GPS location information ("I'm currently at our field office"), scheduling conflicts ("I'm in a scheduled meeting right now") may also be automatically inserted into the returned OGM. Thus, the OGM data stream is anticipated to incorporate a wide variety of state and context information in an attempt to formulate the OGM in an ergonomic and pleasant form for the STD call originator.

Exemplary OGM Method Embodiment (6100)

As generally illustrated in FIG. 61 (6100) a preferred exemplary method embodiment implementing outgoing message (OGM) processing comprises the following steps:
(1) requesting via the STD a telephone call to the TTD by sending a TTI for the TTD to the TMS (6101);
(2) attempting to complete TTI/NTI translation via the TMS and determine if the TTD is available for telephone call (6102);
(3) determining if the TTD is available for the telephone call, and if so, proceeding to step (8) (6103);
(4) searching the TMD for a STD/TTD TTI associated OGM (6104);
(5) determining if an OGM is found in the TMD, and if not, proceeding to step (7) (6105);
(6) transmitting the retrieved OGM found in the TMD to the STD (6106);
(7) delaying/rejecting the call completion on the STD and updating the STD status display then proceeding to step (11) (6107);
(8) translating the STD/TTD TTI to a TTD/STD NTI via the TMS (6108);
(9) initiating a telephone call between the STD/TTD using the NTI as directed by the TMS (6109);
(10) routing/processing the selected target telephone call with the TMS (using procedures outline elsewhere herein) (6110);
(11) terminating the OGM call processing method (6111).

This technique may also be modified slightly to permit ringtones unique to a given STD TTI to be issued to the TTD prior to actually connecting the STD/TTD via a telephone call. This may permit the TTD sufficient time to STALL/DECLINE the STD telephone connection. Note that step (7) in this method may incorporate default OGMs for voicemail and other user-defined default call uncompleted information to be sent to the STD. This general method summary may be augmented by the various elements described herein to produce a wide variety of invention embodiments consistent with this overall design description.

Exemplary OGM User Dialog (6200)

An exemplary user interface dialog supporting OGM functionality is generally illustrated in FIG. 62 (6200). Here it can be seen that OGMs may be associated with individual TTIs or may be generalized to a standardized OGM for TTIs that do not match a specific pattern. Support for matching OGMs to TTI trees or branches is also anticipated as supported within this context.

Note that within some implementation of the incoming call queueing capability described herein there may be situations in which the incoming call is queued but not sent to voicemail. In these situations there may be a an "introductory message" that is conveyed to the STD much like a voicemail message but this message would provide additional information (call queue time, other options, etc.). The difference between this and a normal telephone call sent to a call center would be that the telephone call would not yet be initiated between the STD and TTD, but rather these messages would be delivered digitally (or stored on the STD) and thus bypass the normal PSTN infrastructure.

Note that this dialog may be utilized with slight modification to support individual RINGTONES that are associated with individual TTIs (or TTI trees/branches). While this dialog is not illustrated, one skilled in the art would easily be able to duplicate/modify the OGM dialog to implement this functionality.

Multiple Mapping Servers/Databases (6300)-(6400)

Figure 63:
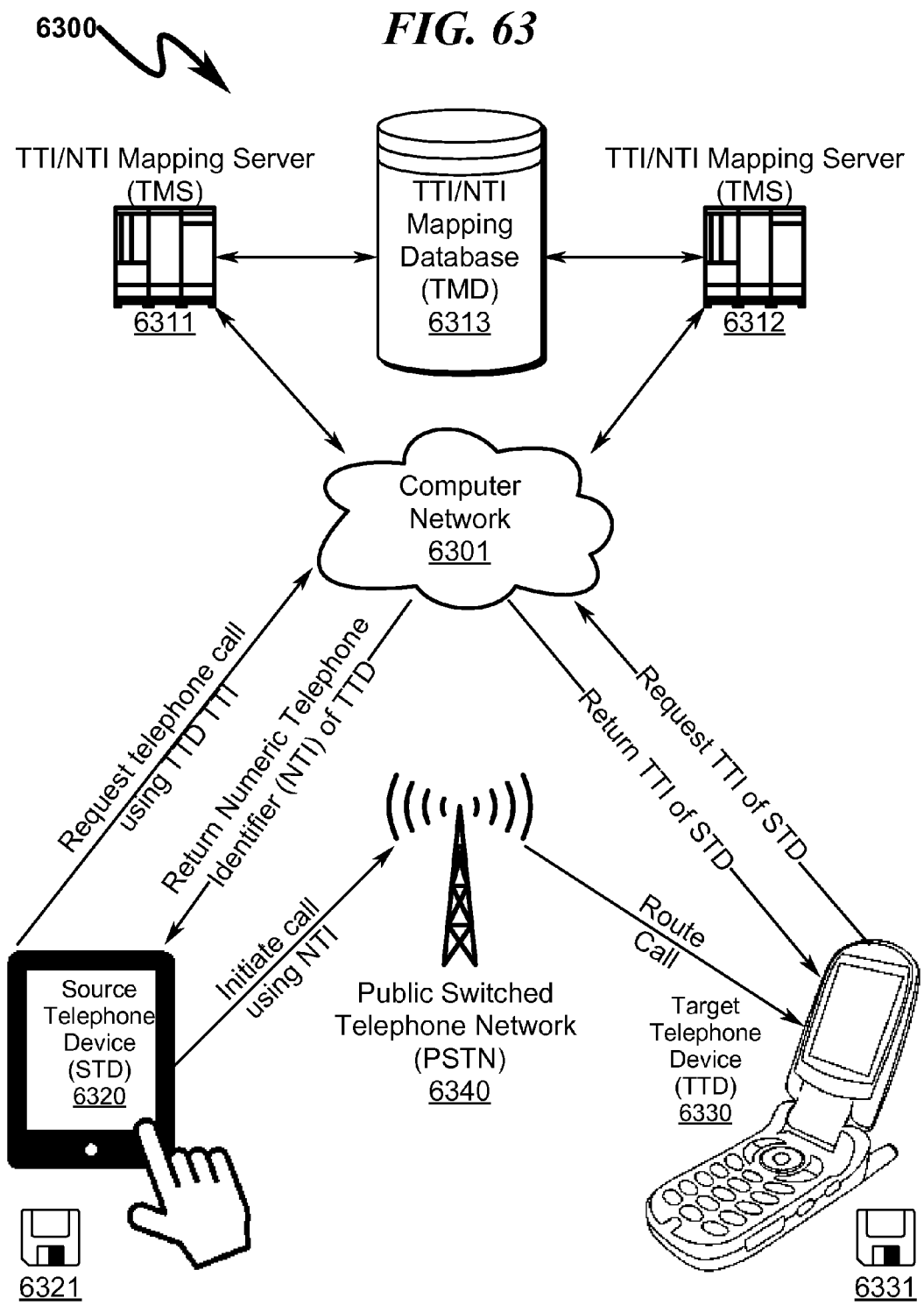
FIG. 63 illustrates an exemplary system embodiment incorporating multiple mapping servers.

As generally illustrated in FIG. 63 (6300), the present invention may utilize multiple TTI/NTI mapping servers (6311, 6312) in conjunction with one or more TMD (6313) data arrays to implement the functionality described herein on a national, continental, and/or worldwide basis.

Figure 64:
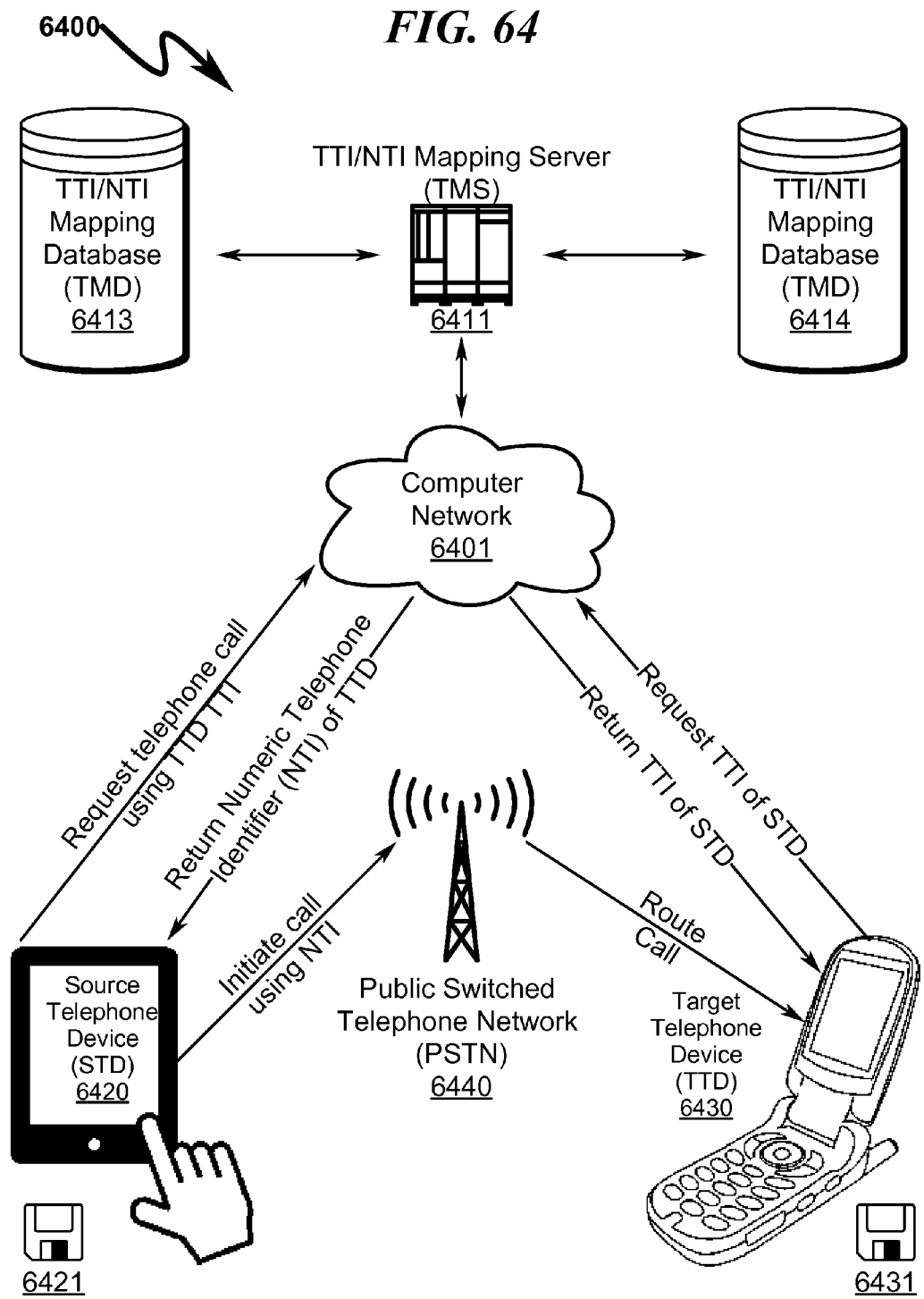
FIG. 64 illustrates multiple mapping databases.

Similarly, as depicted in FIG. 64 (6400), the present invention anticipates that one or more TMS systems (6411) may have associated a number of TMD (6413, 6414) data stores that may be used to index individual TTI trees in support of TTI mapping on a national, continental, and/or worldwide basis.

These multiplicative TMS/TMD systems may operate in a coordinated fashion to ensure that TTI data is both secure and reliably accessed as well as providing the necessary bandwidth and data coherency to support operation of the telecommunications addressing system/method on an enterprise/worldwide basis. This architecture also permits various telecommunication providers (telephone companies) to individually support TTI/NTI mapping functions for their customers and yet cooperate with other telecommunication providers who also support this functionality within their telecommunications networks.

Preferred Embodiment System Summary

The present invention preferred exemplary system embodiment anticipates a wide variety of variations in the basic theme of construction, but can be generalized as a telecommunications addressing system comprising:

(a) telephone mapping server (TMS);
(b) telephone mapping database (TMD);
(c) source telephone instrument device (STD);
(d) target telephone instrument device (TTD); and
(e) computer communication network (CCN);
wherein
   said TMS is configured to store information that identifies a telephone instrument device (TID) in said TMD;
   said TMS is configured to locate a numeric telephone identifier (NTI) within said TMD using a target telephone identifier (TTI) data string as the locating index;
   said NTI permits said TID to be accessed via a public switched telephone network (PSTN); and
   said TMS is configured to initiate a telephone call via said PSTN between said STD and said TTD using said NTI.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a telecommunications addressing method, the method operating in conjunction with a telecommunications addressing system, the system comprising:
(a) telephone mapping server (TMS);
(b) telephone mapping database (TMD);
(c) source telephone instrument device (STD);
(d) target telephone instrument device (TTD); and
(e) computer communication network (CCN);
wherein
   said TMS is configured to store information that identifies a telephone instrument device (TID) in said TMD;
   said TMS is configured to locate a numeric telephone identifier (NTI) within said TMD using a target telephone identifier (TTI) data string as the locating index;
   said NTI permits said TID to be accessed via a public switched telephone network (PSTN); and
   said TMS is configured to initiate a telephone call via said PSTN between said STD and said TTD using said NTI;
wherein the method comprises the steps of:
(1) entering a TTI via a user interface on the STD;
(2) transmitting the TTI to the TMS via the CCN;
(3) indexing the TTI within the TMD to retrieve the NTI associated with the TTI;
(4) transmitting the NTI to the STD through the CCN; and
(5) initiating a telephone call through the PSTN from the STD to the TTD using the NTI.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the CCN comprises the Internet.
An embodiment wherein the TMS is configured to initiate the telephone call via the PSTN from the STD to the TTD.
An embodiment wherein the TMS is configured to initiate the telephone call via the PSTN from the TTD to the STD.
An embodiment wherein the CCN comprises a wireless communication network.
An embodiment wherein the TMS comprises a computer server contained within the PSTN.
An embodiment wherein the TMD comprises graphical images associated with the TTI/NTI mappings.
An embodiment wherein the TMD comprises call sequencing information associated with the TTI/NTI mappings.
An embodiment wherein the TMD comprises a hierarchical directory of TTI/NTI mappings.
An embodiment wherein the TMD associates a plurality of the NTIs contained within a hierarchical directory with the TTI.
An embodiment wherein the TMS returns the NTI based on current TTD status information contained within the TMD that is associated with the TTI.
An embodiment wherein the TMS transmits a tree of hierarchical directory TTI/NTI mappings to the STD in response to a TTI lookup request received from the STD.
An embodiment wherein the TMS is configured to communicate with the STD via a TTI lookup software application resident on the STD.
An embodiment wherein the TMS is configured to host a web application configured to permit configuration of the TMD via a web browser application operational on the STD.
An embodiment wherein the TTI comprises a data string selected from a group consisting of: data derived from a voice recognition software application resident on the STD; email address; website URL address; and hierarchical path of TTI atomic elements.
An embodiment wherein the TMD comprises data selected from a group consisting of: information extracted from an enterprise employee information database; information obtained by scanning metadata extracted from a website HTML file; information obtained by scanning metadata extracted from a social media website.
An embodiment wherein the TMS comprises a TMD editor (TME) configured to permit remote modification of records within the TMD specified by a TMD editing script generated in response to a series of change orders (TCOs) received from a telephone company or telephone standards organization.
An embodiment wherein the STD further comprises a software application configured to display TTIs within a graphical user interface for individual selection as a requesting TTI sent to the TMS.
An embodiment wherein the STD further comprises a software application configured to display a hierarchical tree of TTIs within a graphical user interface for individual selection as a requesting TTI sent to the TMS.
An embodiment wherein the STD further comprises a software application configured to display graphical images associated with a hierarchical tree of TTIs within a graphical user interface for selection by graphical image to identify a requesting TTI sent to the TMS.
An embodiment wherein the TMD comprises caller blocking information.
An embodiment wherein the TMS is configured to block telephone calls received by the TTD if the TTI matches call blocking information contained within the TMD.

An embodiment wherein the TMS is configured to block telephone calls received by the TTD if the TTI matches parental control call blocking information contained within the TMD.

An embodiment wherein the TMS is configured to block telephone calls initiated by the STD if the TTI matches call blocking information contained within the TMD.

An embodiment wherein the TMS is configured to block telephone calls initiated by the STD if the TTI matches parental control call blocking information contained within the TMD.

An embodiment wherein the TMD comprises TID location blocking information.

An embodiment wherein:
the STD is configured to communicate a current STD GPS location to the TMS;
the TMS is configured to translate the GPS location into a text string;
the TMS is configured to transmit the text string to the TTD; and
the TTD is configured to display the text string within a graphical display on the TTD.

An embodiment wherein the TMS is configured to block transmission of the text string to the TTD if the TTI of the STD matches TID location blocking information stored in the TMS.

An embodiment wherein:
the TTD is configured to communicate a current TTD GPS location to the TMS;
the TMS is configured to translate the GPS location into a text string;
the TMS is configured to transmit the text string to the STD; and
the STD is configured to display the text string within a graphical display on the STD.

An embodiment wherein the TMS is configured to block transmission of the text string to the STD if the TTI of the TTD matches TID location blocking information stored in the TMS.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710,578), the present invention anticipates and includes this type of computer readable media within the scope of the invention. Pursuant to *In re Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A telecommunications addressing system/method allowing selection of a telephone instrument device (TID) using arbitrary identifiers has been disclosed. The system/method allows a source TID (STD) to select a target TID (TTD) by the use of a Target Telephone Identifier (TTI) data string rather than a traditional numeric telephone identification (NTI). This TTI is then indexed within a TTI/NTI mapping server (TMS) that functions as a hierarchical and/or relational repository of TTI/NTI mappings. STD/TTD communication is established by first performing a lookup of the STD-selected TTI within the TMS to identify the NTI of the TTD. Once the NTI of the STD has been identified by the TMS, communication between the STD and TTD is established using the NTI via the normal public switched telephone network (PSTN). TMS TTI lookup may be performed via STD TID web application and/or via PSTN infrastructure interface.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

Within the context of the following CLAIMS, the CLAIM PREAMBLE should be considered as limiting the scope of the claimed invention. Within the context of the following CLAIMS, "wherein" clauses should be considered as limiting the scope of the claimed invention.

What is claimed is:

1. A telecommunications addressing system (TAS) comprising:
(a) telephone mapping server (TMS);
(b) telephone mapping database (TMD); and
(c) computer communication network (CCN);
wherein:
said TAS is configured to communicate with a public switched telephone network (PSTN);
said TMS is configured to store information that identifies a telephone instrument device (TID) in said TMD, the stored information comprising a numeric telephone identifier (NTI);
said TMS is configured to locate an NTI within said TMD using a target telephone identifier (TTI) data string as the locating index;
said NTI permits said TID to be accessed via a PSTN;
said TAS is configured to permit a first user to select and associate a first TTI data string with a first numeric telephone identifier (NTI) of a first TID in the TMD; and
said TAS is configured such when a second user, operating another TID as a source telephone device (STD), uses the selected and associated first TTI data string to initiate a call to the first TID of the first user, the TMS uses the selected and associated first TTI data string as a locating index to determine the associated first NTI, and the TAS initiates a telephone call between said STD and said first TID.

2. The telecommunications addressing system of claim 1 wherein said CCN comprises the Internet.

3. The telecommunications addressing system of claim 1 wherein said TMS is configured to initiate said telephone call via said PSTN from said STD to said TTD.

4. The telecommunications addressing system of claim 1 wherein said TMS is configured to initiate said telephone call via said PSTN from said TTD to said STD.

5. The telecommunications addressing system of claim 1 wherein said CCN comprises a wireless communication network.

6. The telecommunications addressing system of claim 1 wherein said TMS comprises a computer server contained within said PSTN.

7. The telecommunications addressing system of claim 1 wherein said TMD comprises graphical images associated with said TTI/NTI mappings.

8. The telecommunications addressing system of claim 1 wherein said TMD comprises call sequencing information associated with said TTI/NTI mappings.

9. The telecommunications addressing system of claim 1 wherein said TMD comprises a hierarchical directory of TTI/NTI mappings.

10. The telecommunications addressing system of claim 1 wherein said TMD associates a plurality of said NTIs contained within a hierarchical directory with said TTI.

11. The telecommunications addressing system of claim 1 wherein said TMS returns said NTI based on current TTD status information contained within said TMD that is associated with said TTI.

12. The telecommunications addressing system of claim 1 wherein said TMS transmits a tree of hierarchical directory TTI/NTI mappings to said STD in response to a TTI lookup request received from said STD.

13. The telecommunications addressing system of claim 1 wherein said TMS is configured to communicate with said STD via a TTI lookup software application resident on said STD.

14. The telecommunications addressing system of claim 1 wherein said TMS is configured to host a web application configured to permit configuration of said TMD via a web browser application operational on said STD.

15. The telecommunications addressing system of claim 1 wherein said TTI comprises a data string selected from a group consisting of: data derived from a voice recognition software application resident on said STD; email address; website URL address; and hierarchical path of TTI atomic elements.

16. The telecommunications addressing system of claim 1 wherein said TMD comprises data selected from a group consisting of: information extracted from an enterprise employee information database; information obtained by scanning metadata extracted from a website HTML file; information obtained by scanning metadata extracted from a social media website.

17. The telecommunications addressing system of claim 1 wherein said TMS comprises a TMD editor (TME) configured to permit remote modification of records within said TMD specified by a TMD editing script generated in response to a series of change orders (TCOs) received from a telephone company or telephone standards organization.

18. The telecommunications addressing system of claim 1 wherein said STD further comprises a software application configured to display TTIs within a graphical user interface for individual selection as a requesting TTI sent to said TMS.

19. The telecommunications addressing system of claim 1 wherein said STD further comprises a software application configured to display a hierarchical tree of TTIs within a graphical user interface for individual selection as a requesting TTI sent to said TMS.

20. The telecommunications addressing system of claim 1 wherein said STD further comprises a software application configured to display graphical images associated with a hierarchical tree of TTIs within a graphical user interface for selection by graphical image to identify a requesting TTI sent to said TMS.

21. The telecommunications addressing system of claim 1 wherein said TMD comprises caller blocking information.

22. The telecommunications addressing system of claim 1 wherein said TMS is configured to block telephone calls received by said TTD if said TTI matches call blocking information contained within said TMD.

23. The telecommunications addressing system of claim 1 wherein said TMS is configured to block telephone calls received by said TTD if said TTI matches parental control call blocking information contained within said TMD.

24. The telecommunications addressing system of claim 1 wherein said TMS is configured to block telephone calls initiated by said STD if said TTI matches call blocking information contained within said TMD.

25. The telecommunications addressing system of claim 1 wherein said TMS is configured to block telephone calls initiated by said STD if said TTI matches parental control call blocking information contained within said TMD.

26. The telecommunications addressing system of claim 1 wherein said TMD comprises TID location blocking information.

27. The telecommunications addressing system of claim 1 wherein:
said STD is configured to communicate a current STD GPS location to said TMS;
said TMS is configured to translate said GPS location into a text string;
said TMS is configured to transmit said text string to said TTD; and
said TTD is configured to display said text string within a graphical display on said TTD.

28. The telecommunications addressing system of claim 27 wherein said TMS is configured to block transmission of said text string to said TTD if the TTI of said STD matches TID location blocking information stored in said TMS.

29. The telecommunications addressing system of claim 1 wherein:
said TTD is configured to communicate a current TTD GPS location to said TMS;
said TMS is configured to translate said GPS location into a text string;
said TMS is configured to transmit said text string to said STD; and
said STD is configured to display said text string within a graphical display on said STD.

30. The telecommunications addressing system of claim 29 wherein said TMS is configured to block transmission of said text string to said STD if the TTI of said TTD matches TID location blocking information stored in said TMS.

31. A tangible non-transitory computer usable medium having computer-readable program code means embodied therein comprising a telecommunications addressing method wherein said method controls a telecommunications addressing system (TAS) comprising:

(a) telephone mapping server (TMS);
(b) telephone mapping database (TMD);
(c) computer communication network (CCN);
wherein:
said TAS is configured to communicate with a public switched telephone network (PSTN);
said TMS is configured to store information that identifies a telephone instrument device (TID) in said TMD;
said TMS is configured to locate a numeric telephone identifier (NTI) within said TMD using a target telephone identifier (TTI) data string as the locating index;
said TAS is configured to permit a user to select and associate a TTI data string with a source telephone instrument device (STD) to identify an NTI, the selected TTI data string associated with the identified NTI by the TMS when a call is initiated by said STD;
said NTI permits said TID to be accessed via a public switched telephone network (PSTN); and
said TMS is configured to permit a user to initiate a telephone call between said STD and said TTD using said NTI;
wherein said method comprises the steps of:
(1) entering a TTI via a user interface on said STD, the TTI associated with the TTD on the STD;
(2) transmitting said TTI to said TMS via said CCN;
(3) indexing said TTI within said TMD to retrieve said NTI associated with said TTI and associated with said STD; and
(4) initiating a telephone call from said STD to said TTD using said NTI.

32. The computer usable medium of claim 31 wherein said method further comprises transmitting said NTI to said STD through said CCN, and said CCN comprises the Internet.

33. The computer usable medium of claim 31 wherein said TMS is configured to initiate said telephone call via said PSTN from said STD to said TTD.

34. The computer usable medium of claim 31 wherein said TMS is configured to initiate said telephone call via said PSTN from said TTD to said STD.

35. The computer usable medium of claim 31 wherein said CCN comprises a wireless communication network.

36. The computer usable medium of claim 31 wherein said TMS comprises a computer server contained within said PSTN.

37. The computer usable medium of claim 31 wherein said TMD comprises graphical images associated with said TTI/NTI mappings.

38. The computer usable medium of claim 31 wherein said TMD comprises call sequencing information associated with said TTI/NTI mappings.

39. The computer usable medium of claim 31 wherein said TMD comprises a hierarchical directory of TTI/NTI mappings.

40. The computer usable medium of claim 31 wherein said TMD associates a plurality of said NTIs contained within a hierarchical directory with said TTI.

41. The computer usable medium of claim 31 wherein said TMS returns said NTI based on current TTD status information contained within said TMD that is associated with said TTI.

42. The computer usable medium of claim 31 wherein said TMS transmits a tree of hierarchical directory TTI/NTI mappings to said STD in response to a TTI lookup request received from said STD.

43. The computer usable medium of claim 31 wherein said TMS is configured to communicate with said STD via a TTI lookup software application resident on said STD.

44. The computer usable medium of claim 31 wherein said TMS is configured to host a web application configured to permit configuration of said TMD via a web browser application operational on said STD.

45. The computer usable medium of claim 31 wherein said TTI comprises a data string selected from a group consisting of: data derived from a voice recognition software application resident on said STD; email address; website URL address; and hierarchical path of TTI atomic elements.

46. The computer usable medium of claim 31 wherein said TMD comprises data selected from a group consisting of: information extracted from an enterprise employee information database; information obtained by scanning metadata extracted from a website HTML file; information obtained by scanning metadata extracted from a social media website.

47. The computer usable medium of claim 31 wherein said TMS comprises a TMD editor (TME) configured to permit remote modification of records within said TMD specified by a TMD editing script generated in response to a series of change orders (TCOs) received from a telephone company or telephone standards organization.

48. The computer usable medium of claim 31 wherein said STD further comprises a software application configured to display TTIs within a graphical user interface for individual selection as a requesting TTI sent to said TMS.

49. The computer usable medium of claim 31 wherein said STD further comprises a software application configured to display a hierarchical tree of TTIs within a graphical user interface for individual selection as a requesting TTI sent to said TMS.

50. The computer usable medium of claim 31 wherein said STD further comprises a software application configured to display graphical images associated with a hierarchical tree of TTIs within a graphical user interface for selection by graphical image to identify a requesting TTI sent to said TMS.

51. The computer usable medium of claim 31 wherein said TMD comprises caller blocking information.

52. The computer usable medium of claim 31 wherein said TMS is configured to block telephone calls received by said TTD if said TTI matches call blocking information contained within said TMD.

53. The computer usable medium of claim 31 wherein said TMS is configured to block telephone calls received by said TTD if said TTI matches parental control call blocking information contained within said TMD.

54. The computer usable medium of claim 31 wherein said TMS is configured to block telephone calls initiated by said STD if said TTI matches call blocking information contained within said TMD.

55. The computer usable medium of claim 31 wherein said TMS is configured to block telephone calls initiated by said STD if said TTI matches parental control call blocking information contained within said TMD.

56. The computer usable medium of claim 31 wherein said TMD comprises TID location blocking information.

57. The computer usable medium of claim 31 wherein:
said STD is configured to communicate a current STD GPS location to said TMS;
said TMS is configured to translate said GPS location into a text string;
said TMS is configured to transmit said text string to said TTD; and
said TTD is configured to display said text string within a graphical display on said TTD.

58. The computer usable medium of claim 57 wherein said TMS is configured to block transmission of said text string to said TTD if the TTI of said STD matches TID location blocking information stored in said TMS.

59. The computer usable medium of claim 31 wherein:
said TTD is configured to communicate a current TTD GPS location to said TMS;
said TMS is configured to translate said GPS location into a text string;
said TMS is configured to transmit said text string to said STD; and
said STD is configured to display said text string within a graphical display on said STD.

60. The computer usable medium of claim 59 wherein said TMS is configured to block transmission of said text string to said STD if the TTI of said TTD matches TID location blocking information stored in said TMS.

* * * * *